US008825188B2

United States Patent
Stone et al.

(10) Patent No.: US 8,825,188 B2
(45) Date of Patent: Sep. 2, 2014

(54) METHODS AND SYSTEMS FOR IDENTIFYING CONTENT TYPES

(71) Applicants: Troy Christopher Stone, Orlando, FL (US); Wayne Roy Lappi, San Francisco, CA (US)

(72) Inventors: Troy Christopher Stone, Orlando, FL (US); Wayne Roy Lappi, San Francisco, CA (US)

(*) Notice: Subject to any disclaimer, the term of this patent is extended or adjusted under 35 U.S.C. 154(b) by 0 days.

(21) Appl. No.: 13/906,895

(22) Filed: May 31, 2013

(65) Prior Publication Data

US 2013/0322633 A1   Dec. 5, 2013

Related U.S. Application Data

(60) Provisional application No. 61/655,154, filed on Jun. 4, 2012, provisional application No. 61/682,021, filed on Aug. 10, 2012, provisional application No. 61/780,255, filed on Mar. 13, 2013.

(51) Int. Cl.
| | | |
|---|---|---|
| *G06F 17/00* | (2006.01) | |
| *H04H 20/47* | (2008.01) | |
| *H04H 20/88* | (2008.01) | |
| *H04H 40/36* | (2008.01) | |

(52) U.S. Cl.
USPC .................................. 700/94; 381/2; 386/249

(58) Field of Classification Search
USPC ......... 700/94; 381/2; 704/234; 386/248–251, 386/254; 341/61, 131
See application file for complete search history.

(56) References Cited

U.S. PATENT DOCUMENTS

| | | | | |
|---|---|---|---|---|
| 3,879,724 | A | * | 4/1975 | McDonald ..................... 341/131 |
| 5,210,820 | A | | 5/1993 | Kenyon |
| 5,343,251 | A | * | 8/1994 | Nafeh ............................ 348/571 |
| 5,436,653 | A | | 7/1995 | Ellis et al. |
| 5,737,716 | A | * | 4/1998 | Bergstrom et al. ........... 704/202 |
| 5,903,482 | A | * | 5/1999 | Iwamura et al. .............. 708/313 |
| 5,918,223 | A | | 6/1999 | Blum et al. |

(Continued)

FOREIGN PATENT DOCUMENTS

| | | |
|---|---|---|
| EP | 1006685 | 6/2000 |
| EP | 1341310 | 9/2003 |
| EP | 2353237 | 8/2011 |
| EP | 1730105 | 1/2012 |

OTHER PUBLICATIONS

Doets et al., "Distortion Estimation in Compressed Music Using Only Audio Fingerprints", Feb. 2008, IEEE Transactions on Audio, Speech, and Language Processing, vol. 16, No. 2, pp. 302-317.*

(Continued)

*Primary Examiner* — Davetta W Goins
*Assistant Examiner* — Daniel Sellers
(74) *Attorney, Agent, or Firm* — Knobbe, Martens, Olson & Bear LLP

(57) ABSTRACT

System and methods are provided configured to reveal differences in content, such as commercial and program content. An input port may be configured to receive a first plurality of bit stream audio channels. A circuit may optionally be configured to enhance artifacting, noise, and/or bit rate errors and may optionally reduce redundant signal information. A signal processor circuit may be configured to transform the first plurality of bit stream audio channels into a frequency domain. A spectrum analysis system may be configured to compare properties of the first plurality of bit stream audio channels to one or more reference signals. An identification circuit may be configured to identify different content types included in the first plurality of bit stream audio channels.

27 Claims, 19 Drawing Sheets

(56) References Cited

U.S. PATENT DOCUMENTS

| | | |
|---|---|---|
| 6,529,809 B1 * | 3/2003 | Breed et al. .................. 701/45 |
| 6,597,405 B1 | 7/2003 | Iggulden |
| 7,299,050 B2 | 11/2007 | Delaney et al. |
| 8,369,532 B2 | 2/2013 | Aarts |
| 8,396,705 B2 | 3/2013 | Bilobrov |
| 2002/0133499 A1 * | 9/2002 | Ward et al. .................. 707/102 |
| 2002/0176702 A1 | 11/2002 | Frantz |
| 2006/0229878 A1 * | 10/2006 | Scheirer .................. 704/273 |
| 2007/0288952 A1 | 12/2007 | Weinblatt |
| 2008/0127244 A1 | 5/2008 | Zhang |
| 2013/0259211 A1 * | 10/2013 | Vlack et al. .................. 379/88.01 |

OTHER PUBLICATIONS

Haitsma et al., "A Highly Robust Audio Fingerprinting System", 2002, IRCAM, pp. 1-9.*

Anderson, Tobias, *Audio classification and content description,* Audio Processing & Transport Multimedia Technologies Ericsson Research, Lulea, Sweden, Mar. 2004; ISSN: 1402-1617.

International Search Report and Written Opinion, PCT/US2013/043737, mailed Sep. 16, 2013, 11 pages.

* cited by examiner

METHODS AND SYSTEMS FOR IDENTIFYING CONTENT TYPES

INCORPORATION BY REFERENCE TO ANY PRIORITY APPLICATIONS

Any and all applications for which a foreign or domestic priority claim is identified in the Application Data Sheet as filed with the present application, are hereby incorporated by reference under 37 CFR 1.57.

BACKGROUND OF THE INVENTION

1. Field of the Invention

The present invention is related to signal processing, and in particular to methods and systems for identifying content type in signals, such as audio signals.

2. Description of the Related Art

Conventional approaches to identifying content type in a signal, such as in a television or radio audio signal, have proven deficient. For example, certain conventional techniques for identifying commercials based on signal content are unreliable, cannot be performed in real-time, or require large databases of reference signatures. Certain conventional techniques require that metadata or the like be included in the signal to identify the content type.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods and systems are described for identifying and classifying content. For example, a signal intended to be reproduced by a reproduction device (e.g., a television receiving over-the-air television signals, cable signals, satellite signals, network signals or radio) may include an audio component and/or a video component. Certain embodiments described herein analyze the signal to determine if a certain portion of the signal includes content of a first type. For example, certain embodiments described herein analyze the signal to determine if a certain portion of the signal includes program content or commercial content.

Certain embodiments optionally enhance what would typically be considered undesirable artifacts, such as artifacting, noise, and/or aliasing in order to enhance differentiation of different types of content. Certain embodiments optionally measure signal noise, bandwidth, spectral energy, convergence, aliasing, and/or spectral symmetry to identify different types of content. Certain embodiments convert a signal from the time domain to the frequency domain, and identify different types of content based at least in part on frequency domain data. Certain embodiments transcode a signal, such as an audio signal, measure certain properties of the transcoded signal, measure certain properties of a reference signal (which may be the signal without the transcoding of the transcoded signal), and compare the properties of the transcoded signal and the reference signal to identify and classify different content types.

Certain embodiments provide a method of processing audio signals to identify content, the method comprising: receiving, using a first circuit, a first plurality of bit stream audio channels; enhancing artifacting, noise, and/or aliasing with respect to the first plurality of bit stream audio channels at least in part by sampling the plurality of bit stream audio channels; analyzing, using a signal analysis system, the first plurality of bit stream audio channels after performing the enhancement of the artifacting, noise, and/or aliasing to identify content type included in the first plurality of bit stream audio channels by measuring at least signal noise, and one or more of the following: bandwidth, spectral energy, convergence, aliasing, or spectral symmetry; based at least in part on the analysis, identifying, using an identification circuit, commercial content included in the first plurality of bit stream audio channels.

Optionally, the enhancement of the artifacting, noise and/or aliasing is performed at least in part by adding noise to the first plurality of bit stream audio channels by an amount sufficient to reveal signal to noise variance in non-commercial content included in the first plurality of bit stream audio channels, identifying commercial content included in the first plurality of bit stream audio channels further comprises utilizing loudness, noise and frequency spectrum analyzers in identifying commercial content, and two or more of the first plurality of bit stream audio channels are summed, combined, or subtracted and then down mixed to one or more channels to reduce redundant signal information and decoder channel modes. Optionally, the enhancement of the artifacting, noise and/or aliasing is performed at least in part by adding noise to the first plurality of bit stream audio channels by an amount sufficient to reveal signal to noise variance in non-commercial content included in the first plurality of bit stream audio channels. Optionally, the enhancement of the artifacting, noise and/or aliasing is performed at least in part by performing an analog to digital conversion on the first plurality of bit stream audio channels. Optionally, identifying commercial content included in the first plurality of bit stream audio channels further comprises utilizing loudness, noise and frequency spectrum analyzers in identifying commercial content. Optionally, prior to performing the analysis, two or more of the first plurality of bit stream audio channels are summed, combined, or subtracted and then down mixed to one or more channels to reduce redundant signal information and decoder channel modes. Optionally, the method further comprises, prior to performing the analysis, modulating phase and frequencies within the first plurality of bit stream audio channels to reduce redundant signal information. Optionally, the method further comprises, prior to performing the analysis, processing two or more of the first plurality of channels utilizing amplitude modulation to increase the variation in amplitude and de-correlate amplitude of the channels within the first plurality of channel and reduce acoustic power correlations between two or more of the first plurality of channels. Optionally, the method further comprises, prior to performing the analysis, processing the first plurality of channels to modify spectral content. Optionally, the method further comprises utilizing both frequency and time domain analyzers in identifying the commercial content. Optionally, the method further comprises utilizing frequency-domain wavelet spectrum analysis in identifying the commercial content. Optionally, the method further comprises performing a phase inversion on a first channel signal and summing the phase inverted first channel signal with a second channel signal in the first plurality of bit stream audio channels, wherein the signal analysis system optionally utilizes one or more RMS (root mean square) detection signal noise analyzers.

Certain embodiments provide a content identification system, comprising: an input circuit configured to receive a first plurality of bit stream audio channels; a circuit configured to enhance artifacting, noise, and/or aliasing with respect to the first plurality of bit stream audio channels; a signal analysis system configured to analyze the first plurality of bit stream audio channels after the enhancement of the artifacting, noise, and/or aliasing is performed to identify content type included in the first plurality of bit stream audio channels by measuring at least signal noise, and one or more of the following: bandwidth, spectral energy, convergence, aliasing, or spectral symmetry; an identification circuit configured to identify, based at least in part on the analysis, commercial content included in the first plurality of bit stream audio channels.

Certain embodiments provide a method of processing decoded signals to reveal differences in content, the method comprising: receiving a first plurality of bit stream audio channels; enhancing artifacting, noise, and bit rate error utilizing down sampling and bit-depth reduction with respect to the first plurality of bit stream audio channels; reducing redundant signal information included in the first plurality of bit stream audio channels utilizing phase shift keying; transforming the first plurality of bit stream audio channels into a frequency domain; after enhancing artifacting, noise, and bit rate error and transforming the first plurality of bit stream audio channels into the frequency domain, using spectrum analysis to compare properties of the first plurality of bit stream audio channels to one or more reference signals; and based at least on the comparison, identifying different content types included in the first plurality of bit stream audio channels.

Optionally, enhancing artifacting, noise, and bit rate error is configured to result in increased aliasing, and losses in bandwidth, spectral energy, symmetry, and/or convergence of non-commercial content included in the first plurality of bit stream audio channels. Optionally, transforming the first plurality of bit stream audio channels into the frequency domain is performed using discrete cosine transforms. Optionally, enhancing artifacting further comprises enhancing aliasing and distortion. Optionally, transcoding (e.g., lossy to lossy) is utilized to increase differences in channels included in the first plurality of bit stream audio channels. Optionally, transcoded channels are down-sampled at less than half the highest frequency of a reference frequency spectrum of the first plurality of bit channels, and non-commercial content included in the first plurality of bit stream audio channels is unable to be reproduced in the frequency spectrum. Optionally, the method further comprises utilizing phase shift keying to reduce redundant information in the first plurality of bit stream audio channels. Optionally, the method further comprises down mixing two or more channels in the first plurality of bit stream audio channels to fewer channels to reduce redundant signal information and decoder channel modes. Optionally, the method further comprises inverting phase polarity of at least one down mixed channel. Optionally, the method further comprises performing low pass filtering at less than half the highest frequency of at least one channel in the first plurality of bit stream audio channels and then performing down sampling. Optionally, the method further comprises enhancing consistency in reproduction of commercial content relative to non-commercial content included in the first plurality of bit stream audio channels by sampling the first plurality of bit stream audio channels so that bit depth made less than a maximum tolerable loss of rate distortion. Optionally, the method further comprises decreasing channel separation between two or more channels in the first plurality of decoded bit stream audio channels.

Certain embodiments provide a system configured to reveal differences in content, the system comprising: an input port configured to receive a first plurality of bit stream audio channels; a circuit configured to enhance artifacting, noise, and bit rate error utilizing down sampling and bit-depth reduction with respect to the first plurality of bit stream audio channels; a circuit configured to reduce redundant signal information included in the first plurality of bit stream audio channels utilizing phase shift keying; a signal processor circuit configured to transform the first plurality of bit stream audio channels into a frequency domain; a spectrum analysis system configured to compare properties of the first plurality of bit stream audio channels to one or more reference signals; and an identification circuit configured to identify, based at least on the comparison, different content types included in the first plurality of bit stream audio channels.

Certain embodiments provide a method of processing audio signals to identify content, the method comprising: receiving a first plurality of decoded bit stream audio channels; determining whether the first plurality of decoded bit stream audio channels are discrete channels or non-discrete channels; at least partly in response determining that the first plurality of decoded bit stream audio channels comprise discrete channels, using a first process to identify different content types, including at least commercials, in the decoded bit stream audio channels; and at least partly in response determining that the first plurality of decoded bit stream audio channels comprise non-discrete channels, using a first process to identify different content types, including at least commercials, in the decoded bit stream audio channels. Optionally, determining that the first plurality of decoded bit stream audio channels comprise discrete channels further comprises determining that the first plurality of decoded bit stream audio channels is in a 5.1-channel surround sound format. Optionally, the method further comprises decreasing correlation between two or more channels in the first plurality of decoded bit stream audio channels prior to identifying the different content types. Optionally, the method further comprises enhancing channel separation between two or more channels in the first plurality of decoded bit stream audio channels prior to identifying the different content types. Optionally, the method further comprises utilizing phase and amplitude modulation to change signal dominance and channel correlation with respect to two or more channels in the first plurality of decoded bit stream audio channels. Optionally, the method further comprises down-mixing two or more channels in the first plurality of decoded bit stream audio channels. Optionally, the method further comprises enhancing artifacting and noise in one or more of the first plurality of decoded bit stream audio channels to enhance indications as to how the first plurality of decoded bit stream audio channels had been encoded. Optionally, the method further comprises applying an M/S matrix to independently process a plurality of channels in the first plurality of decoded bit stream audio channels using mid and side signal components. Optionally, the first plurality of decoded bit stream audio channels includes: a left front channel; a right front channel; a left rear channel; a right rear channel; and the method further comprises: summing the left front and right front channels; differencing the left rear and right rear channels; reducing crosstalk between the summed left front and right front channels with respect to the differenced left rear and right rear channels.

An aspect is a method of processing an audio signal containing content, comprising: receiving an audio signal including a plurality of content types; transcoding the audio signal; receiving a set of data values in a frequency domain for the transcoded audio signal; receiving a set of data values in a frequency domain for a reference audio signal; identifying, from the transcoded audio signal data values in the frequency domain, amplitude frequency properties for the transcoded audio signal; identifying, from the transcoded audio signal data values in the frequency domain, frequency properties for the transcoded audio signal; identifying, from the reference audio signal data values in the frequency domain, amplitude properties for the reference audio signal; identifying, from the reference audio signal data values in the frequency domain, frequency properties for the reference audio signal; comparing the identified amplitude properties for the transcoded audio signal with the identified amplitude properties of the reference audio signal; comparing the identified frequency properties for the transcoded audio signal with the identified frequency properties of the reference audio signal; based at least in part on the comparison of the identified amplitude properties for the transcoded audio signal with the identified amplitude properties of the reference audio signal and the comparison of the identified frequency properties for the transcoded audio signal with the identified frequency properties, determining whether the reference audio signal data values and/or the transcoded audio signal data values correspond to a commercial.

Optionally, the transcoded audio signal is a processed version of the reference audio signal. Optionally, the method further comprises: identifying, from the transcoded audio signal data values in the frequency domain, dynamic range properties for the transcoded audio signal; identifying, from the reference audio signal data values in the frequency domain, dynamic range properties for the reference audio signal; comparing the identified dynamic range properties for the transcoded audio signal with the identified dynamic range properties of the reference audio signal, wherein determining whether the reference audio signal data values and/or the transcoded audio signal data values correspond to a commercial is based in part on the comparison of the identified dynamic range properties for the transcoded audio signal with the identified dynamic range properties of the reference audio signal.

Optionally, the method further comprises: identifying, from the transcoded audio signal data values in the frequency domain, bit error rate properties for the transcoded audio signal; identifying, from the reference audio signal data values in the frequency domain, bit error rate properties for the reference audio signal; comparing the bit error rate properties for the transcoded audio signal with the identified bit error rate properties of the reference audio signal, wherein determining whether the reference audio signal data values and/or the transcoded audio signal data values correspond to a commercial is based in part on the comparison of the identified bit error rate properties for the transcoded audio signal with the identified bit error rate properties of the reference audio signal.

Optionally, determining whether the reference audio signal data values and/or the transcoded audio signal data values correspond to a commercial is based in part on one or more of bandwidth, spectral energy, aliasing, bit error rate, convergence, or symmetry properties of the transcoded audio signal. Optionally, determining whether the reference audio signal data values and/or the transcoded audio signal data values correspond to a commercial is based in part on comparing variances of at least one property within the set of data values in the frequency domain for the transcoded audio signal to variances of the at least one property within the set of data values in the frequency domain for the reference audio signal. Optionally, identifying, from the transcoded audio signal data values in the frequency domain, amplitude properties for the transcoded audio signal further comprises identifying peak and/or trough values.

Optionally, the method further comprises assigning a plurality of interim content classifications to assist with the determination of a final content classification with respect to at least a portion of the content included in the audio signal based at least in part on a comparison of variance properties, autocorrelation properties and/or ranges of spectral signal properties to boundary conditions over a temporal period. Optionally, the method further comprises: assigning a plurality of interim content classifications to assist with the determination of a final content classification with respect to at least a portion of the content included in the audio signal based at least in part on a comparison of variance properties, autocorrelation properties and/or ranges of spectral signal properties to boundary conditions over a temporal period; and resolving one or more undetermined interim content classifications utilizing an outlier analytic algorithm comprising look-back and look-forward analysis.

An example aspect provides a method of identifying content types in an audio signal, the method comprising: receiving an audio signal; generating, by one or more analytic content processors, a plurality of final content classifications corresponding to a first set of portions of the audio signal, wherein the audio signal includes both program content and commercial content; generating, by one or more analytic content processors, a plurality of interim content classifications respectively corresponding to a second set of portions of the audio signal; analyzing structure of the first set of portions of the audio signal and the second set of portions of the audio signal; based at least in part on the analysis of the first set of portions of the audio signal and the second set of portions of the audio signal, accessing one or more final classifications for first set of portions of the audio signal; resolving one or more of the plurality of interim content classifications based at least in part on the accessed one or more final classifications. Optionally, a first interim classification is undetermined content type.

Optionally, the method further comprises utilizing weighted interim content classifications in resolving one or more of the plurality of interim content classifications. Optionally, the method further comprises differently weighting interim content classifications from at least two analytic content processors in resolving one or more of the plurality of interim content classifications based at least in part on previous performance data. Optionally, the method further comprises utilizing look back in time and/or forward in time analysis to resolve at least one interim classification. Optionally, the method further comprises utilizing signal signatures and/or identified signal patterns to resolve at least one interim classification. Optionally, the method further comprises overriding a first classification for a first portion of the audio signal based at least in part on an indication that the first portion of the audio signal includes emergency alert content, and identifying the first portion of the audio signal as including emergency alert content. Optionally, the method further comprises overriding a first classification for a first portion of the audio signal based at least in part on an indication that the first portion of the audio signal includes applause, and identifying the first portion of the audio signal as including program content.

Optionally, a final content classification may be derived from a plurality of interim content classifications by summing the interim weighted content classification to derive the final content classification.

An example aspect provides a method of resolving outlier content classifications for signal processing to improve the accuracy of content classification by categorizing current outlier conditions, analyzing available outlier solutions and applying solutions to signal processors.

An example aspect provides a method of subdividing interim content classifications utilizing time and frequency domain analytic properties to determine a non-weighted, time invariant final content classification, wherein a sub-group represents signal noise, M/S signal properties, correlated processors and/or lossy transcoding.

An example aspect provides a method of subdividing interim content classifications utilizing time and frequency domain analytic properties to determine a final content classification, wherein a sub-group represents signal noise, M/S signal properties, correlated processors and/or lossy transcoding.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION OF VARIOUS EMBODIMENTS

Figure 1:
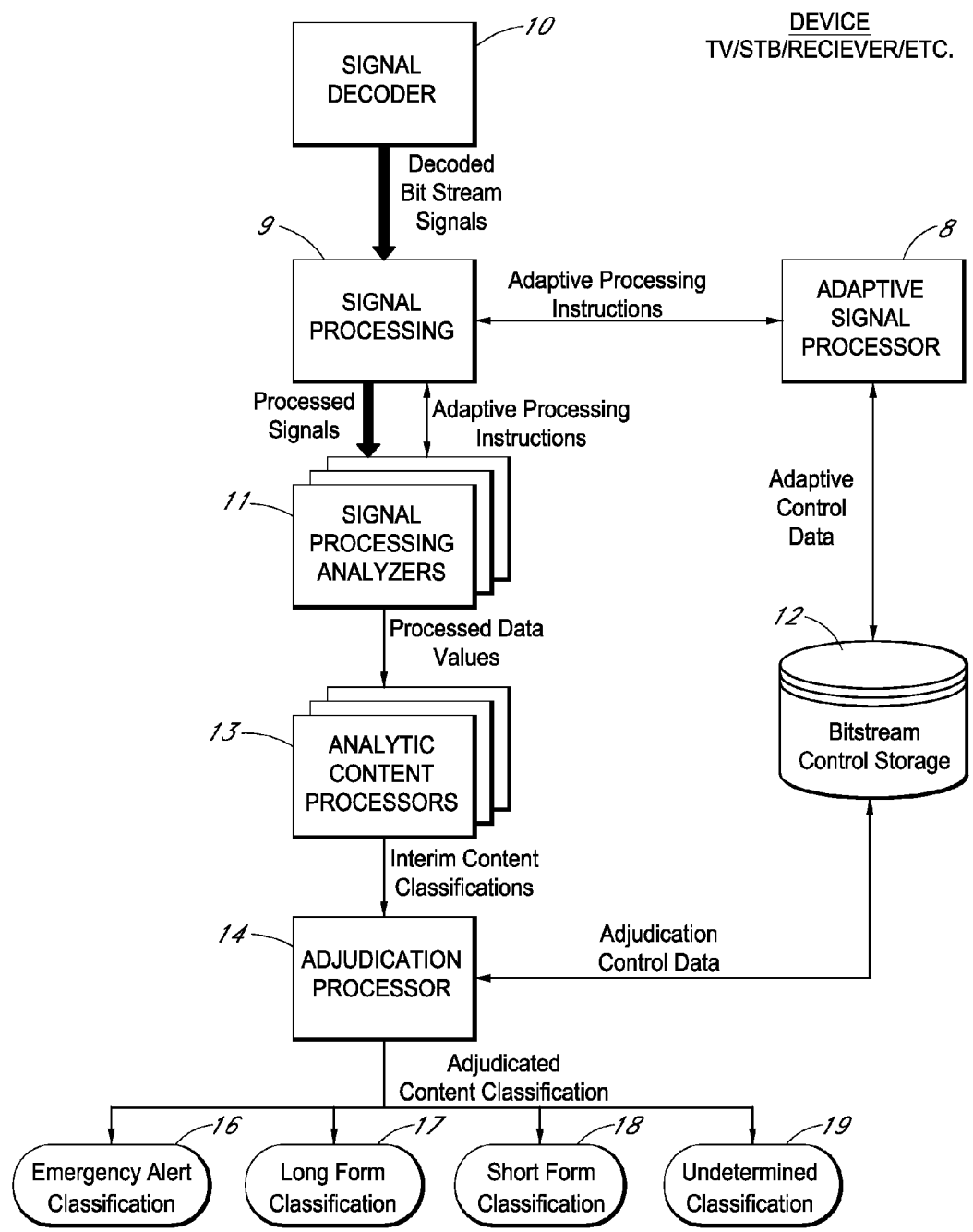
FIG. 1 is a block diagram illustrating an example architecture of a content classification system.

Methods and systems are described for identifying and classifying content. For example, a signal intended to be reproduced by a reproduction device (e.g., a television receiving over-the-air television signals, cable signals, satellite signals, network signals or radio) may include an audio component and/or a video component. Certain embodiments described herein analyze the signal to determine if a certain portion of the signal includes content of a first type. For example, certain embodiments described herein analyze the signal to determine if a certain portion of the signal includes program content or commercial content based at least in part on the different properties that may be associated with program content and commercial content.

The description herein may refer to program or non-commercial content as being "long form" or "LF" content, and commercial content as "short form" or "SF" content, although potentially the commercial content may be longer than the program content. A commercial may be in the form of a promotional announcement or paid advertisement for goods, services, or to promote a brand, and program content may be a show (e.g., a scripted comedy or drama, a reality show, a movie, a sporting event, etc., that are not primarily directed to promoting goods or services although there may be product placement in a program). Typically, although not necessarily, a given program may be interspersed with relatively short commercial content.

In an example embodiment, unique combinations of decoded bit-stream 5.1 surround audio channels may be determined for input to a content identification system. It is noted that the content may have been originally produced using different types of discrete and non-discrete encoding (e.g., 2.0 channel stereo, 5.1 surround, etc.).

For example, a combination of surround LCRS channels (Left, Center, Right channel, and mono Surround channels) may be determined using one or more of the following criteria: percentage of discrete signals within each channel, percentage of non-discrete signals within each channel, surround channel correlation to other channel, surround channel speaker coding, signal dominance, stereo 2.0 up mixing to 5.1 surround sound, 5.1 surround sound down mixing to 2.0 stereo, and other audio features (e.g., music, sound effects dialogue) dominance and/or correlation within each channel or all channels.

The FL (front left), C (center), FR (front right) channel combination may be effective, while other combinations may be used, such as television content originally produced in 2.0 stereo that has been up-mixed to 5.1 in a decoder, such as one that may be found in a consumer electronic device (e.g., a set-top box, television, networked computer, etc.) receiving the content and/or for content originating in 5.1 discrete surround sound decoded in 5.1 discrete surround sound.

Certain embodiments counter-intuitively add or enhance signal noise in a plurality of input bit stream audio channels by an amount sufficient to reveal increased signal to noise ratio (SNR) variances over a temporal period in non-commercial content (e.g., program content) relative to commercial content, included in the plurality of bit stream audio channels. By way of example, noise may be enhanced utilizing one or more of the following: analog-to-digital conversion (ADC), sampling, increasing quantization errors, anti-alias filtering, and/or noise shaping, although other techniques may be used.

Multimedia content in bit stream decoded audio signals may be complex and unstable, and so difficult to classify (e.g., a radio or television broadcast). Certain embodiments optionally utilize lossy compression transcoding with respect to an audio signal (which may be an audio signal from a multimedia television show with audio-video content by way of example) to reveal or enhance differences in a plurality of spectral frequency properties relative to a non-transcoded reference signal by increasing artifacting, noise and distortion. Certain embodiments perform a comparison of such transcoded signal properties with corresponding properties of the non-transcoded signal (used as a reference signal) to classify content.

To calculate the transcoded lossy compression, optionally a rate-distortion process may be utilized. An example of such a process is described in "A Mathematical Theory of Communication" by C. E. Shannon, The Bell System Technical Journal, Vol. 27, July-October, 1948, the content of which is incorporated herein by reference in its entirety. An input bit stream is received, wherein measuring commercial content the signal may be approximately reconstructed without exceeding a given distortion, after increasing artifacting in the transcoded signal and differences; the bit error rate (BER) may become more discernible in non-commercial content when compared to a non-transcoded reference signal. For example, if the transcoded and reference signals represent commercial content, the associated BER values may also be similar (e.g., aliasing, bandwidth, convergence, spectral energy, and symmetry of the respective values may be similar (but not necessarily identical.) On the other hand, if the lossy transcoded and reference signals represent non-commercial content, the BER of the transcoded and non-transcoded reference signal may be less similar as measured by the difference in the amount of aliasing, bandwidth, convergence, spectral energy, and/or symmetry.

In an example embodiment, determining the combination of surround audio channels that may be input for lossy transcoding may comprise reducing redundant signal information for content produced in 2.0 channel stereo by selecting channels that tend to more often carry non-discrete signals (e.g., FL, C, and/or FR channels) and omitting channels that tend to more often carry discrete signals (e.g., SL (side left), SR (side right), and/or LFE (low frequency effect (subwoofer) channels) for content originally produced in 5.1 channel format.

Figure 2:
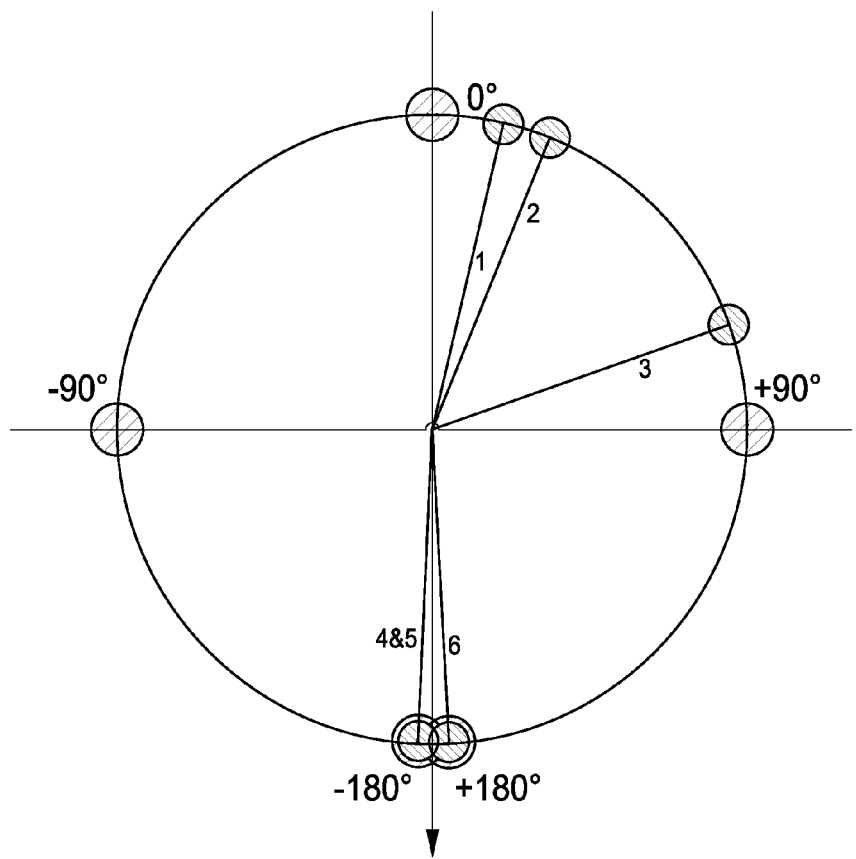
FIG. 2 is a diagram illustrating an example QAM constellation which may be used by the content classification engine.

Phase shift keying may be further utilized to reduce redundant signal information in a plurality of channels. To determine what information in the decoded audio signal may be perceptually irrelevant, a modified discrete cosine transform (MDCT) may optionally be used to convert time domain sampled audio signal waveforms into a transform domain (e.g., the frequency domain). Once transformed, the frequency domain may be utilized wherein component frequencies may be discarded according to how audible they may be. Audibility of artifacting may be determined by calculating a threshold above the transcoded signal at which distortion and/or noise becomes humanly audible. Referring to FIG. 2, the phase shift keying 163 may comprise the following constellation points at unity gain with software potentiometer settings: FL 53>, FR<–99, C1<–3, C2<–2, C317>, while others may be used. Thus, an audibility threshold may be calculated or accessed from memory, and component frequencies that are determined to fall below the threshold may be discarded.

A de-correlation process may be used to reduce autocorrelation within signals, or cross-correlation within a set of signals (C1, C2, C3—which are duplicates of the center channels to facilitate phase shift keying). In an example embodiment, the de-correlation process may utilize a time adjusted delay of 4 samples 164 attenuated@–6 dB, while others may be used (by performing time delay on C1, C2, C3 so they become out of phase with respect to each other and so are de-correlated). The transcoding method may limit the number of decoder channel modes and/or redundant signal information by down mixing 165 the FL, FR, C1, C2, C3 signals to a stereo channel wherein; the L channel may be phase inverted and the LT/RT (left total, right total) output attenuated by a certain amount, such as about 7.5 dB, although greater or lesser attenuation may be used.

The transcoding method may use a low pass filter 166. The low pass filter may be set to be less than half the highest frequency prior to down sampling. For example, the low pass filter may be set with input@–3 dB, filter set at 11,815 khz, @–18 dB and Q (50) and output@+3 dB, although other configurations may be used.

Figure 16:
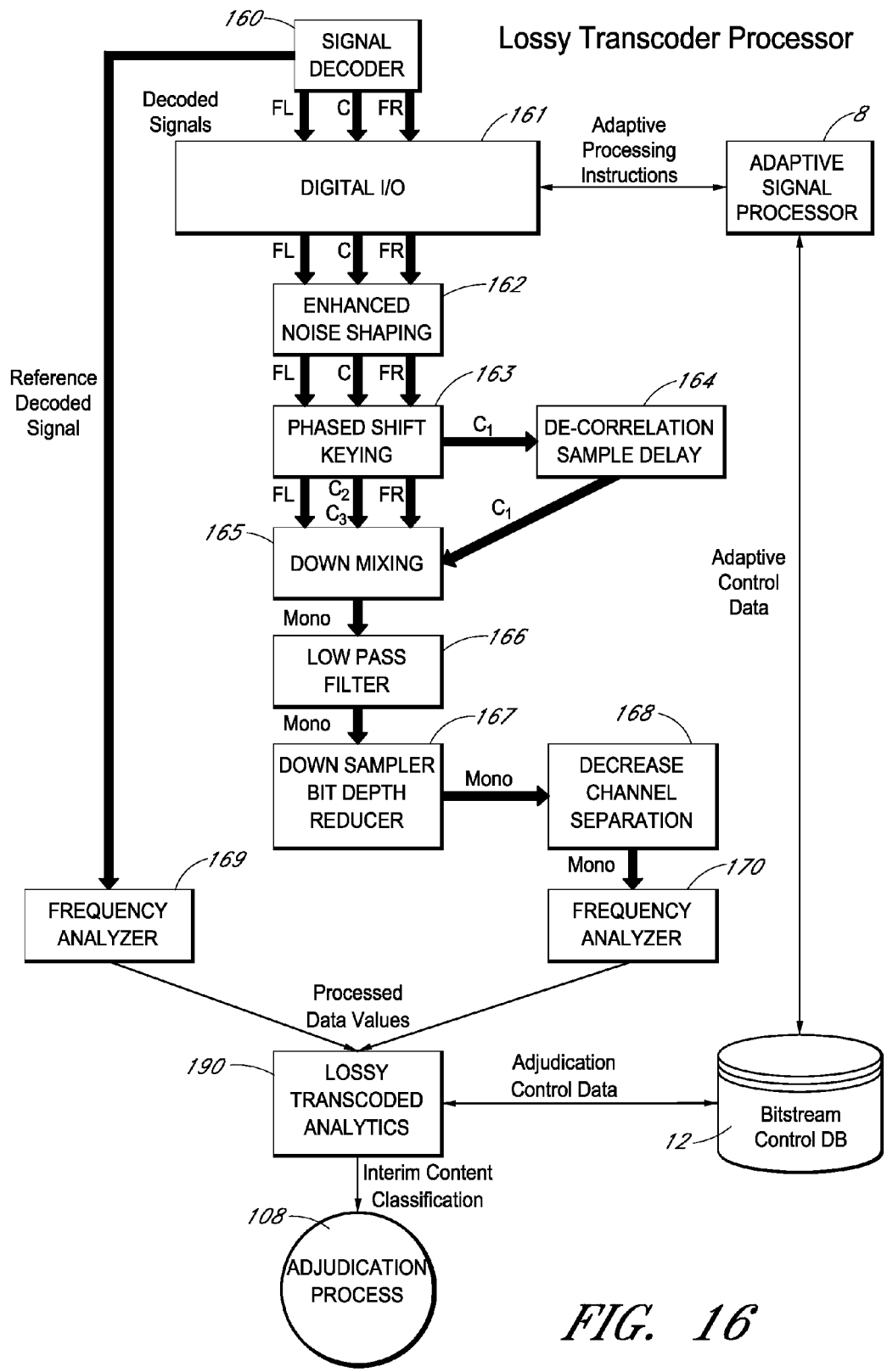
FIG. 16 is a block diagram of an example lossy transcoder processor.

In an example embodiment, such as that illustrated in FIG. 16, down sampling bit depth reducer module 167 down-samples the audio signal from 48 khz to 22 khz, although different amounts and frequencies of down sampling may be used. The transcoded non-commercial content may be made unable to be reproduced in the frequency spectrum by down-sampling at intentionally less than half the highest frequency of the reference signal of the first plurality of bit channels. Thus, down-sampling may be performed so as to sample at less than the rate specified as needed by the Nyquist-Shannon sampling theorem in order to be able to perfectly reproduce the sampled signal.

The transcoding method may utilize bit depth reduction as applied by the bit depth reducer module 167. For example the bit depth reduction may be from 24 bits to 8 bits, although other values and amounts may be used. The bit errors may be revealed in non-commercial content when the bit depth may be made less than the maximum tolerable loss of rate distortion as specified by the Nyquist-Shannon sampling theorem, which may enhance consistency in reproduction of commercial content relative to non-commercial content.

The transcoding technique may utilize a keyed dynamic upward compressor for increasing the amplitude below a threshold on a channel, such as the FL channel (although other channels may be used), which may decrease channel separation and may additionally stabilize the amplitude when discerning content originating in 5.1 surround format with discrete signals.

Many significant audio features that can be used to discern content type (e.g., commercial content, non-commercial content, emergency notification content, etc.) may be revealed in the frequency domain that is not available or readily apparent in the time domain, such as, aliasing, bandwidth, convergence, spectral energy, and symmetry. A spectral representation may be computed utilizing a discrete cosine transform (DCT) converting time domain signals into frequency domain signals utilizing, by way of example logarithmic wavelet frequency analyzers 169, 170, wherein the LF resolution control may be 10 Hz, utilizing 68 bands, "Q" width of 10.0, and response time (50 ms) for detected peaks, although other settings may be used.

Figure 12:
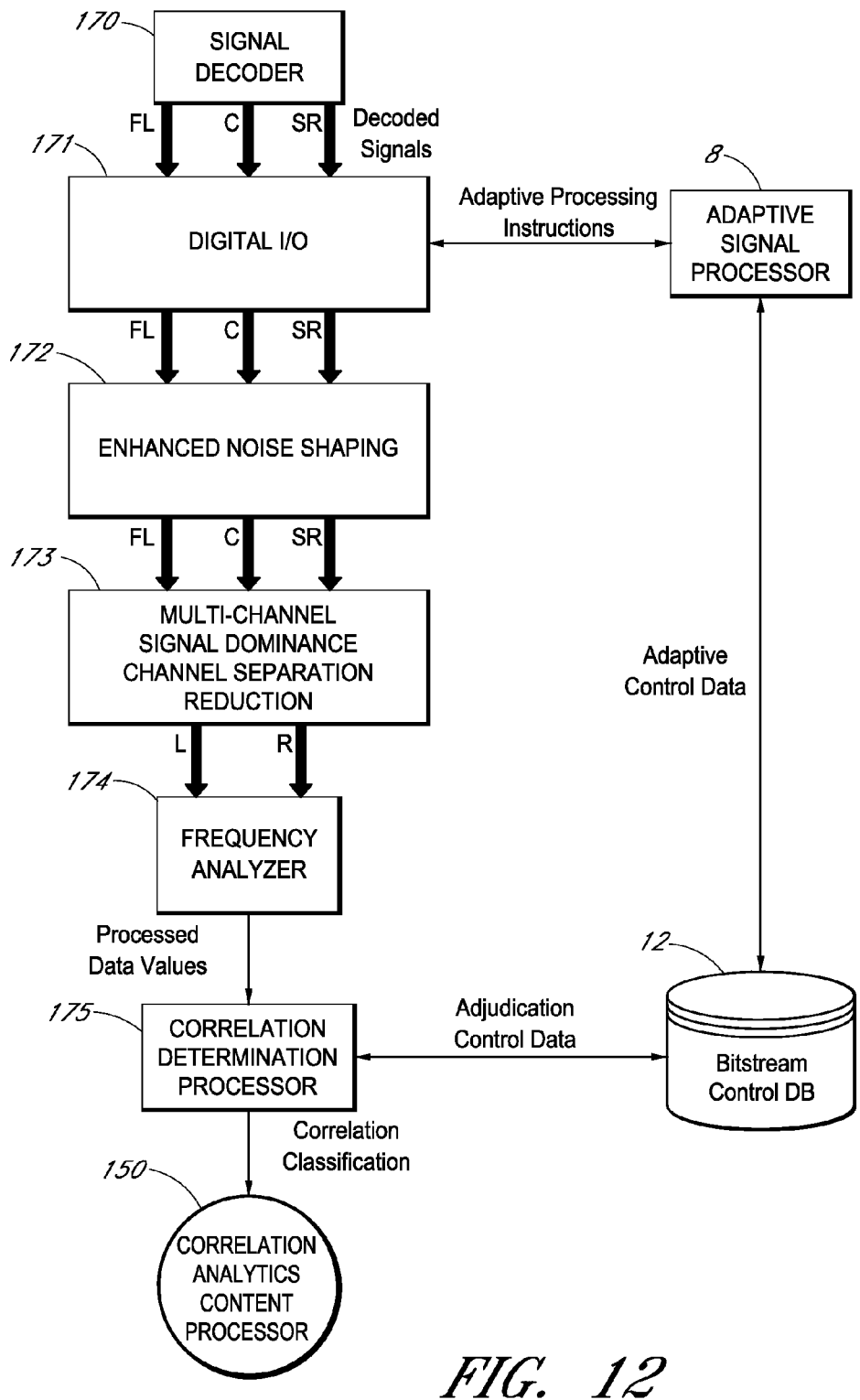
FIG. 12 is a block diagram of an example frequency correlation determination processor.

Referring to FIG. 12, in an example embodiment, frequency correlation may be utilized for discerning discrete and non-discrete signals within individual surround channels or pluralities of surround channels. For example, content originally produced in 2.0 stereo format may be up-mixed to 5.1 surround sound format within a decoder. When the frequency correlation is non-discrete the correlated signal processor (See, e.g., FIG. 14) may be utilized to determine the content, and when the frequency correlation is discrete non-correlated processing (See, e.g., FIG. 13) may be utilized to determine the content.

In an example embodiment, determining a unique combination of surround audio channels that may be input to the frequency correlation process may comprise selecting channels FL, C and SR, although other channels may be used.

Certain embodiments optionally utilize phase and amplitude modulation to change signal dominance 173 and channel correlation. By way of example, the constellation points may use FL 60>@unity gain, C<−100@+6.9 dB, SR<−100@+3 dB 173, while settings may be used.

Frequency correlation may reduce channel coding and redundant signal information. For example, as illustrated in FIG. 12, the FL, C and SR channels may be down-mixed 173 to a stereo LT/RT channel wherein a discrete wavelet transform DWT may be performed using wavelet spectrum analyzers 174.

Referring to FIG. 12, multi-mono wavelet frequency analyzers 174 may use the following settings, while other settings may be used: the LF resolution control may be 10 Hz, which may provide 68 frequency bands, "Q" (or width) of the bands may be set to 10.0 and may use RMS mode, where energy may be averaged over time, with a possible response value of (50 ms), a possible C-weighting curve and a possible amplitude range from −80 dB to 0 dB. The wavelet frequency analyzers 174 functional analysis may use a discrete waveform transform (DWT), but other techniques may be used.

Figure 14:
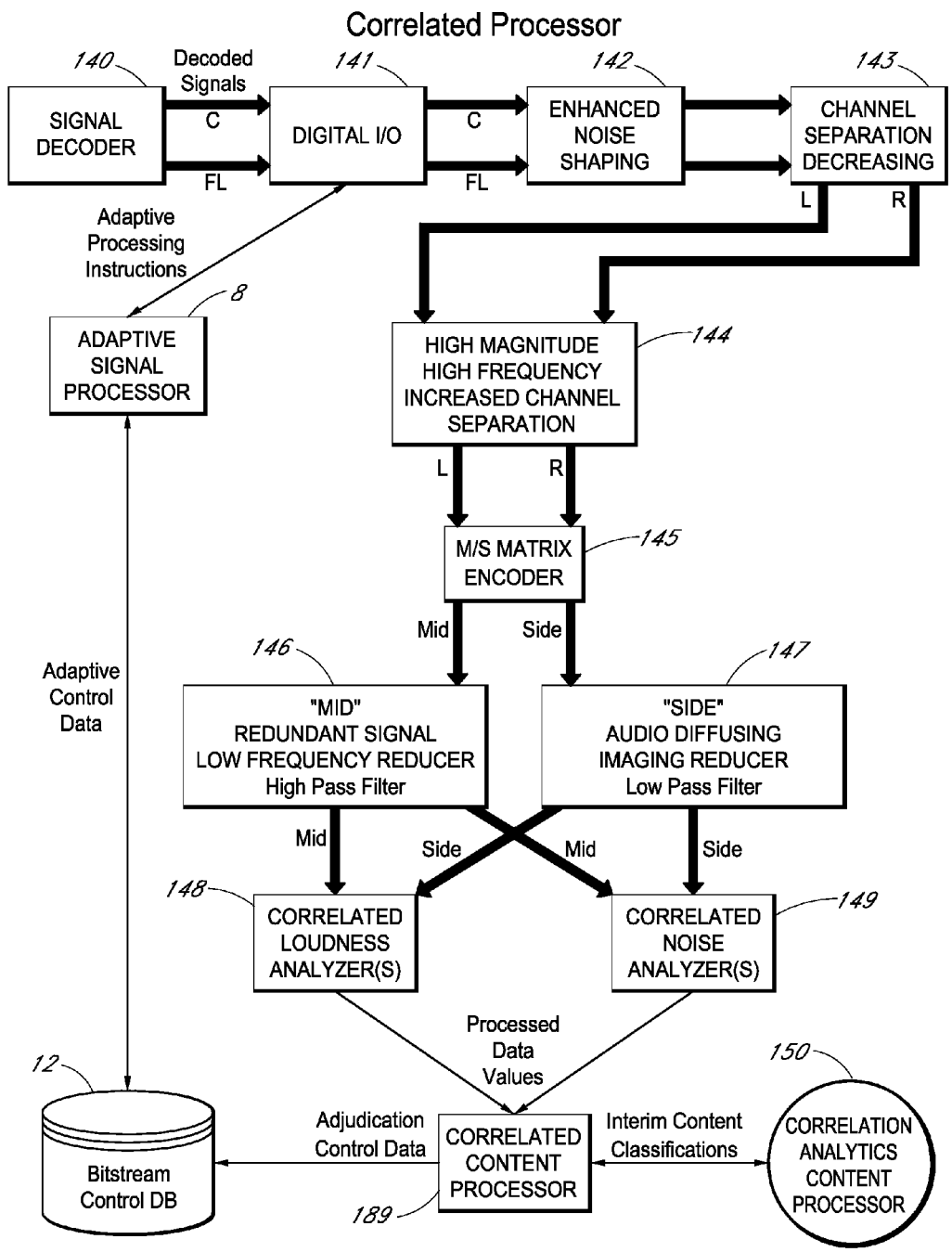
FIG. 14 is a block diagram of an example correlated processor.

Referring to FIG. 14, in an example embodiment if frequency correlation 175 determines the presence of non-discrete signals (e.g., content originally produced in stereo and upmixed to 5.1 surround) correlated signal processing may be used for discerning content type.

The determined unique combination of surround audio channels input to the correlated signal processor may comprise channels FL and C, while other channels may be used.

Channel separation may be decreased in the correlated processor 143 by modulating phase and amplitude in a plurality of channels using constellation points; settings may be as follows: FL 30>@+3 dB, C<−100@−7 dB by way of example, while other constellation points and settings may be used.

Channel coding may be reduced in the correlated processor by down-mixing the FL and C channels to a stereo L/R channel for processing.

Signal relative dominance may be determined in correlated processing when signal dominance falls below the point where it may no longer be necessary to use directional enhancement high pass filter 146 by applying a peak-detecting compressor with side chain high pass filtering and may use a mid-level amplitude threshold for correlated signal processing, although other techniques for determining signal relative dominance may be used.

MID/SIDE (M/S) matrix encoding may be utilized in the correlated processor 150. For example, the FL and C signals may be independently processed as L (mid) and R (side) signals in the time domain, although other channels may be used.

Redundant mono signals and low frequency signals may be substantially removed by applying a reverse polarity, amplitude modulation and high pass filtering 146 to the MID side signal components for correlated signal processing. For example, the following or other settings may be used: L (mid) input@−7.5 dB, polarity inverted to (−), FREQ 297 hz@+2 dB, Q=5.2, output@−3 dB.

Correlated processing may apply low pass filtering to the SIDE signal component 147. For example, the following or other settings may be used: R (side) input@ unity gain, FREQ 250 hz@−3 dB, Q=7.0, FREQ 210 hz@−2 dB, Q=5.2, output@unity gain.

M/S matrix encoding 145 may be applied to the correlated processor for independently analyzing "mid" and "side" signal components of the signal noise analyzer and loudness analyzers. For example, the following or other settings may be used:

M/S correlated signal noise analyzer 149: RMS detection, A-weighted.

M/S correlated loudness PK/RMS analyzer 148: utilizing L (mid) input, RMS detection, B-weighted, 55 ms response.

M/S correlated loudness PK/RMS analyzer 148: utilizing R (side) input, RMS detection, C-weighted, 55 ms response.

The analysis of the correlated analyzers 148, 149 may compare Peak and RMS (PK/RMS) differences over time, such as amplitude and Mid/Side. For example, if MID-RMS and SIDE-RMS signals are relatively consistent and the difference in amplitude ratio remains relatively small the outcome may be more than likely a commercial, if ratios trend toward inconsistent the outcome may more likely be a program. Other techniques, such as those disclosed elsewhere herein, may be used as well.

Figure 13:
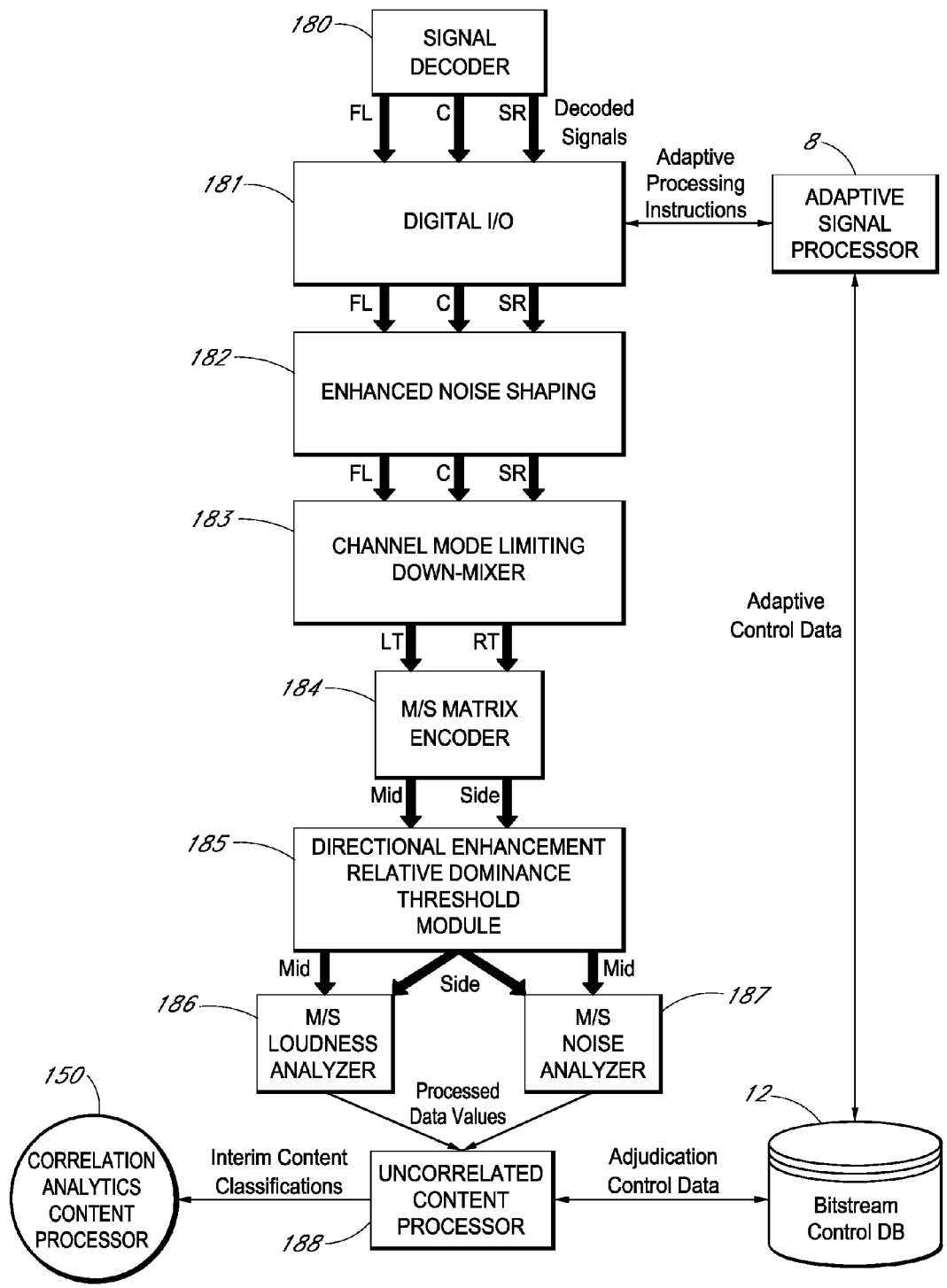
FIG. 13 is a block diagram of an example non-correlated processor.
Figure 15:
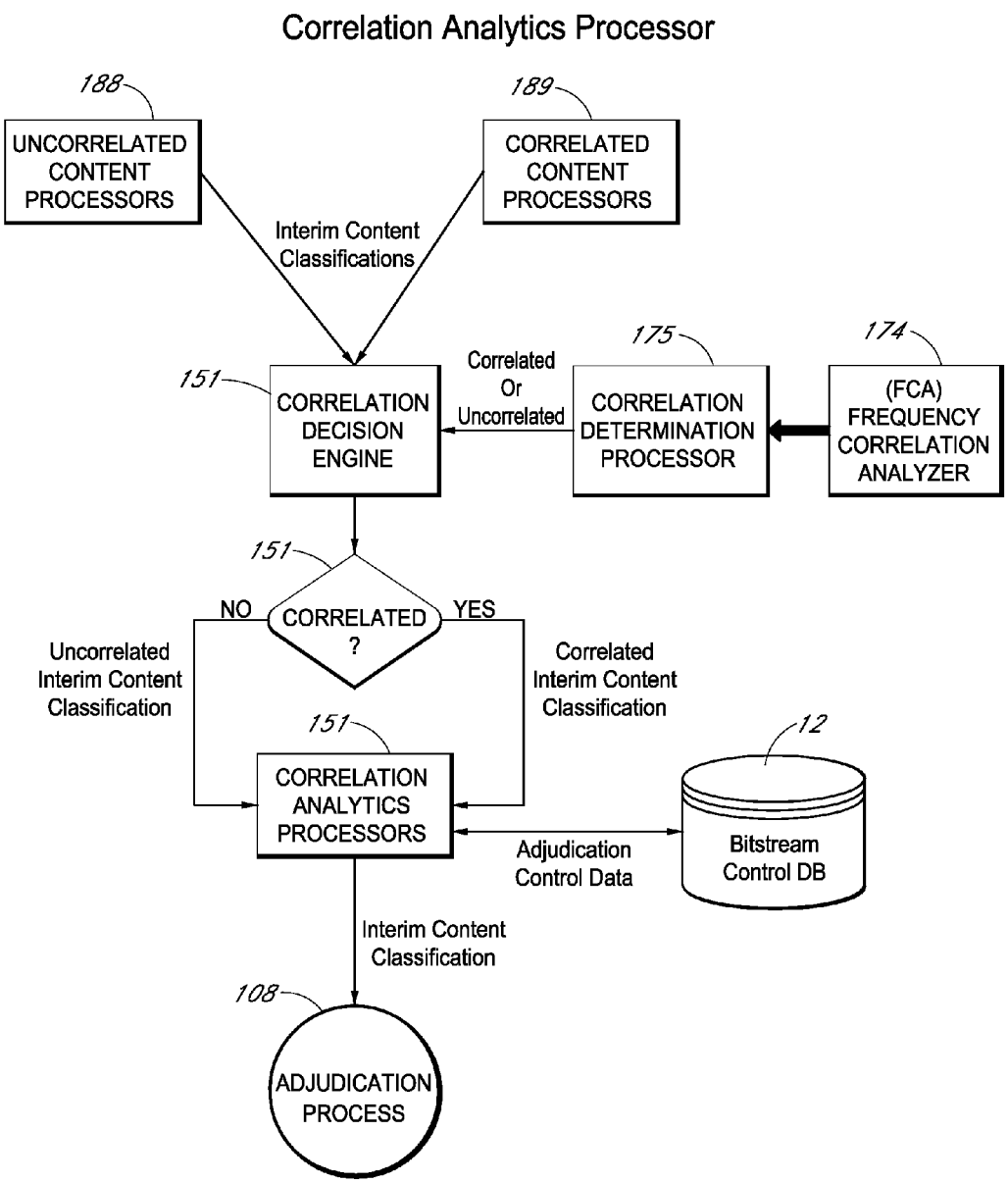
FIG. 15 is a block diagram of an example correlation analytics processor.

Referring to FIGS. 13 and 15, in an example embodiment if a frequency correlation determination processor 175 determines the presence of discrete signals (e.g., such as content originally produced in 5.1 surround and decoded in 5.1 surround,) un-correlated signal processing may be used to discern content type.

Unique combination of surround audio channels input to un-correlated signal processing may comprise channels FL, C and FR, while other channels may be used.

Referring to FIG. 13, the uncorrelated processing may reduce channel coding by down-mixing (using the down mixer 183) the FL, C and FR channels to a stereo L/R channel for processing, while other options may be used.

The uncorrelated processor may utilize dynamic signal processing and filters, wherein if signal magnitude increases, un-correlated processing may apply increased separation to high frequencies by utilizing an RMS detecting compressor with side chain low pass filter that may remove outlier signals e.g. music and sound effects.

The uncorrelated processing may apply M/S matrix encoding using encoder 184 for independently analyzing "mid" and "side" signal components of the signal noise analyzer 187 and loudness analyzers 186. The following settings, or other settings, may be used:

M/S stereo signal noise analyzer 187: RMS detection, A-weighted, slow response.

M/S Loudness PK (peak)/RMS (root mean square) analyzer 186: utilizing L (mid) input, RMS detection, A-weighted, 55 ms response.

M/S Loudness PK/RMS analyzer 186: utilizing R (side) input, RMS detection, C-weighted, 55 ms response.

The analysis of the uncorrelated content processor(s) 188 may compare PK/RMS differences over time, such as amplitude. For example, if it is determined that MID-PK and MID-RMS signals trend towards consistent (e.g., with variations less than a first specified threshold) and the difference in amplitude ratio trends toward relatively small changes (e.g., less than a specified threshold), the analysis may identify that content as a commercial. If the ratios trend toward inconsistent (e.g., with variations greater than a second specified threshold) the analysis may identify that content as a program. Other techniques may be used, as described elsewhere herein.

Adjudication Analytics Processor (AAP)

Figure 11:
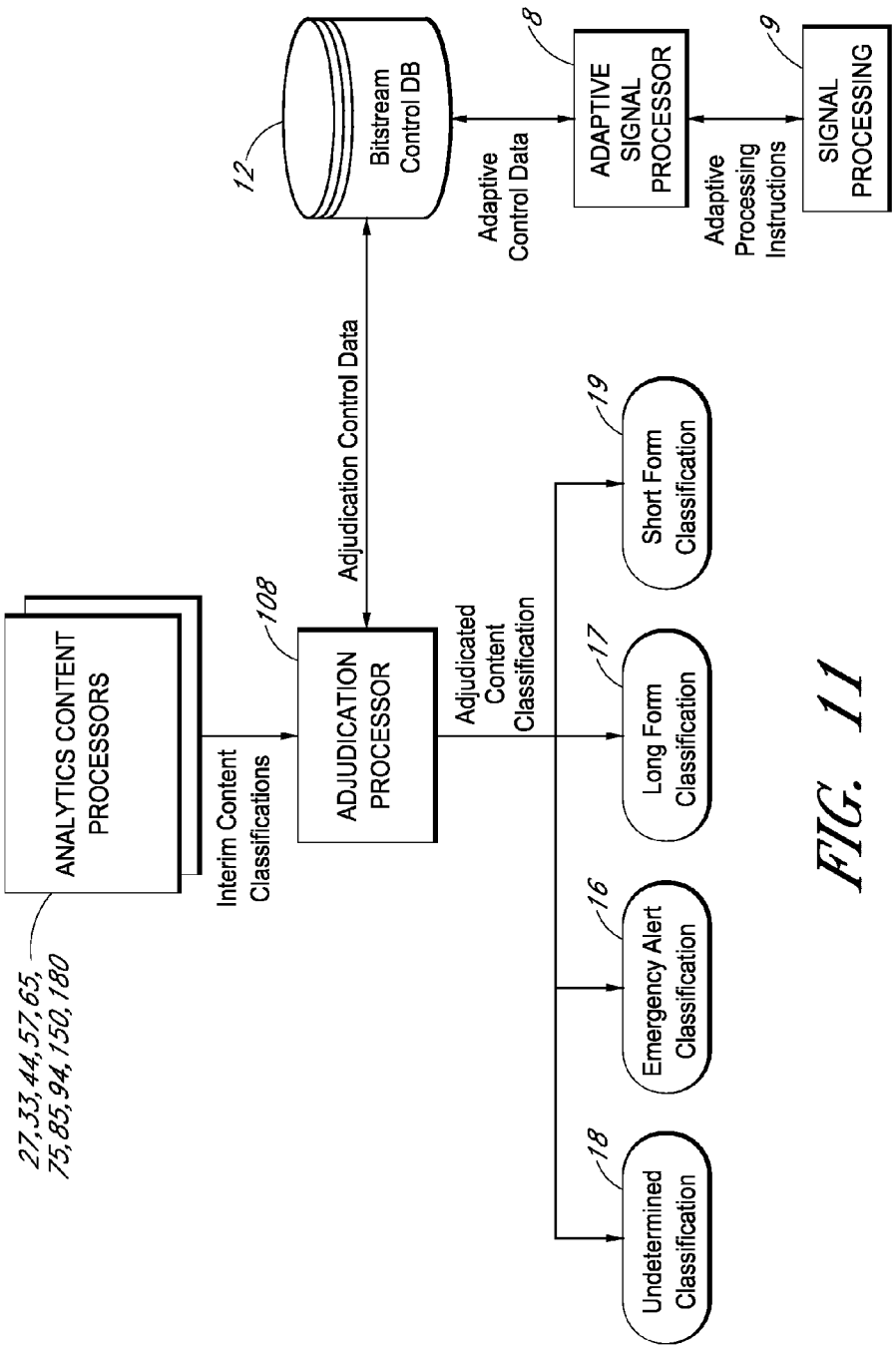
FIG. 11 is a block diagram of an example adjudication processor.

Referring to FIG. 11, during processing, one or more analytic content processors (ACPs), hereafter referred to as ACP 27, 33, 44, 57, 65, 75, 85, 94, 150, 180, may produce interim content classifications representing the results of individual analytics. In certain embodiments, systems and methods are provided to efficiently collate interim content classifications to arrive at a discrete final content classification (e.g., indicating commercial or non-commercial content). As discussed elsewhere herein, certain of the ACPs may be configured to detect certain types of content, such as emergency alert content or applause content.

Adjudication may generally be considered a set of one or more processes configured to derive a final content classification from a plurality of interim content classifications.

In an example embodiment, the adjudication analytics processor, hereafter referred to as AAP 108, may acquire and store interim content classifications within temporal sample datasets (TSD) where statistical and probability analysis may be performed.

In an example embodiment, an adjudication process may comprise subdividing interim content classifications, utilizing time and frequency domain analytic properties that may determine a non-weighted, time invariant final content classification. A sub-group may represent interim content classifications that may be grouped by signal noise, M/S, correlated and/or lossy transcoding. Sub-groups may be non-weighted and may be time invariant.

The adjudication analytics processor may detect and utilize the majority classification derived from the sub-groups to determine the final classification. If the final content classification majority is undetermined (e.g., less than half assign a certain classification), a lossy transcoded sub-group may be used to look-back in time or the lossy transcoded sub-group may forego utilizing a reference signal and refer to itself to derive a final content classification, although other techniques may be used.

In an example embodiment a second adjudication technique may be used in addition or instead, and may utilize a process of applying weighting values to respective interim content classifications. For example, the weightings may indicate accuracy, perform probability calculations and may arrive at a final content classification. Weighting values may be periodically or continually updated based upon comparing individual interim content classifications to the final content classification. Because multimedia content may be complex and unstable, a single weighting value for each interim content classification may not be sufficient. An option that may increase the effectiveness of the AAP 108, may be to utilize one or more weighting values for each interim content classification, where each weighting value may represent a different multimedia condition, such as outliers. Interim content classifications, final content classifications, weighting values and other data as deemed necessary, may be stored within the Bitstream Control Storage Device 12, which may include a database. While this may be one possible methodology to determine the Final Content Classification 16, 17, 18, 19, others may be utilized. The details of the embodiment may be described below.

In an example embodiment, a content classification transformation function may convert each TSD entry into Short Form and Long Form Probability Content Sets that may be used to simplify the probability calculations, however others may be used.

Where
{S1, S2 . . . Sn}=Short Form probability set
{L1, L2 . . . Ln}=Long Form probability set Because each ACP 27, 33, 44, 57, 65, 75, 85, 94, 150, 180 may produce a different content classification, probability theory may be used in determining which content classification (SF 19 or LF 17 classifications) may be more likely. The Final Content Probabilities (FCP) for SF and LF may be determined in accordance with equations (80):

$$\{S_1, S_2, \ldots, S_n\}$$

$$\{L_1, L_2, \ldots, L_n\}$$

$$\{W_1, W_2, \ldots, W_n\}$$

$$P_{S_F} = \frac{\left(\sum_{i=1}^{N} W_i S_i\right)}{\left(\sum_{i=1}^{N} W_i\right)}$$

$$P_{L_F} = \frac{\left(\sum_{i=1}^{N} W_i L_i\right)}{\left(\sum_{i=1}^{N} W_i\right)}$$

Where
S=Set of values corresponding to each ACP identified as SF where SF=1, LF=0
L=Set of values corresponding to each ACP identified as LF where SF=0, LF=1
W=Set of weighting values (representing the accuracy percentage) for each ACP based upon historical testing, typically between 0 and 1
PSF=Final Probability set for Short Form content
PLF=Final Probability set for Long Form content In an example embodiment, the discern content-type function (DCF) may determine the Final Content classification (FCN) for a given FCP value by comparing FCPs of SF and LF that fall within a defined or specified variance amount/range. A variance amount may be utilized to manage conditions where the probability of SF 19 and LF 17 may be similar and therefore difficulties may arise with making a determination with any degree of certainty. If the SF 19 and LF 17 classifications fall within the variance amount, assigning an undetermined (UD) classification 18 may provide an advantage. If a UD 18 is indicated, the DCF may utilize historical classification data to select the first SF or LF content classification within a Final Bitstream Control Database 12.

There may be special cases where the DCF may override the FCN and may set a special FCN. For example, if the DCF receives a positive indication from the Emergency Action alert system signal analyzer 94 (see also FIG. 10), the DCF may override some or all other determinations and set the FCN as an EA classification 16 to indicate Emergency Alert. If the DCF receives a positive indication of Applause from an ACP 85 (see also FIG. 9) the DCF may override the probability content and set the FCN to a LF classification 17. The definition of DCF algorithms may vary between embodiments and other DCF algorithms may be used. The DCF may determine the FCN for each TSD in accordance with the following equations (81):

FC=SF(If PSF−*V*>PLF)

FC=LF(If PLF−*V*>PSF)

FC=UD(IF PSF−PLF<*V*)

Where
V=Probability variance, typically between 0 and 1.
PSF=Final Probability set for Short Form
PLF=Final Probability set for Long Form
FC=Final content classification
LF=Long Form
SF=Short Form UD=Undetermined, all undetermined values may be resolved to either a LF or SF value except the 1st TSD value and potentially the 1st TSD value after a transition may remain as UD The AAP 108 may utilize additional analytics depending on whether the analysis occurs in substantially real-time (e.g., with a few seconds or less than a second of receiving a program signal, such as for live television) or non-real-time (e.g., for a pre-recorded program, such as on a DVR). After adjudication, the following procedures may be utilized to manage transition and outlier events for real-time and non-real-time post processing analytics. Outlier events typically occur during transitions, such as scene transitions, (but may occur at any time) when content classifications may rapidly vary. Multiple procedures may be provided to better control the transition and outlier events and may differ for real-time and non-real-time.

For example, it may be advantageous when analyzing live content to limit how frequent the content classification may be allowed to change. This may be accomplished by instituting a "delay time" which may force the content to remain constant until the time specified has elapsed. By way of further example, it may be advantageous to hold a content change event constant with the new classification for a period of time before the change may be recognized as a true content change. This may prevent outlier events, such as bursts of dynamic range that may last for a few seconds and inadvertently cause an interim content classification switch. This period of time may be referred to as the "minimum change-time". Real-time analytics may be utilized independently or in concert and the definition of real-time analytics may vary between embodiments and other real-time analytics may be used.

When analyzing non-real-time content, a "look-back" and "look-ahead" function may be utilized to learn from the past, future or both, which may assist with the final content determination. Various processes may be employed when looking backward and forward and care should be taken to utilize the correct processes to prevent potential faulty determinations. For example, one example process when looking forward may be to first identify any outlier and/or transition events and stop the look-ahead prior to these events. Identifying the correct look-ahead timeframe may be helpful in increasing the probability of correctly determining the current content classification.

In another scenario it may be desirable to use analytics to identify a transition event utilizing the past and future content classifications to simultaneously converge towards the center from both the past and the future and therefore "zero-in" on the time frame of the transition.

Determining whether an event is an outlier event or a transition event may utilize look-ahead and look-back analytics. For example, if the content classifications both before and after the event in question may be the same, the event may be an outlier. On the other hand, if the content classifications before and after are different, the event may be a transition. Non-real-time analytics may be utilized independently or in concert and the definition of non-real-time analytics may vary between embodiments.

In an example embodiment, the AAP 108 may continually improve the accuracy of individual ACPs by generating corrective rules for known signal data conditions that consistently over time, may produce incorrect and/or undetermined interim content classifications. Corrective rules may transform SF to LF, LF to SF, UD to SF and/or UD to LF. Corrective rules may be added to a library stored in the Bitstream Control Storage Device 12 and incorporated into individual ACPs for future processing. Corrective rules may be categorized by a number of parameters, such as ACP name, viewing or listening channel and signal properties.

In an example embodiment, adjudication may resolve undetermined content classifications by utilizing a look-back function and additionally while in batch processing mode utilize a look-forward function.

Adaptive Signal Processor (ASP)

Referring now to FIG. 11, the algorithm for the Adaptive Signal Processor, hereafter referred to as the ASP, may improve the accuracy of the data produced 11 and subsequently utilized by the various analytic control processors 27, 33, 44, 57, 65, 75, 85, 94, 150, 180 by using data gathered over time from analytics and signal processors stored within the Bitstream Control Storage Device 12 to derive changes for one or more signal processing routines executed by signal processor(s) 9. The ASP 8 may operate in a real-time mode and/or a batch mode.

In an example embodiment, while in a real-time mode the ASP 8 may resolve outlier conditions by determining which outlier signal processors to utilize and sending this information to the signal processor(s) 9 producing the outlier conditions. This may be accomplished by categorizing the current outlier condition and then analyzing available outlier solutions that may apply, selecting the appropriate outlier solution and sending the outlier solution to the signal processor(s) 9 that then may implement the selected outlier solution. When the outlier condition no longer applies, the ASP 8 may provide instructions to the signal processor(s) 9 to discontinue the use of the outlier solution and reinstate normal signal processing. Optionally, instead, while one outlier solution may be engaged a new outlier condition may be detected. The ASP 8 may then send a new outlier solution to the same or different signal processors 9.

In an example embodiment, while in a real-time mode the ASP 8 may elect to store within the bit stream control storage device 12, a temporal duration of a bit stream that may represent an outlier condition. By storing the outlier bit stream the ASP 8 may later be engaged to engage signal processor outlier resolution processing.

In an example embodiment, outlier resolution processing may include continuously adapting the ASP 8 to new outlier conditions and over time may increase the accuracy of content classifications. Optionally, this may be accomplished by iteratively replaying an outlier bit stream, retrieved from the Bitstream Control Storage Device 12, and applying rules to modify signal processing settings. The interim classification from the respective ACP may be compared to the desired classification and signal processing settings may be changed for the next iteration. This process may continue until either the desired classification may be achieved or all setting changes may be exhausted. If the desired classification is achieved the signal processing settings for that particular outlier condition may be stored within the Bitstream Control Storage Device 12 where it may later be retrieved to automatically resolve the outlier condition.

Lossy Transcoded Content Analytics

Referring to FIG. 16, the Lossy Content Identification Analytics (LCIA) 190 may acquire data (e.g., on a per frame basis) from one or more Discrete Wavelet Transform (DWT) spectrum analyzers 169, 170. The analytics may utilize bit-error rate, bandwidth, aliasing, symmetry and/or spectral energy data to derive interim content classifications by comparing the lossy transcoded signal data to the non-processed reference signal data and/or comparing the lossy transcoded signal to itself.

Content-type may optionally be discerned by comparing the bit error rate (BER) of the lossy transcoded signal to the non-processed reference signal. The bit error rate, or bit error ratio (BER) may be the number of bit errors divided by the total number of transferred bits during a studied time interval. BER may be a unit less performance measure, often expressed as a percentage number.

The BER may be defined in accordance with equation (35):

$$BER = \frac{E}{B}$$

Where
E=Number of errors
B=Total number of bits sent
BER=Bit Error Rate

In an example embodiment, the (BER) may be calculated in the frequency domain using spectral signal characteristic statistical analysis techniques, comparing the transmitted (reference signal) sequence of bits to the received (lossy transcoded signal) bits and counting the number of errors. The ratio of how many bits received in error over the number of total bits received may be the BER.

In an example embodiment, if the two audio signals represent advertising content, the associated BER values may also be very similar (e.g., the bit patterns of the respective values should be similar (but not necessarily identical)). In particular, if the audio signals represent advertising content, when values for the reference signal and for the lossy transcoded version of that content are calculated, the values should be similar. On the other hand, if two signals represent non-advertising content, the BER should be able to distinguish the two signals as being materially different.

In an example embodiment, to increase the robustness of a BER, the content analytics may derive bits from robust features (e.g., statistics that may be, to a large degree, invariant to processing). Robustness may be expressed by the Bit Error Rate (BER), which may be defined as the number of erroneous bits (compared to the bits extracted from the original content) divided by the total number of bits.

In an example embodiment, the process of measuring BER may comprise sending bits through the system and calculating the BER. Since this may be a statistical process, the measured BER may only approach the actual BER, as the number of bits tested approaches infinity. However, in most cases the BER may be less than a predefined threshold. The number of bits desired to accomplish this may depend on the desired confidence level and BER threshold. The confidence level may be the percentage of tests where the lossy reference signal BER may be less than the specified lossy transcoded BER. Since it is impractical to measure an infinite number of bits and it may be impossible to predict with certainty when errors may occur, the confidence level may never reach 100%.

The confidence level (CL) may be derived using the equation:

$$CL = 1 - e^{-N_{bits} * BER}$$

Content-type may be discerned by employing multiple methods such as, comparing the symmetry ratio of the lossy transcoded signal to a boundary condition and/or measuring the amount of periodicity, or repeating patterns of frequency and amplitude occurring within the transformed signal values and the reference signal values.

In an example embodiment, the symmetry ratio may be determined by first identifying and marking each peak where the height from trough to peak may exceed a predetermined value which may be set to number greater than or equal to noise, or margin of error amount. The following step may be to measure the distance between each peak and the distance between each trough, which may then be loaded into a symmetry table for later processing. The symmetry table may be processed whereby the distances between peaks and/or troughs may be grouped and the grouping with the largest number of occurrences (symmetry count) may be selected. The symmetry ratio may be determined by dividing the symmetry count by the total number of frequencies measured. The higher the symmetry ratio the greater likelihood the content may be a commercial (SF) and conversely, the lower the symmetry ratio the greater the likelihood the content may be a program (LF).

In an example embodiment, the symmetry periodicity may be determined using one or more techniques. One such example technique may comprise comparing the lossy-to-lossy transcoded signal to the reference signal whereby the similarity of dB, peaks, troughs and/or slopes may be measured and expressed as a number (e.g., between 0 and 1, where 1 may indicate no symmetry and 0 may represent absolute symmetry between the transcoded and reference signals).

In an example embodiment, another example technique may be to take the absolute value of the difference between the transcoded signal and the reference signal for each frequency specified, add the differences and divide by the total of the total range times the number of frequencies measured. If desired, the calculation may be applied on a per frequency basis to derive at the percentage of symmetry for each frequency. Another optional technique may calculate and utilize the median symmetry value (over the frequencies) or the average, which may indicate the overall symmetry for the entire frame.

In an example embodiment, the symmetry values may optionally be processed on a per frame basis and then utilizing time; apply a variety of statistical models, such as, by way of example averaging, standard deviation and/or others. In addition, numerous methods may be employed to process outlier symmetry conditions so they minimize or reduce their impact on the symmetry results. One example process ignores or discards symmetry values that deviate from the moving average or moving mean by more than an outlier boundary percentage. This may enable the moving average or moving mean continue to move but large changes may be ignored and therefore may not move the averages or means by an unrealistic amount. The symmetry values may generally be derived where:

F=Frequency set
X=Total number of frequencies in set F
LV=dB value set for the Lossy-to-lossy transcoded signal at each frequency within the frequency list (F)
RV=dB value set for the Reference signal at each frequency within the frequency list (F)
ST=Symmetry differential total
R=Maximum dB range being measured
SP=Symmetry percentage
For each item in set F
ST=ST+(abs(LV(i)−RV(i))
End Loop
SP=ST/(R*X)

In an example embodiment, the content may be determined through analysis and with a general understanding that the closer the symmetry may be to 0 the greater the likelihood the content may be a commercial (SF) and the closer the symmetry may be to 1 the greater the likelihood the content may be a program (LF).

The value of symmetry boundary conditions that determine a program (LF) or commercial (SF) may be determined during implementation and testing and highly dependent upon the details of the implementation and the quality of the equipment and efficiency of the software algorithms devised. The same may apply when determining the outlier boundary percentage.

Content-type may be discerned by employing multiple methods such as, comparing the spectral convergence of the lossy transcoded signal to a boundary condition and/or comparing the spectral convergence of the lossy transcoded signal to the spectral convergence of a reference signal. Spectral convergence may generally be described as measuring the number of adjacent frequencies within signal(s) where dB values for frequencies within each signal may fall within a tolerance amount.

In an example embodiment, the closer the convergence value may be to 0 the greater the likelihood the content may be a commercial (SF), and conversely the larger the convergence value the greater the likelihood the content may be a program (LF).

In an example embodiment, depending on the method chosen to measure spectral convergence, the convergence values may have a relatively large range and only through implementation and testing may the final range and boundary energy values be determined.

Content-type may be discerned by employing one or more techniques such as by comparing the spectral energy of the lossy transcoded signal to a boundary condition and/or comparing the spectral energy of the lossy transcoded signal to the spectral energy of a reference signal. Spectral energy may generally be described as measuring the amount of deviation (e.g., in dB), at each frequency, from a mean of values (e.g., the dB values). Another way of expressing spectral energy; spectral energy may measure the amount of energy concentrated around a mean value (e.g., the dB mean value). Multiple techniques exist to calculate the deviation. For example, one technique uses the standard deviation using the sum of squares.

In an example embodiment, the spectral energy for the lossy transcoded signal may be subtracted from the spectral energy of the reference signal and the differential may be used to derive the content classification.

In an example embodiment, the closer the spectral energy value may be to 0 the greater the likelihood the content may be a commercial (SF), and conversely the larger the spectral energy value the greater the likelihood the content may be a program (LF).

In an example embodiment, depending on the method chosen to measure spectral energy, the energy values may have a relatively large range and only through implementation and testing may the final range and boundary energy values be determined.

Content-type may optionally be discerned by comparing the spectral bandwidth loss of the lossy transcoded signal to a boundary condition and/or comparing the spectral bandwidth loss of the lossy transcoded signal to the spectral bandwidth loss of a reference signal. Spectral bandwidth loss may generally be described as measuring the percentage of signal lost for the largest trough to peak value (e.g., dB value) within each signal. Another way of expressing spectral bandwidth loss; spectral bandwidth loss may measure the inability of the transcoded signal to reproduce the largest dynamic range within the reference signal. Multiple methods may exist to calculate the spectral bandwidth loss; however, one such method may be to use the standard percentage of loss method where:

LF=set of frequency/dB values for a lossy transcoded signal
RF=set of frequency/dB values for a reference signal
X=total number of frequencies in set RF and LF
LM=max bandwidth for a lossy transcoded signal
RM=max bandwidth for a reference signal
BLP=Bandwidth loss/gain percentage
RM=Max (trough to peak range within set RF)
LM=peak dB—trough dB at RM frequencies
BLP=LM/RM In an example embodiment, the spectral bandwidth loss percentage may be used to derive the content classification such that the closer the spectral bandwidth loss percentage may be to 0 the greater the likelihood the content may be a program (LF), and conversely the larger the spectral bandwidth loss value the greater the likelihood the content may be a commercial (SF). The spectral bandwidth loss for a commercial (SF) may even exceed 1, indicating the lossy transcoded signal gained bandwidth, while this tends to be a rare condition for programs (LF).

In an example embodiment, depending on the method chosen to measure spectral bandwidth loss, the values may have a relatively large range and testing may be used to determine the final range and boundary energy values.

The Lossy Content Identification Analytics (LCIA) 190 process may acquire data (on a per frame basis) from DWT-PK and DWT-RMS. The LCIA may utilize a frame offset property; where the current frame of DWT-PK may be compared to the previous frame DWT-PK and the current frame DWT-RMS may be compared to the previous frame DWT-RMS. The LCIA may expose unique properties (by comparing previous and current frames of frequency information.) that may lead to an identification of content type (e.g., program, commercial or undetermined). Other techniques may be used as well.

During the analytics, over a predefined number of frames, programs may tend to illustrate statistical properties of greater differences and commercials may tend to illustrate properties of greater consistencies.

In an example embodiment, the LCIA 190 may acquire frequency and amplitude data pairs (FADP) from past and present on a per frame basis. For a given frame, the FADPs (e.g., across a predefined set of frequencies) may be grouped (for ease of reference) within a Data Group (DG). The number of frequencies may be variable, however, one such method may for example be to defined 55 frequencies spread over the spectrum beginning at 88 hz and ending at 15,750 hz.

The FADP values within a given DG may be analyzed using a variety of statistical and probability functions (over a multistage process) to determine the number of peaks, troughs and waveform similarities and differences, which may, over time, result in a final classification determination of program, commercial or undetermined.

In an example embodiment, the frequency similarities and differences for the DWTs may be determined over any number of frames. The accuracy may increase as the number of frames utilized for processing a given identification increases and conversely the accuracy may decrease as the number of frames approach 1. One such example time frame may be 3 frames.

It may be assumed that both DWT-PK and DWT-RMS produce updated frequency signatures for a given frame.

Stage 1: Gather FADPs for Processing.

FADPs for both DWT-PK and DWT-RMS may be received on a per frame basis. For a given frame the FADPs for the previous frame may be recalled, and both the previous and current frame FADPs may be available for processing. For simplicity purposes, the current and past DWT-PK and the current and past DWT-RMS may be collectively referred to as Multi-Frame Based DWTs.

For example: for time-code 01:00:37:14

DWT-PK & DWT-RMS (current frame) values may be received. The DWT-PK and DWT-RMS values for time-code 01:00:37:13 (previous frame) may be recalled to allow previous frame values to be compared with current frame values.

Stage 2: Locate and mark frequencies where peaks and troughs may occur. In an example embodiment, a method of detecting peaks and troughs may involve utilizing the general peak and trough technique described herein. The process of locating and marking peaks and troughs frequencies may optionally be performed in the following order, current frame DWT-PK to previous frame DWT-PK and current frame DWT-RMS to previous frame DWT-RMS. This may produce two sets of DGs, one for Peak and one for RMS. During the peak and trough discovery process it may be advantageous to employ some or all of the following rules:

1) Ignore peaks and troughs that have an amplitude less than a tolerance amount.

2) Utilize the tolerance amount to remove outlier peaks and troughs.

The tolerance amount may optionally be specified as any dB value; however, one such example value may be about 3 dB. The tolerance amount may be determined during implementation and testing and may differ from implementation to implementation depending on quality of components and the quality of software.

Stage 3: Derive the slope angles for sides of peaks and troughs. In an example embodiment, one method of deriving the Slope Angle for both sides of a given Peak and Trough (SAP, SAT) within a DG may be by using the general slope angle technique described herein. The slope angles may be calculated for the multi-frame based DWTs.

Stage 4: Derive the hypotenuse length for sides of peaks and troughs. In an example embodiment, one method of determining the hypotenuse length may be to utilize the general hypotenuse length embodiment described herein. The Hypotenuse Length may be calculated for the Multi-Frame Based DWTs.

Stage 5: Derive a Correlation Classification and/or the confidence level for both Peak and RMS FADPs. In an example embodiment, the Multi-Frame Based DWT FADP Correlation Classifications may be derived by adding the Multi-Frame Based DWT assigned Sidon Sequence for a given FADP within a given DG thereby producing Sidon Results (e.g., which may be ranked as SSR1 through SSR8). The same or similar process may be performed for both the Peak and the RMS DWTs. Example SSRs may be defined as:

| SSR# | DWT-PK or DWT-RMS current Type | DWT-PK or DWT-RMS past Type | Correlation Classification |
|---|---|---|---|
| SSR1 | Trough | Trough | Correlated |
| SSR2 | Trough | Slope | Uncorrelated |
| SSR3 | Slope | Trough | Uncorrelated |
| SSR4 | Trough | Peak | Uncorrelated |
| SSR5 | Peak | Trough | Uncorrelated |
| SSR6 | Slope | Peak | Uncorrelated |
| SSR7 | Peak | Slope | Uncorrelated |
| SSR8 | Peak | Peak | Correlated |

In an example embodiment, the confidence level of a given correlation classification may be determined by deriving the sum of the areas of the triangle on a given side of the peak or trough (for a given FADP) for both Peak and RMS in accordance with the following.

Where:
PA=Peak Area
TA=Trough Area
TA or PA=Summed Area of Left and Right Triangles
TA or PA=($\frac{1}{2}$*($A1$*$B1$))+($\frac{1}{2}$*($A2$*$B2$))

The Multi-Frame based DWTs (PA or TA) may be divided to derive the percentage of similarity/difference between the two. The percentage of similarity/difference may then be assigned to a given FADP-CC and thus represent the confidence level (FADP-CL1-8).

Where:
N=FADP-CC occurrence number
FADP-CLn=PA(curr)/PA(past)
FADP-CLn=TA(curr)/TA(past)

A given embodiment may, or may not include the confidence level calculations.

Stage 6: Derive the frequencies that may be correlated or uncorrelated. In an example embodiment, many techniques may be used to derive the total number of correlated or uncorrelated frequencies, such as total number of frequencies, total for a given frequency band, percentage correlated to uncorrelated, or otherwise. An example embodiment may divide up the frequency bands using a logarithmic scale, determine if a given band may be correlated or uncorrelated, across a given number of bands total the number of correlated and uncorrelated and then subtract the total uncorrelated from the total correlated. Generally, it has been determined that programs may tend to produce negative values and commercials may tend to produce positive values.

For example, it has been determined that some programs may have −15 correlated frequencies and some commercials may have +24 correlated frequencies.

Analytics of DSP processing may produce outlier results. Therefore, certain embodiments comprise rules that may properly recognize and handle the outlier FADPs for Multi-Frame bases DWTs. In addition to outliers, other rules may be employed during analytics which may produce more consistent results.

Example rules are as follows, although other rules may be utilized

Rule#1: If a band tends to be equally correlated and uncorrelated the band may be categorized as uncorrelated.

Rule#2: Peaks and troughs that may be statistically considered within the pre-determined tolerance amount may be ignored.

Rule#3: If a flat-line peak condition may be encountered the peak may match anywhere along the flat-line.

Rule#4: If a peak or trough exists within the 1 DWT, however, for the other DWT the signals may be so soft they may be within the tolerance amount (or may not exist) then the peak and trough may not be evaluated and/or used in content classification.

Rule#7: If FADP values exist (e.g., greater than −80) within a band, however, a peak may not be located in either band the Slope and Area rules may be invoked.

Post rule engagement processing may continue and peaks and troughs for the Multi-Frame Based DWTs may be counted and a total of may optionally be produced in accordance with the following.

Where:
For a given FADP within both Peak and RMS DG:
PFc=FADP entry for Current DWT-PK
PFp=FADP entry for Past DWT-PK
RFc=FADP entry for Current DWT-RMS RFp=FADP entry for Past DWT-RMS
TDC=Counter of dual Trough conditions
TMC=Counter of Trough misses
PDC=Counter of dual Peak conditions
PMC=Counter of Peak misses
Incr=Increment the Field listed by 1
Example FADP Rules for both Peak and RMS DGs

| Fld1 | Op | Fld2 | Op  | Fld3 | Op | Fld4 | Incr |
|------|----|------|-----|------|----|------|------|
| PFc  | =  | SSR1 | And | PFp  | =  | SSR1 | TDC  |
| PFc  | =  | SSR1 | And | PFp  | <> | SSR1 | TMC  |
| PFp  | =  | SSR1 | And | PFc  | <> | SSR1 | TMC  |
| PFc  | =  | SSR8 | And | PFp  | =  | SSR8 | PDC  |
| PFc  | =  | SSR8 | And | PFp  | <> | SSR8 | PMC  |
| PFp  | =  | SSR8 | And | PFc  | <> | SSR8 | PMC  |
| RFc  | =  | SSR1 | And | RFp  | =  | SSR1 | TDC  |
| RFc  | =  | SSR1 | And | Rp   | <> | SSR1 | TMC  |
| RFp  | =  | SSR1 | And | RFc  | <> | SSR1 | TMC  |
| RFc  | =  | SSR8 | And | RFp  | =  | SSR8 | PDC  |
| RFc  | =  | SSR8 | And | RFp  | <> | SSR8 | PMC  |
| RFp  | =  | SSR8 | And | RFc  | <> | SSR8 | PMC  |

An example logarithmic scale to use for defining frequency bands may be as follows:

| Low band Frequency (hz) | High Frequency (hz) |
|-------------------------|---------------------|
| 62                      | 124                 |
| 125                     | 249                 |
| 250                     | 499                 |
| 500                     | 999                 |
| 1,000                   | 1,999               |
| 2,000                   | 3,999               |
| 4,000                   | 7,999               |
| 8,000                   | 15,999              |

The tolerance amount may be any dB value, however, for purposes of this embodiment 3 dB may be chosen.

A given embodiment may or may not include the out of phase correlation classifications within this calculation.

Stage 8: Derive the Intermediate (working) Identification (II) for a given DG. Many techniques may be used to determine if a series of Multi-Frame Based DWT DGs may be classified as a program, a commercial or undetermined content. An example technique utilizes a series of frames (e.g., 3 frames or other number of frames), creates a running total of both the Peak & RMS matches (correlated) and misses (uncorrelated), subtracts the total misses from the total matches, applies a tolerance amount, and derives the content identification. It has been determined that utilizing such a technique, programs may trend towards negative values while commercials may trend towards positive values. Another example technique may be to divide the total matches by the total misses thereby deriving a ratio. It has been determined that utilizing such a technique, programs may trend to ratios less than 1 while commercials may trend to ratios greater than 1.

The intermediate identification may optionally be derived in accordance with the following.
Where:
TMC=Total matches (correlated)
TMU=Total misses (uncorrelated)
DIFF=Difference (TMC−TMU)
MMR=Match/Miss ratio (TMC/TMU)
TA=Tolerance amount
TR=Tolerance ratio
II=Intermediate Identification
(Program, Commercial, Undetermined)
Abs=Function returning absolute value > If DIFF − TA > 0 Then
>   II = Commercial
> Else
>   If DIFF + TA < 0  Then
>     II = Program
>   Otherwise (within Tolerance)
>     II = Undetermined Alternatively or in addition:

> If MMR − TR > 1 Then
>   II = Commercial
> Else
>   If MMR + TR < 1 Then
>     II = Program
>   Otherwise (within Tolerance)
>     II = Undetermined A classification of "undetermined" may indicate the match/miss difference or match/miss ratio for the DG series resides within the defined tolerance. The tolerances for a given implementation may be determined during testing and may differ from implementation to implementation depending on quality of components and the software.

Stage 9: Remove "outlier" identification classifications and derive a final identification classification. In an example embodiment, various techniques may be utilized to remove outlier identification classifications (which may be introduced within signal processing) such as moving average, standard deviation, variance, and/or co-variance formulas, among many others. One such example technique may be to first average the match/miss difference (AMD) or average match/miss ratios (AMR) using a predetermined frame sample size.
Where:
n=Current Frame
x=Sample size for Average function
AMD=Average(DIFF over n: n+x)
AMR=Average(MMR over n: n+x)

The sample size may be determined during implementation and testing and may differ from implementation to implementation depending on quality of components and the quality of software.

One example technique to determine the Final Identification Classification (FIC) and in the process remove any outliers may be to compare the average Match/Miss Differences or average Match/Miss Ratios calculated (AMD, AMR) above allowing for a margin of error (MOE) in accordance with the following.
Where:
FIC=Final Identification Classification
MOED=Margin of Error for Differences
MOER=Margin of Error for Ratios > If AMD − MOED > 0 Then
>   FIC = Commercial
>   Else
>     If AMD + MOED < 0 Then
>   FIC = Program
>     Otherwise
>   FIC = FIC from previous frame Alternatively:

```
         If AMR - MOER > 1 Then
   FIC = Commercial
         Else
         If AMR + MOER < 1 Then
   FIC = Program
         Otherwise
   FIC = FIC from previous frame
```

The margin of errors may be determined during implementation and testing and may differ from implementation to implementation depending on quality of components and the quality of software.

Stage 10: Send the final identification classification (FIC) to the adjudication engine. In an example embodiment, as a given final identification classification (FIC) 610 may be derived, the classification may be sent to the adjudication engine, and a comparison with other identifications may be performed to derive a final identification for a given frame. Various techniques may be used to send a given FIC, such as, by way of example, object messaging.

Correlation Determination Processor (Analytics)

Referring to FIG. 15, the Correlation Determination processor 175 may apply a variety of statistical and probability functions to determine if the signals may be correlated or uncorrelated which may be sent to the Correlation Decision Engine 151 where one or more decisions may be performed that determine which interim content classifications may be sent to a correlation analytics processor.

In an example embodiment, the Correlation Determination Processor 175 may acquire left and right Frequency and Amplitude Data Pairs (FADP) from the Wavelet Frequency Correlation Analyzer(s) 174, at a given sample rate and may apply a variety of statistical and probability functions (over a multi-stage process) to determine the correlation between the left and right FADPs, which may result in a correlation determination of correlated or uncorrelated.

In an example embodiment, for ease of reference, a frame may be considered a single sample point in time and multiple samples may be synonymous with frames. For a given frame, the left and right FADPs (across a given set of frequencies) may be grouped (for ease of reference) within a Data Group (DG). The number of frequencies may be variable, however, by way of example, 55 frequencies spread over the spectrum beginning at 88 hz and ending at 15,750 hz may optionally be utilized.

In an example embodiment, the Correlation Determination Processor 150 may perform some or all of the analytics as described below.

Stage 1: Locate and mark frequencies where peaks and troughs occur. In an example embodiment, one method of detecting peaks and troughs may involve evaluating a given set of frequencies within a given DG and for a given discrete frequency evaluate the amplitude for the current frequency (ACF), the previous (lower) frequency (APF) and the next (higher) frequency (ANF).

Various techniques may be utilized to uniquely mark peaks and troughs within a DG. One such example technique is to mark peaks and troughs for left and right FADPs using a Sidon sequence (SS) thereby resulting in a natural set of numbers in which pairwise sums (for left and right channels) may be different. To accommodate slopes (where peaks and troughs may not exist) the Sidon sequence may be slightly modified to include 0 for both the left and right channels. The Sidon sequence applied may be used in a subsequent stage to derive the various (e.g., eight) possible combinations of peak, trough and slope.

The peaks and troughs may optionally be identified and marked in accordance with the following.

Where:
LPSV=Left Peak–Sidon Value (10)
RPSV=Right Peak–Sidon Value (7)
LTSV=Left Trough–Sidon Value (−5)
RTSV=Right Trough–Sidon Value (−4)
PFSV=Peak Frequency Sidon Value
TFSV=Trough Frequency Sidon Value
SSV=Slope Sidon Value
n=Frequency Location

```
If ACF > APF and ACF > ANF Then
    If Processing Left (Mid) values in DG
    PFSVn = LPSV
    Else
        PFSVn = RPSV
    Else
If ACF < APF and ACF < ANF Then
    If Processing Left values in DG
        TFSVn = LTSV
    Else
        TFSVn = RTSV
Else
SSVn  = 0
```

While 0 was specified above as a modification to the Sidon Sequence, any number may be chosen that may satisfy the Peak/Trough identification.

While −4, −5, 7 and 10 were chosen for the Sidon Sequence above; any set of values that satisfy the Sidon Sequence may be used.

Figure 19:
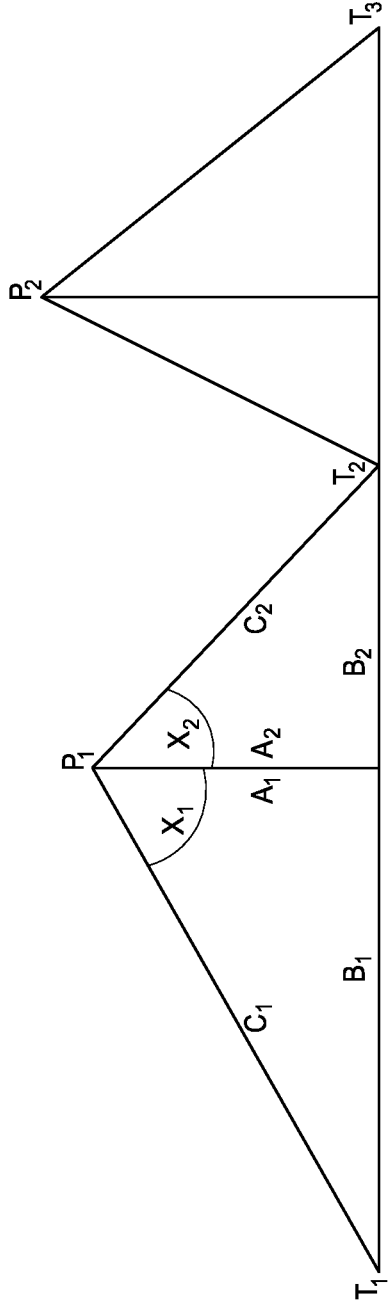
FIG. 19 is a diagram of example frequency/amplitude data pairs forming right triangles

Stage 2: Derive the slope angles for peaks and troughs. In an example embodiment one method of deriving the Slope Angle for both sides of a given peak and trough (SAP, SAT) within a DG may be using the standard trigonometry formula for right angle triangles to derive angle X1 and angle X2 (see FIG. 19) in accordance with the following.

Where:
SA1=Slope angle for current to previous frequencies
SA2=Slope angle for current to next frequencies
Tan SA1=A1/B1
Tan SA2=A2/B2

The Slope Angle (SA1 and SA2) for a given side of peaks and troughs may be stored for later analytics.

Stage 3: Derive the hypotenuse length for sides of peaks and troughs. In an example embodiment, one method of determining the length of the Hypotenuse may be to apply the standard $A^2+B^2=C^2$ formula to a given side of peaks and troughs within a DG. 'A' may equal the amplitude and B' may equal the difference between two discrete frequency values and 'C' may equal the hypotenuse length (see, e.g., FIG. 19) in accordance with the following.

Where:
HLP=Hypotenuse Length Peak
HLT=Hypotenuse Length Trough
HLP=SQRT($A1^2+B1^2$)
HLT=SQRT($A2^2+B2^2$)

Stage 4: Derive a correlation classification and/or the confidence level for FADPs. In an example embodiment One example technique of deriving the Correlation Classification for a given FADP (FADP-CC) may be to add the Left and Right assigned Sidon Sequence for a given FADP within a DG thereby producing a Sidon Result (which may be ranked as SSR1 through SSR8). The 8 desired SSRs may be defined as:

| SSR# | Left Type | Right Type |
|---|---|---|
| SSR1 | Trough | Trough |
| SSR2 | Trough | Slope |
| SSR3 | Slope | Trough |
| SSR4 | Trough | Peak |
| SSR5 | Peak | Trough |
| SSR6 | Slope | Peak |
| SSR7 | Peak | Slope |
| SSR8 | Peak | Peak |

In an example embodiment One example technique for determining the confidence level of a given correlation classification may be to derive the sum of the areas of the triangle on both sides of the peaks or troughs (for a given FADP).

Where:
PA=Peak Area
TA=Trough Area
TA or PA=Summed Area of Left and Right Triangles
TA or PA=(1/2*(A1*B1))+(1/2*(A2*B2))

The Left and Right PA or TAs may be divided to derive the percentage of similarity/difference between the two. The percentage of similarity/difference may then be assigned to a given FADP-CC and thus represent the confidence level (FADP-CL1-8).

Where:
N=FADP-CC occurrence number
FADP-CLn=PA(left)/PA(right)
FADP-CLn=TA(left)/TA(right)

a given implementation may, or may not include the confidence level calculations.

Stage 5: Derive the percentage of frequencies that may be correlated, uncorrelated and out of phase. In and embodiment the percent of discrete correlated, uncorrelated and out of phase frequencies may be determined by adding the number of SSRs in the classification and dividing by the total of a given set of SSRs within a given DG in accordance with.

Where:
CP=Correlated Percentage
UCP=Uncorrelated Percentage
OOPP=Out of Phase Percentage
TSSR=Sum(SSR1 . . . SSR8)
CP=(SSR1+SSR4+SSR5+SSR8)/TSSR
UCP=(SSR2+SSR3+SSR6+SSR7)/TSSR
OOPP=(SSR4+SSR5)/TSSR An optional step that may improve accuracy involves averaging the confidence levels of a given set of FADP-CLs for a given correlation classification.

A given implementation may, or may not include the out of phase correlation classifications within this calculation.

Where:
CC=Correlated Confidence
UCC=Uncorrelated Confidence
OOPC=Out of Phase Confidence
CC=(FADP-CL1+FADP-CL4+FADP-CL5+FADP-CL8)/4
UCC=(FAD-CL2+FADP-CL3+FADP-CL6+FADP-CL7)/4
OOPC=(FAD-CL4+FADP-CL5)/2
Optional: The Out of Phase SSRs may be excluded:
CC=(FADP-CL1+FADP-CL8)/2

Stage 6: Derive the intermediate (working) correlation classification for DGs. In an example embodiment, various techniques may be used to determine if a DG may be classified as correlated, uncorrelated or undetermined, however, one such method may be to compare the total percent calculated from Stage 5 and allow for a Margin of Error (MOE).

Where:
CP=Total percent correlated
UCP=Total percent Uncorrelated
OOPP=Total percent Out of Phase
MOE=Margin of Error
ICC=Intermediate Correlation Classification
Abs=Function returning absolute value
If CP−MOE>UPC Then
ICC=Correlated
If CP+MOE<UPC Then
ICC=Uncorrelated
If Abs(CP−UPC)<=MOE Then
ICC=Undetermined A classification of "undetermined" may indicate the difference in percent correlated and percent uncorrelated for the DG resides within the margin of error.

The margin of error may be determined during implementation and testing and may differ from implementation to implementation depending on quality of components and the quality of software.

Stage 7: Remove "outlier" Correlation classifications and derive a final correlation classification. In an example embodiment, various techniques may be used to remove outlier correlation classifications (which may be introduced within signal processing) such as Moving Average, Standard Deviation, and/or Variance, Co-Variance among many others. One such method described here may be to first Average the Percent Correlated (APC) and Average the Percent Uncorrelated (APU) using a predetermined frame sample size.

Where:
n=Current Frame
x=Sample size for Average function
APC=Average(CP over n: n+x)
APU=Average(UCP over n: n+x)

The sample size may be determined during implementation and testing and may differ from implementation to implementation depending on quality of components and the quality of software.

One example technique to determine the Final Correlation Classification (FCC) and in the process remove any outliers may be to compare the average percent calculated (APC, APU) above allowing for a margin of error (MOE).

Where:
FCC=Final Correlation Classification
MOE=Margin of Error

```
If APC − MOE > APU Then
    FCC = Correlated
    Else
        If APU − MOE > APC Then
    FCC      = Uncorrelated
        Otherwise
    FCC = FCC from previous frame
```

The margin of error may be determined during implementation and testing and may differ from implementation to implementation depending on quality of components and the quality of software.

Stage 8: Send the final correlation classification (FCC) to the Time Domain Content Identification Engine. In an example embodiment, as a given final correlation classification may be derived, the classification may be sent to another engine and may be utilized during further processing. Various techniques may be used to send a given FCC one such method may be to use standard object messaging.

Correlated Content Identification Analytics

Referring to FIG. 14, the correlated content identification analytics process, performed by correlated content processor 189, may receive data from the correlated loudness/amplitude analyzer(s) 148 on a per frame basis and performs time domain analytic functions resulting in a content identification on a per frame basis of Program (LF), Commercial (SF) or Undetermined (NE). The time period between frames may vary, but one such time period may be about 33⅓ ms, or about 30 FPS. Many analytic methodologies may be employed; however, this embodiment utilizes stereo correlated loudness/amplitude analyzer(s) 148. Observations may indicate that the accuracy of time domain analyzers may be likely to increase as the analytic duration increases and conversely the accuracy decreases as the analytic duration approaches real-time. This embodiment may utilize one such time period (30 frames), however, many others may be used.

In an example embodiment, the correlated loudness/amplitude analyzer(s) 148, may analyze signals comprising MID-PEAK, MID-RMS, SIDE-PEAK and SIDE-RMS signals for consistency of signal amplitude variation. This may be accomplished using an analytic process.

Stage 1 processing may derive the Peak Range and RMS Range on a per frame basis according to the following.
Where:
Abs=Function returning absolute value
Peak-Range=Abs(Mid-Peak−Side-Peak)
RMS-Range=Abs(Mid-RMS−Side-RMS)

Stage 2 processing may derive a moving average for both the Peak-Range and the RMS-Range according to the following.
Where:
N=Frame number
X=Number of frames
PR-MA=Peak Range Moving Average
RMS-MA=RMS Range Moving Average
Average=Function returning average over a specified number of frames
PR-MA=Average(Peak-Range over N:N+X)
RMS-MA=Average(RMS-Range over N:N+X)

Stage 3 processing may derive a Peak and RMS variance using a maximum−minimum formula according to the following.
Where:
N=Frame number
X=Number of Frames
PR-Var=Peak Range Variance
RMS-Var=RMS Range Variance
Max=Function returning largest value
Min=Function returning smallest value
PR-VAR=Max(PR-MA over N:N+X)−Min(PR-MA over N:N+X)
RMS-VAR=Max(RMS-MA over N:N+X)−Min(RMS-MA over N:N+X)

Stage 4 processing may employ various boundary tests for both the Peak and RMS Variances thereby deriving a content identification according to the following.
Where:
PBT=Peak Boundary Test
PCI=Peak Correlated Identification
RBT=RMS Boundary Test
RCI=RMS Correlated Identification

---

If PR-VAR < PBT Then
    PCI = Sort Form
Else

---

PCI = Long Form
If RMS-VAR < RBT Then
    RCI = Short Form
Else
    RCI = Long Form

---

Correlated Noise Content Identification Analytics

In an example embodiment, the correlated noise analyzers 148 may analyze signals comprising MID-NA and SIDE-NA signals for consistency of signal noise variation. This may be accomplished using a multi-stage (e.g., a four stage) Analytic process resulting in a content identification of Program (LF), Commercial (SF) or Undetermined (NE). The time period between frames may vary, but one such time period may be 33⅓ ms, or ~30 FPS. Many analytic methodologies may be employed as described herein. For example, certain embodiments may utilize stereo signal noise analyzers.

The accuracy of time domain analyzers may be likely to increase as the analytic duration increases and conversely the accuracy decreases as the analytic duration approaches real-time.

Stage 1 processing may derive the range between the MID and SIDE Noise Analyzers 148 according to the following.
Where:
NA-Range=Noise Analyzer Range
NA-Range=Abs(Mid-NA−Side-NA)

Stage 2 processing may derive a moving average for the NA-Range according to the following.
Where:
N=Frame number
X=Number of Frames
NA-MA=Noise Analyzer Moving Average
Average=function returning average over a specified number of frames
NA-MA=Average(NA-Range over N:N+X)

Stage 3 processing may derive a signal variance using a maximum−minimum function according to the following.
Where:
N=Frame Number
X=Number of Frames
NA-VAR=Noise Analyzer Variance
Max=Function returning largest value
Min=Function returning smallest value
NA-VAR=Max(NA-MA over N:N+X)−Min(NA-MA over N:N+X)

Stage 4 processing may employ a boundary test for the NA-VAR thereby deriving a content identification according to the following.
Where:
NBT=Noise Boundary Test
NCI=Noise Correlated Identification

---

If NA-VAR < NBT Then
    NCI = COMMERCIAL
Else
    NCI = PROGRAM

---

Uncorrelated Content Identification Analytics

Referring to FIG. 13, the Uncorrelated Identification Analytics processor may receive data from the uncorrelated loudness/amplitude and noise analyzers 186, 187 on a per frame basis and perform time domain analytic functions resulting in a content identification on a per frame basis of Program, Commercial or Undetermined. The time period between frames may vary, but one such time period may be about 33⅓ ms, or about 30 FPS (frames per second). Many analytic methodologies may be employed. For example, stereo signal noise and loudness/amplitude analyzer(s) 186 may be utilized. The accuracy of time domain analyzers may be likely to increase as the analytic duration increases and conversely the accuracy decreases as the analytic duration approaches real-time.

In an example embodiment, the Uncorrelated loudness/amplitude analyzer(s) 186, may analyze signals comprising MID-PEAK, MID-RMS, SIDE-PEAK and SIDE-RMS signals, for consistency of signal amplitude variation. This may be accomplished using a multi-stage (e.g., a four stage) analytic process, an example of which is described below.

Stage 1 processing may derive the Mid-Range and Side-Range on a per frame basis according to the following.
Where:
Abs=Function returning absolute value
Mid-Range=Abs(Mid-Peak−Mid-RMS)
Side-Range=Abs(Side-Peak−Side-RMS)

Stage 2 processing may derive a moving average for both the Mid-Range and the Side-Range according to the following.
Where:
N=Frame number
X=Number of Frames
MR-MA=Mid-Range Moving Average
SR-MA=Side-Range Moving Average
Average=Function returning average over a specified number of frames
MR-MA=Average(Mid-Range over N:N+X)
SR-MA=Average(Side-Range over N:N+X)

Stage 3 processing may derive a signal variance using a maximum−minimum function according to the following.
Where:
N=Frame number
X=Number of Frames
MR-Var=Mid-Range Variance
SR-Var=Side-Range Variance
Max=Function returning largest value
Min=Function returning smallest value
MR-VAR=Max(MR-MA over N:N+X)−Min(MR-MA over N:N+X)
SR-VAR=Max(SR-MA over N:N+X)−Min(SR-MA over N:N+X)

Stage 4 processing may employ various boundary tests for both the Mid and Side Variances thereby deriving a content identification according to the following.
Where:
MBT=Mid Boundary Test
MCI=Mid Uncorrelated Identification
SBT=Side Boundary Test
SCI=Side Uncorrelated Identification

```
If MR-VAR < MBT Then
    MCI = Short Form
Else
    MCI = Long Form
If SR-VAR < SBT Then
    SCI = Short Form
Else
    SCI = Long Form
```

Uncorrelated Noise Content Identification Analytics

Referring to FIG. 13, in an example embodiment, the Uncorrelated Content Processor 188 may receive processed data values from one or more Uncorrelated Noise Analyzers 187, which may analyze signals comprising of MID-NA and SIDE-NA signals, for consistency of signal noise variation. This may be accomplished using a multi-stage (e.g., a four stage) analytic process resulting in a content identification of Program (LF), Commercial (SF) or Undetermined (NE), as discussed below. The time period between frames may vary, but one such time period may be about 33⅓ ms, or about 30 FPS. Many analytic methodologies may be employed. For example, stereo signal noise analyzers 187 may be utilized.

The accuracy of time domain analyzers tends to increase as the analytic duration increases and conversely the accuracy decreases as the analytic duration approaches real-time.

Stage 1 processing may derive the range between the MID and SIDE Noise Analyzers according to the following.
Where:
NA-Range=Noise Analyzer Range
NA-Range=Abs(Mid-NA−Side-NA)

Stage 2 processing may derive a moving average for the NA-Range according to the following.
Where:
N=Frame number
X=Number of Frames
NA-MA=Noise Analyzer Moving Average
Average=function returning average over a specified number of frames
NA-MA=Average(NA-Range over N:N+X)

Stage 3 processing may derive a signal variance using a maximum−minimum function according to the following.
Where:
N=Frame Number
X=Number of Frames
NA-VAR=Noise Analyzer Variance
Max=Function returning largest value
Min=Function returning smallest value
NA-VAR=Max(NA-MA over N:N+X)−Min(NA-MA over N:N+X)

Stage 4 processing may employ a boundary test for the NA-VAR thereby deriving a content identification according to the following.
Where:
NBT=Noise Boundary Test
NUI=Noise Uncorrelated Identification

```
If NA-VAR < NBT Then
    NUI = Short Form
Else
    NUI = Long Form
```

Correlation Analytics Processor

Referring to FIGS. 13, 14 and 15, the Correlation Analytics Processor 150 may resolve a number of uncorrelated and correlated interim classifications a single set of interim classifications that may be sent to the adjudication processor.

In an example embodiment, the Correlation Decision Engine 151 may receive interim classifications from the Uncorrelated Content Processor(s) 188 and the Correlated Content Processor(s) 189. The Correlation Decision Engine 150 may also receive correlation classifications from the Correlation Determination Processor(s) 175.

In an example embodiment, the Correlation Decision Engine 151 may resolve which analytic identification to use (correlated or uncorrelated) based upon the correlation classification and assign the Identifications from the selected Identification Analytics according to the following.

Where:
CC=Correlation Classification (from CCDE)
PCI=Peak Content ID
(from Correlated Peak analyzer(s))
RCI=RMS Content ID
(from Correlated RMS analyzer(s))
NCI=Noise Content ID
(from Correlated Noise analyzer(s))
MCI=Mid Content ID
(from Uncorrelated Mid analyzer(s))
SCI=Side Content ID
(from Uncorrelated Side analyzer(s))
NUI=Noise Content ID
(from Uncorrelated Noise analyzer(s))
PM-CI=Peak/Mid Content Identification
RS-CI=RMS/Side Content Identification
NA-CI=Noise Content Identification
If CC=Correlated Then
PM-CI=PCI
RS-CI=RCI
NA-CI=NCI
If CC=Uncorrelated Then
PM-CI=MCI
RS-CI=SCI
NA-CI=NUI In an embodiment, the TD-CIE may send (e.g., on a per frame basis) the resolved content identifications to the Adjudication Engine for final processing. Optionally, (if calculated) the confidence level for a given identification may be included and sent to the Adjudication Engine for final processing. The data elements (and values) that may be sent to the Adjudication Engine may be:
PM-CI (Peak/Mid Content Identification)
RS-CI (RMS/Side Content Identification)
NA-CI (Content Noise Identification)

In an example embodiment, the Correlation Analytics Processor 150 may receive interim classifications from the Uncorrelated Content Processors 188 (see, FIG. 13) and the Correlated Content Processors 189 (see, FIG. 14). The Correlation Analytics Processor 150 may also receive correlation classifications from the Correlation Determination Processor 175 (see, FIG. 15).

In an example embodiment, the Correlation Analytics Processor 150 may attempt to resolve interim content classifications of Undetermined to a Long Form classification or a Short Form classification. The resolution may be accomplished by looking within the Bitstream Control Database 12 for alternate analytic algorithms which may be employed. If the alternate analytic algorithms process the new interim content classification(s) may be substituted if it/they are not Undetermined and the set of interim content classification may be sent to Adjudication processor 108 for processing.

Matrix Encoding Signal Noise Analyzer (MESNA)

The MESNA may utilize M/S matrix encoding (where M/S indicates MID/SIDE) in measuring the SNR found in signals to expose measurements of noise in content but not limited to only these embodiments. This may include electronic noise, but may also include external events that affect the measured phenomenon e.g. wind, vibrations, gravitational attraction of the moon, variations of temperature, variations of humidity, etc.

For example, the MESNA may measure the ratio between an arbitrary signal level (not necessarily the most powerful signal possible) and the noise floor. Measuring signal-to-noise ratios may require the selection of a representative or reference signal. In an example embodiment SNR may indicate an average signal-to-noise ratio, the concept may be understood as normalizing the noise level to 1 (0 dB) and measuring the variance.

Figure 5:
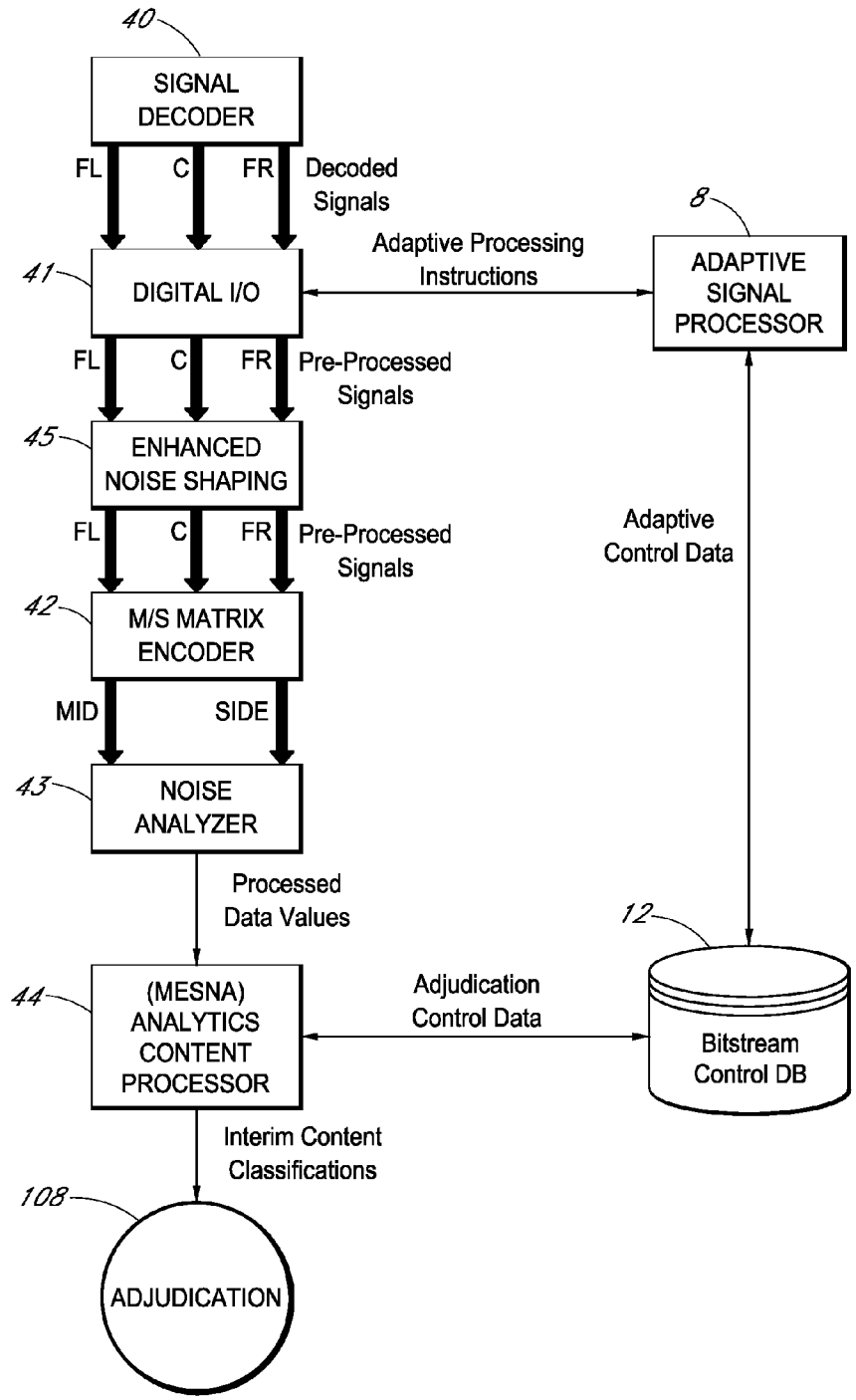
FIG. 5 is a block diagram of an example matrix encoding signal noise processor.

Referring now to FIG. 5, in an example embodiment a bit stream, such as an AAC, MPEG-2, or MPEG-4 bit stream, may be decoded by signal decoder 40 and the surround audio signals FL/C/FR may be routed from within a receiver or STB (set top box) and input into a digital I/O 41, although other processes, signals or devices may be used. After receiving the decoded signals, the MESNA may send the FL/C/FR channels using M/S Matrix encoder 42 to transform the FL/C/FR channels into a Mid channel and a Side channel.

The mid channel may be the sum of the center, left and right channels as defined in accordance with equation (15):

$$M(\text{mid})=C+FL+FR$$

Where
C=Center signal
FL=Front Left signal
FR=Front Right signal
M=Summed MID signal The side channel may be the difference of the center, left and right channels as defined in accordance with equation (16):

$$S(\text{side})=C-FL-FR$$

Where
C=Center signal
FL=Front Left signal
FR=Front Right signal
S=Difference SIDE signal This utilization of M/S matrix encoder 42 may be useful due to the mono and lack of stereo nature of some forms of content. After M/S matrix encoding, the resulting MID and SIDE signal(s) may be routed to MESNA 43 utilizing A-weighted RMS noise metrics, but may not be limited to just these settings. Because some signals have a wide dynamic range, SNRs may often be expressed using the logarithmic decibel scale. In decibels, the SNR may be defined in accordance with equation (17):

$$SNR_{dB} = 10\log_{10}\left(\frac{A_{signal}}{A_{noise}}\right)^2 = 20\log_{10}\left(\frac{A_{signal}}{A_{noise}}\right).$$

Where
A=Root Mean Square.
SNR=Signal to Noise Ratio
Bit Stream Noise Analyzer Module (BSNA)

A method may be utilized for discerning noise in a bit stream by processing a plurality of decoded channels into a non-band-limited, lossy transcoded signal; wherein perceptually irrelevant signal components may be discarded and redundancies in the decoded audio signal may be reduced or eliminated.

Embedded bit streams, such as but not limited to AAC, MPEG-2, and MPEG-4 bit streams, may utilize the principle of superposition to combine or separate in a way that may cause the result of their combination to have some meaningful property known here after as BSNA. This principle may be useful as a diagnostic tool in replicating aspects of the original bit stream, in other words there may be reduced noise immunity, which in an example embodiment may be analyzed with signal carrier noise metrics for identification but not limited to Long and Short form content in DTV (digital television).

Figure 3:
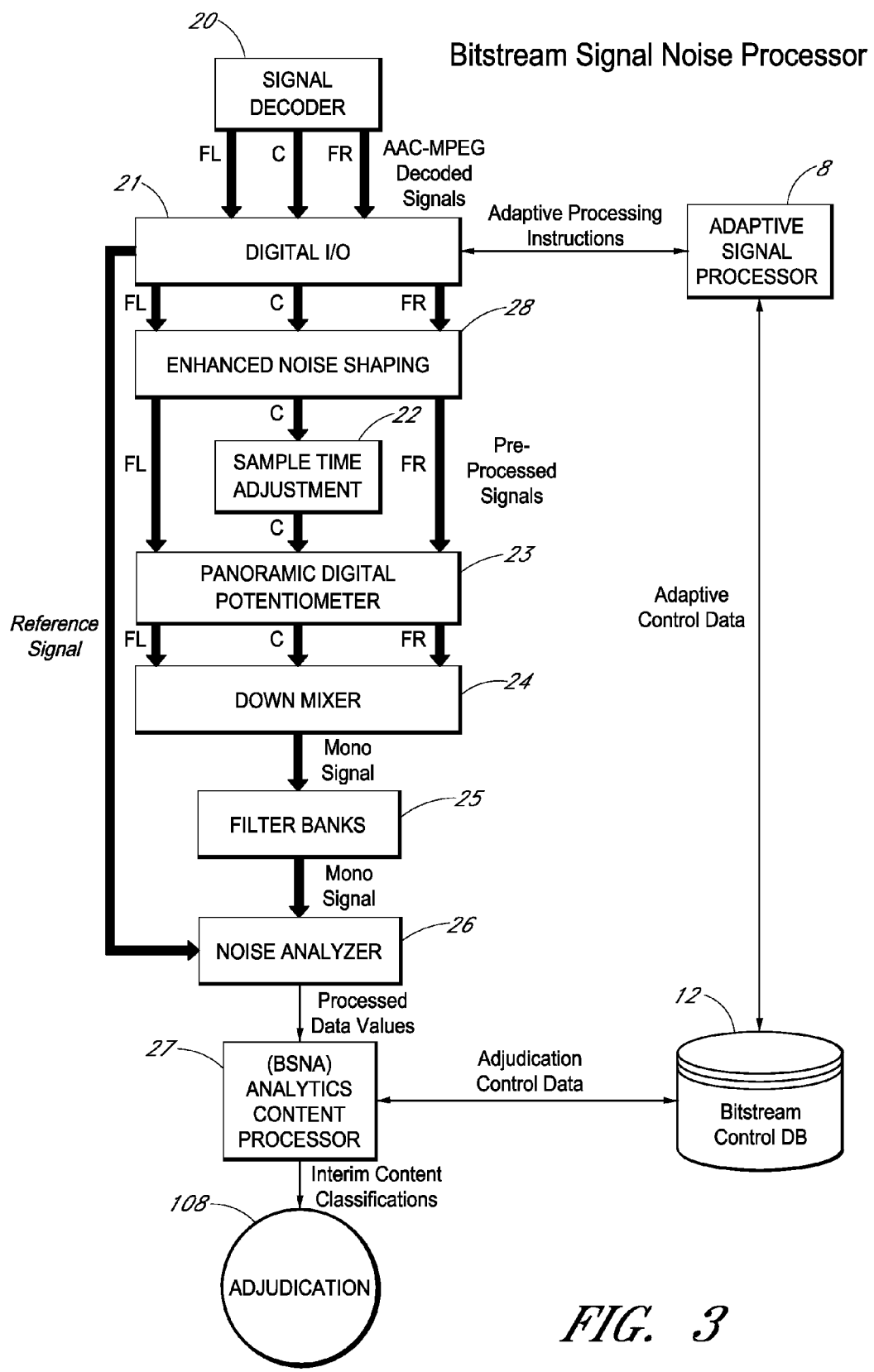
FIG. 3 is a block diagram of an example bit stream signal noise processor.

Referring to FIG. 3, in an example embodiment a bit stream, such as by way of example AAC, MPEG-2, or MPEG-4 may be decoded by signal decoder 20 and the surround audio signals FRONT LEFT, FRONT CENTER, FRONT RIGHT (FL/C/FR) may be routed from within a receiver or Set Top Box (STB) and input to a digital I/O 21 and summed to the bit stream noise analyzer 26 for analysis.

In some lossy encoding algorithms, the modified discrete cosine transform (MDCT) may be configured to be performed on consecutive blocks of a larger dataset, where subsequent blocks may be overlapped so that the last half of one block coincides with the first half of the next block.

In an example embodiment, the BSNA may use a Sample Time Adjustment processor 22 that may provide improved frequency response and timing relationships between surround audio signals. This type of coding may not perfectly reconstruct the original audio because of the loss of information which results in the simplification of the stereo image and may produce perceptible compression artifacts.

For example, the Center surround channel may a 4 sample delay time and −6 dB gain reduction, although other delays and gain reductions may be used. The FL/C/FR surround audio may be converted to intensity stereo (e.g., using a panoramic digital potentiometer 23 or other technique) by removing the corresponding part of the MS signal's SIDE part using left-right panning by down mixing to a stereo signal L/R pair. The left channel may be phase-inverted with L/R total output summed to a mono signal with a reduced range output (e.g., of −3 dB to −6 dB) accommodating for pan law, although other settings may be used.

Digitally modulated signals (e.g. QAM or PSK) may be comprised of two carrier waves (the I and Q components), which may be out-of-phase carriers. The information (bits or symbols) may be carried by combinations of phase and/or amplitude of the I and Q components. The BSNA may use Quadrature Amplitude Phase Modulation (e.g., using the panoramic digital potentiometer 23) where carrier waves out of phase with each other may be modulated and summed and the resulting waveform may be a combination of phase shift keying and amplitude modulation.

BSNA may implement amplitude modulation through a series of constellation points by changing signal delay timing using the panoramic digital potentiometer 23 (this process is also known as panning). This architecture may determine how much of each source signal may be sent to the buses that may be fed by the pan control using the power curve called Taper or Pan law. Pan control law may be designed to send −4.5 dB to each bus when centered or 'straight up' or have −6 dB or −3 dB in the center although other settings may be used.

Some wideband audio coding algorithms, such as AAC and MPEG, exploit two coding strategies to dramatically reduce the amount of data needed to represent high-quality digital audio. 1. Signal components that may be perceptually irrelevant may be discarded; 2. Redundancies in the coded audio signal may be eliminated. In an example embodiment a Down Mixer 24 may be used to return aspects of the decoded signals and simulate the above-mentioned encoded state by summing multiple channels to a mono channel.

During encoding, a signal may be converted from time-domain to frequency-domain using modified discrete cosign transform (MDCT). Filter banks may take an appropriate number of time samples and convert them to frequency samples. In an example embodiment, the BSNA may use filter banks 25 (which may include a parametric equalizer, a high pass filter, and a low frequency oscillator) to simulate reproduction of certain aspects of pre-decoded signal states. For example, a high pass filter included in filter bank 25 may apply a modulating, resonant filter to the (FL/C/FR) channels (e.g., 50%). The high pass filter may use a range of settings, for example, a frequency cutoff range of 153 kHz, Resonance value of 30%, 20 ms attack and 58 ms release, although other settings may be used. The high pass filter may use the sinusoidal Low Frequency Oscillator (LFO) for modulating the filter cutoff using a range of frequency settings (0.01-100.0 Hz) and rate control of the inputs where the final output stage of the high pass filter may be reduced in some embodiments by −9 dB by way of example, although other settings may be used. The BSNA matrix may use a parametric high-shelf equalizer included in the filter bank 25 that maintains a nominal Q (the frequency width of a filter in relation to the center frequency of the filter band). The corner frequency parameter control of the shelf may be reduced, by way of example, to −5 dB at a frequency of 600 kHz although other settings or ranges may be used.

After pre-processing, the noise analyzer 26 may optionally be implemented last in the signal chain using an A-weighted RMS signal/carrier noise analyzer to provide (SNR) and/or (CNR) ratios to the ACP. The carrier-to-noise ratio may be defined as the ratio of the received modulated carrier signal power C to the received noise power N in accordance with equation $$CNR_{dB} = 10\log_{10}\left(\frac{C}{N}\right) = C_{dBm} - N_{dBm} \qquad (1)$$

Where

C=Carrier Signal

N=Noise Signal

CNR=Carrier to Noise Ratio

Signal Noise Analyzer (SNA)

In an example embodiment, a SNA (sometimes referred to as a signal noise processor) may be used to measure the Signal-to-noise ratio (SNR) found in broadcast audio signals to expose measurements of noise in the production of content. This includes electronic noise, but may also include external events that affect the measured phenomenon, (e.g., wind, vibrations, gravitational attraction of the moon, variations of temperature, variations of humidity, etc.). The SNA, in some embodiments, may measure the ratio between an arbitrary signal level (not necessarily the most powerful signal possible) and the noise floor. Measuring signal-to-noise ratios may utilize a selected representative or reference signal. For example, the SNR may indicate an average signal-to-noise ratio, the concept may be understood as normalizing the noise level to 1 (0 dB) and measuring the variance.

Figure 4:
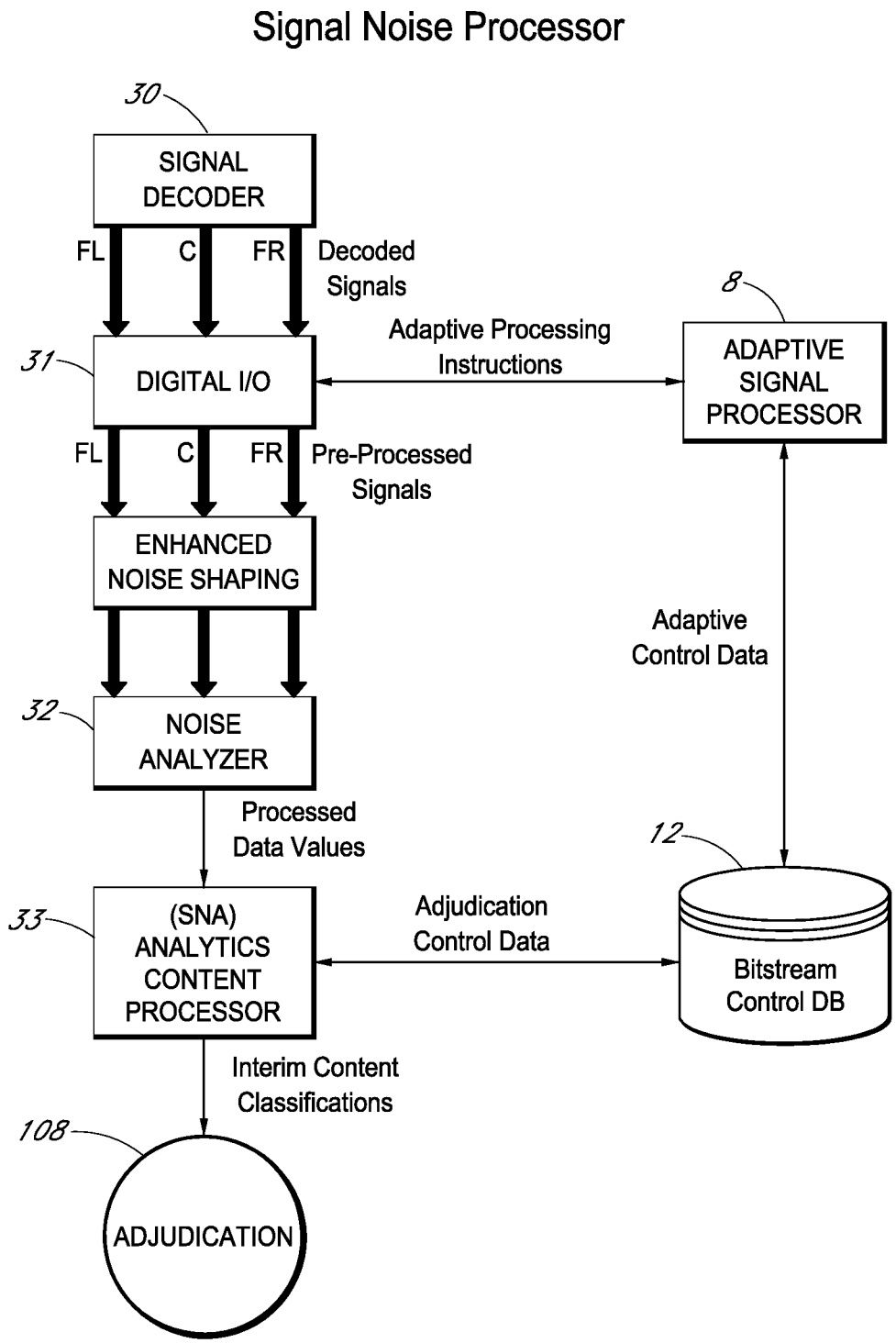
FIG. 4 is a block diagram of an example signal noise processor.

Referring to FIG. 4, in an example embodiment a bit stream, such as an AAC, MPEG-2, or MPEG-4 bit stream, may be decoded by signal decoder 30 and the surround audio signals FL/C/FR may be routed from within a receiver or STB and input to a digital I/O 31, although other processes, signals or devices may be used.

In some example embodiments, the SNA may shift the FL channel so that it is shifted 180 degrees out of phase with itself; this adjustment may advantageously reduce channels with similar audio information. After the phase shift stage the FL/C/FR may be summed to the SNA 32 utilizing (A) weighted RMS metrics and a range of release times (med-long), although other settings may be used. Because many signals have wider dynamic ranges, SNRs may often be expressed using the logarithmic decibel scale. In decibels, the SNR may be defined in accordance with equation (10):

$$SNR_{dB} = 10\log_{10}\left(\frac{A_{signal}}{A_{noise}}\right)^2 = 20\log_{10}\left(\frac{A_{signal}}{A_{noise}}\right).$$

Where
A=Root Mean Square.
SNR=Signal to Noise Ratio
expressed using the logarithmic decibel scale. In decibels, the SNR may be defined in accordance with equation (17):

$$SNR_{dB} = 10\log_{10}\left(\frac{A_{signal}}{A_{noise}}\right)^2 = 20\log_{10}\left(\frac{A_{signal}}{A_{noise}}\right).$$

Where
A=Root Mean Square.
SNR=Signal to Noise Ratio

Matrix Encoding Content Loudness Analyzer (MECLA)

Loudness analyzers may be used to measure the human perceived loudness using equal-contour loudness curves, spectrum, duration, compression and intensity. The MECLA may be implemented for analyzing loudness volume units in relation to a signal's Peak and/or RMS in dBfs values; affected by a selectable range of weighting curves such as un-weighted, dBA, dBB or dBC.

Figure 6:
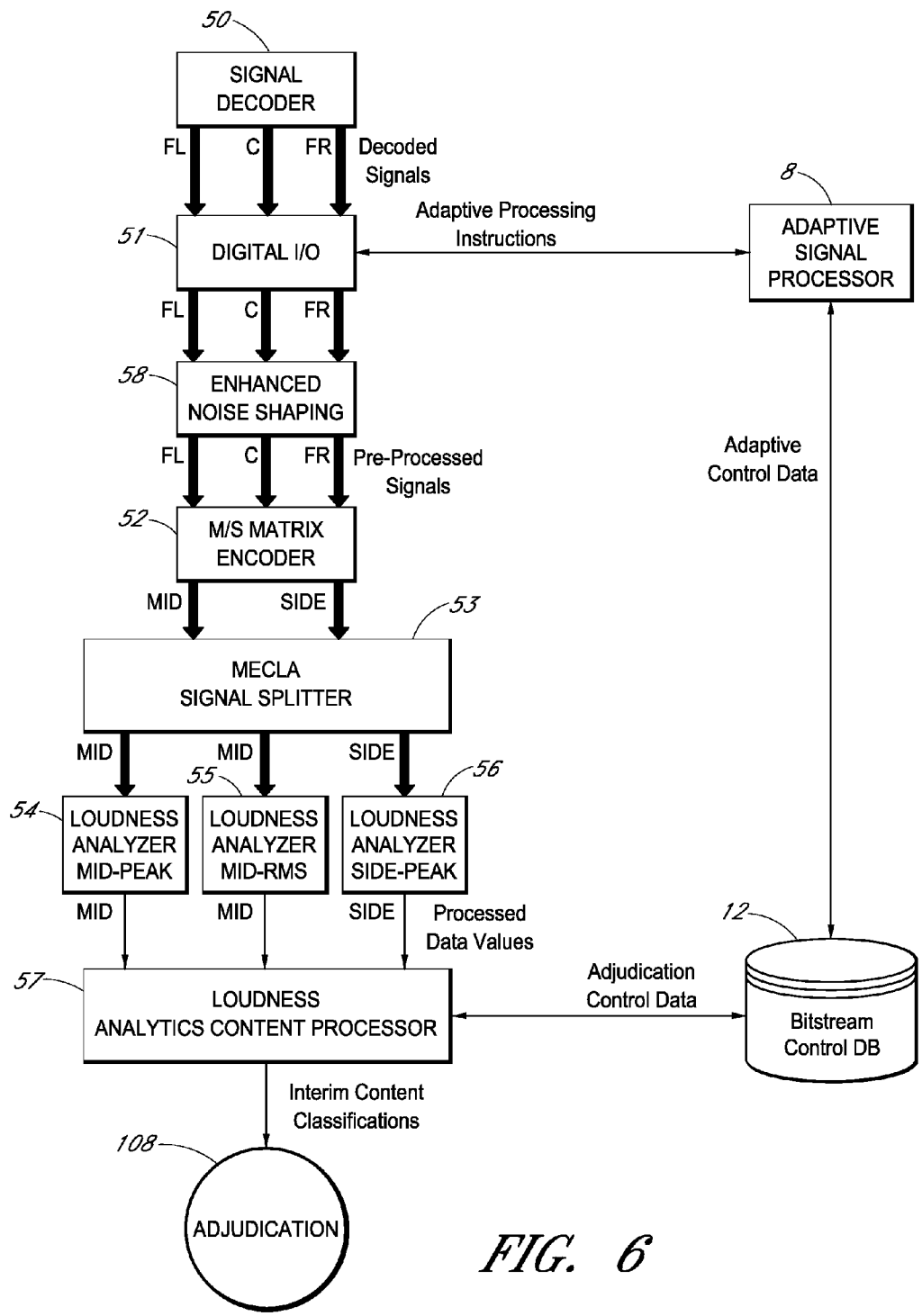
FIG. 6 is a block diagram of an example matrix encoding content loudness processor.

Referring now to FIG. 6, in an example embodiment a given bit stream such as an AAC, MPEG-2, or MPEG-4 bit stream, may be decoded by signal decoder 50 into surround audio signals FL/C/FR. The decoded signals may be routed from within a receiver or STB and input into a digital I/O 51, although other processes may be used. After receiving the decoded signals the MECLA may send the FL/C/FR channels using a M/S Matrix encoder 52 to transform the FL/C/FR channels into a MID channel and a SIDE channel. The MID channel may be the sum of the center, left and right channels and the SIDE channel may be the difference of the center, left and right channels in accordance with equations (30):

$$M=C+FL+FR$$

$$S=C-FL-FR$$

Where
C=Center channel
FL=Front Left channel
FR=Front Right channel
M=MID portion of M/S
S=SIDE portion of M/S For example, the encoding provided by M/S matrix encoder 52 may be useful due to the mono and lack of stereo nature found in some content. After encoding by M/S matrix 52, the resulting MID and SIDE signal(s) may be routed via signal splitter 53 to one or more MECLA(s) 54, 55, 56, although other approaches may be used. In an example embodiment, MECLA 54, 55, 56 may use peak-hold values and release times ranging from 160-300 milliseconds, the MECLA-1 54 may measure the MID (mono) peak value, MECLA-2 55 may measure the MID (mono) RMS average value and the MECLA-3 56 may measure SIDE (stereo) peak average but MECLA, although other settings or processes may be used.

Signal Applause Analyzer Detection (SAAD)

In identification of content, SAAD may be used to detect applause, known as an expression of approval by the act of clapping, or striking the palms of the hands together, in order to create noise. Various embodiments may use signal noise analysis, however, differentiating between "signal noise" and "applause noise" may be beneficial. By measuring the magnitude of an input signal versus frequency, SAAD may identify and measure the power of the spectrum of known and unknown signals, analyze the spectra of signals, dominant frequencies, power, distortion, harmonics, bandwidth, and other components of a signal. A SAAD module may analyze the frequency on a horizontal axis and amplitude on a vertical axis representing graphic imaging waveform processing of the "applause", meaning the shape and form of the signal such as a wave moving in a physical medium. An abstract representation may be stored in Bitstream Control Storage Device 12 for use in comparative analysis of different types of applause (e.g., studio audience, stadium crowds, sports arenas, etc.). The frequency span measured may also be discretized. SAAD may use detectors in an attempt to adequately map the correct signal power to the appropriate frequency point using weighting scales such as (A), (B), or (C) and in general three types of detectors (sample, peak, and average).

SAAD may use a 1-4'1-based algorithm in accordance with equation (60):

$$\Delta v = 1/T$$

Where
Frequency resolution may be the inverse of the time T over which the waveform may be measured and Fourier transformed.

V may be the sampling frequency that may be at least twice the bandwidth of the signal.

Figure 9:
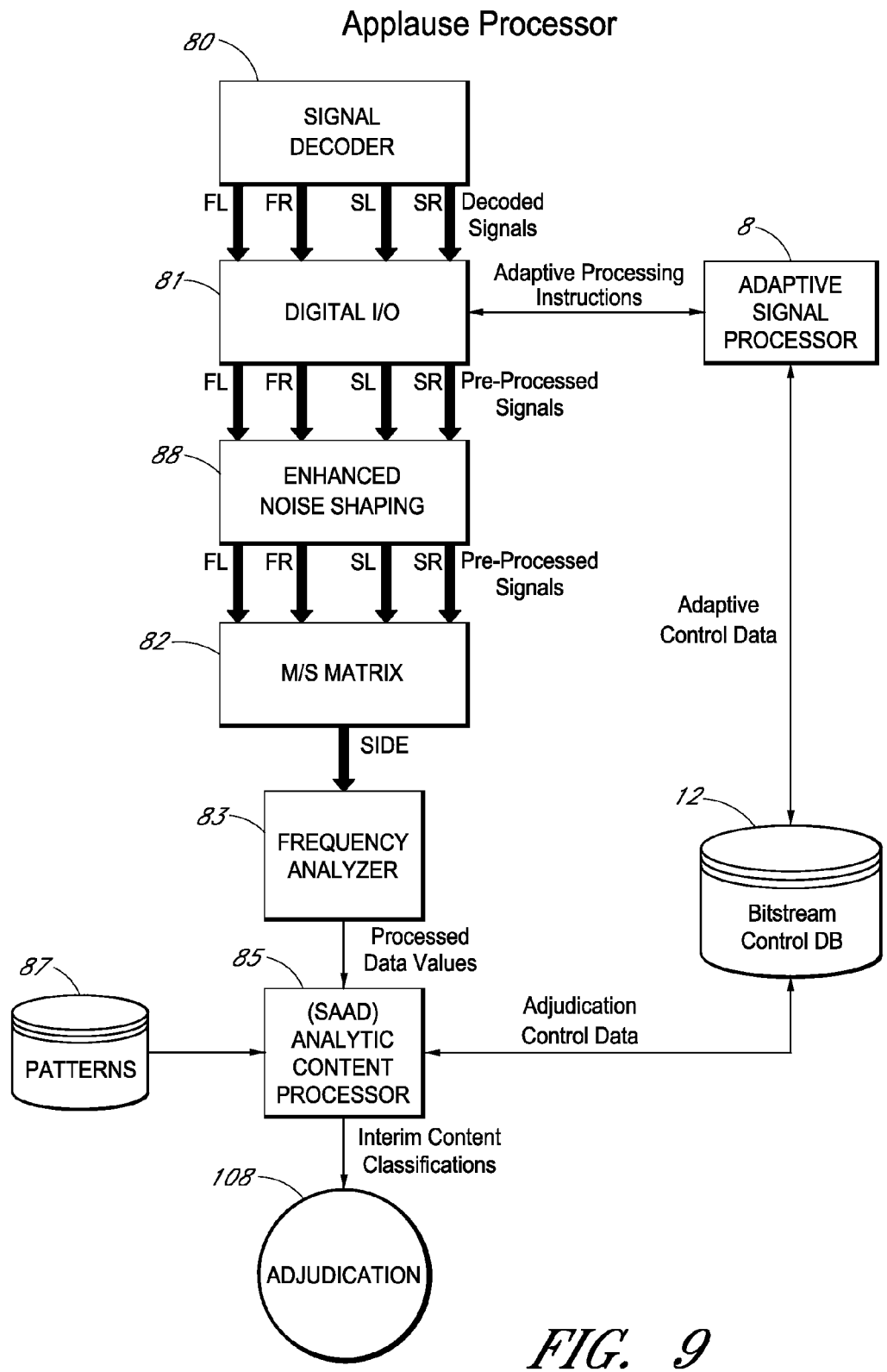
FIG. 9 is a block diagram of an example applause processor.

Referring now to FIG. 9, in an example embodiment a given bit stream such as an AAC, MPEG-2, or MPEG-4 bit stream, may be decoded by signal decoder 80. The surround audio signals FL/FR/SL/SR may be routed from within a receiver or STB and input into a digital I/O 81, although other processes may be used. SAAD may apply M/S matrix encoding, via M/S Matrix encoder 82, to the FL/FR/SL/SR, although other techniques may be used. After matrix encoding, the FL/FR/SL/SR channels may be routed to SAAD 83 for detection using the S or SIDE signals and/or using M or MID signals.

Emergencey Alert System Signal Analyzer (EASSA)

The Emergency Alert System (EAS) is a national warning system in the United States alerting the public of local weather emergencies such as tornadoes and flash floods. The EAS may be used on AM, FM and Land Mobile Radio Service, as well as VHF, UHF, cable television, digital television, along with satellite, IBOC, DAB and digital radio broadcasters.

Messages in the EAS may be composed of several parts, such as: a digitally encoded SAME header, an attention signal, an audio announcement, and a digitally encoded end-of-message marker. The SAME header bursts may be followed by an attention signal (help info), which may last between eight and 25 seconds, depending on the originating station.

The broadcast stations may send an EAS that comprises a "two tone" combination of 853 Hz and 960 Hz sine waves and may be the same attention signal used by the older Emergency Broadcast System. The "two tone" system may be used only for audio alerts before EAS messages. The attention signal may be followed by a voice message describing the details of the alert.

In some embodiments, detecting EAS signals may prove beneficial. For example, after an adjudication a device such as a TV or STB may be configured to invoke automation actions for the user (e.g., volume—up/down/mute, channel change, or DVR (digital video recorder) transport controls (play, pause, rewind, fast-forward). Therefore, when an EAS may be transmitted, the EASSA may identify the signal as an EAS and therefore the device may appropriately send overrides to any obstructive types of automation.

For example, the EASSA may use real-time search analytics for EAS messages on multiple television channels. If processing in non-real-time, the EASSA may provide an override to switch to live television viewing to receive the EAS message. In some embodiments a device may conversely improve the delivery of the EAS as well, for example raising (RMS) levels or loop playback of an EAS. By way of further example, when the television may be turned off, a power-on command may be transmitted/provided to the television to allow the EAS message to be both viewed and heard.

Figure 10:
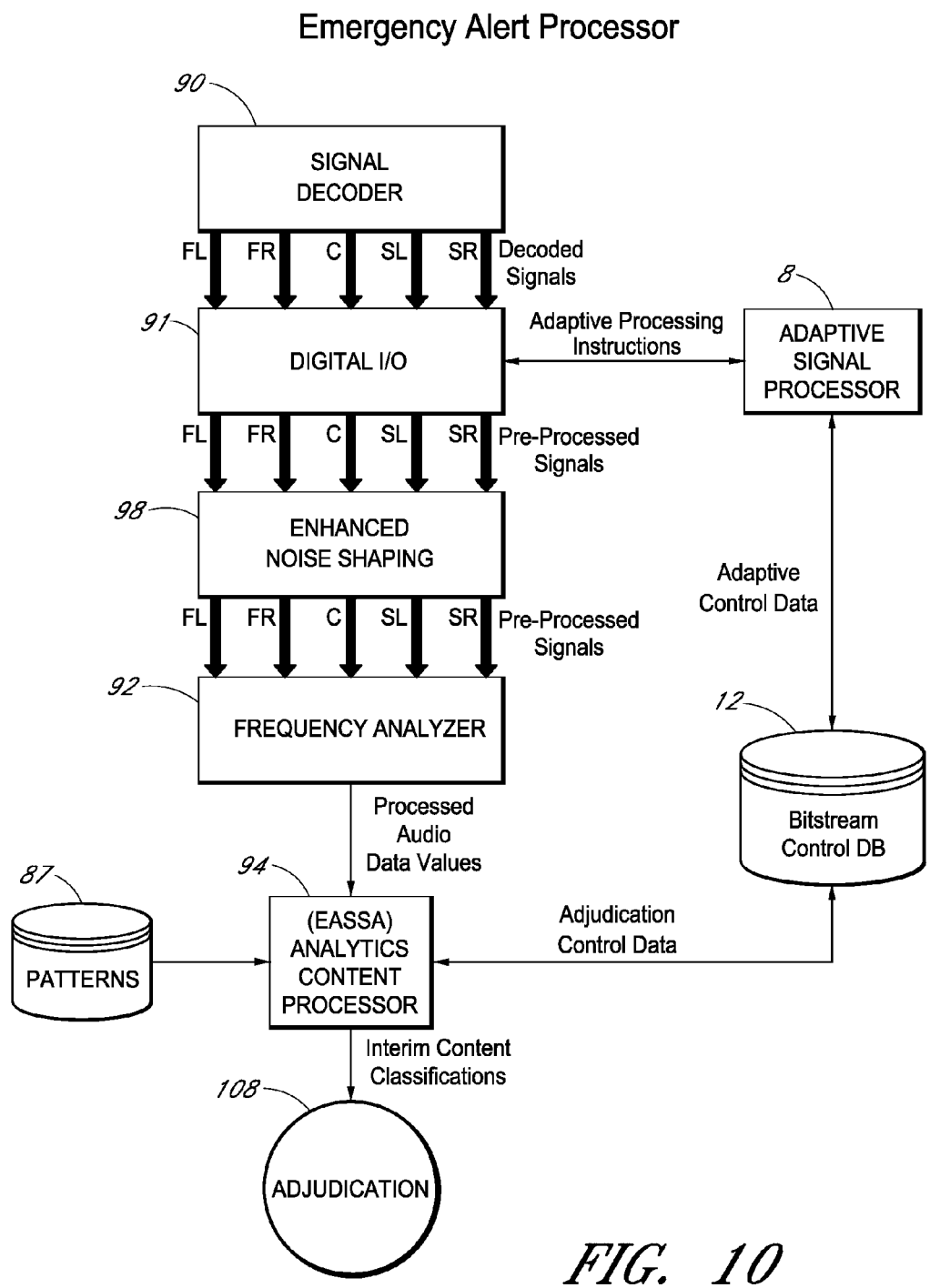
FIG. 10 is a block diagram of an example emergency alert processor.

Referring now to FIG. 10, in an example embodiment a given bit stream such as an AAC, MPEG-2, or MPEG-4 bit stream, may be decoded by signal decoder 90. The decoded surround audio signals C/FL/FR/SL/SR may be routed from within a receiver or STB, input into a digital I/O 91 and routed to an auxiliary channel, although other processes may be used. The EASSA 92, which may include a frequency analyzer, may use an FFT-based algorithm in accordance with equation (70):

$$\Delta v = 1/T$$

Where

Frequency resolution may be the inverse of the time T over which the waveform may be measured and Fourier transformed V may be the sampling frequency that may be at least twice the bandwidth of the signal The EASSA 92 may measure the magnitude of an input signal versus frequency to identify and measure the power of the spectrum of known and unknown signals, analyzing the spectra of signals, dominant frequency, power, distortion, harmonics, bandwidth, and/or other components of a signal. The EASSA 92 may analyze the "two tone" combination of 853 Hz and 960 Hz sine wave frequencies on a horizontal axis and amplitude on a vertical axis. The frequency span measured may also be discretized. The EASSA 92 may be used in an attempt to adequately map the correct signal power to the appropriate frequency point using weighting scales such as (A), (B), or (C) and in general different types of detectors, such as: sample, peak, and average. Graphic imaging waveforms of an (EAS tone-burst) signal meaning the shape and form of the signal such as a wave moving in a physical medium or an abstract representation may be made and stored within Bitstream Control Databases 12.

Multiform Correlation Analyzer (MCA)

The MCA may implement cross-correlation to measure signals (e.g., FL/C/FR as a function of time-lag which may refer to a short period of delay between when an audio signal enters and when the audio signal emerges). This type of process may be used for searching long-duration signals for shorter known features. For discrete functions, the cross-correlation may be defined in accordance with the following equation (40):

$$(f \star g)[n] \stackrel{def}{=} \sum_{m=-\infty}^{\infty} f^*[m]g[n+m].$$

Where
f and g=functions
n=period
m=X axis

The MCA may also use auto-correlation processing on signals, sometimes known as the cross-correlation of a signal with itself. Informally, auto-correlation may be the similarity between observations as a function of the time separation between them. Auto-correlation may be used as a tool for finding repeating patterns, such as the presence of a periodic signal, although other techniques may be used. For example the Center channel may be transformed into C1 and C2.

The discrete auto-correlation function may be defined in accordance with the following equation (41):

Auto-correlation_R at lag j for a discrete signal $x_n$ may be $$R_{xx}(j) = \sum_n x_n \overline{x}_{n-j}.$$

Where
Rxx=discrete auto-correlation
j=lag
Xn=discrete signal
n=period

Figure 7:
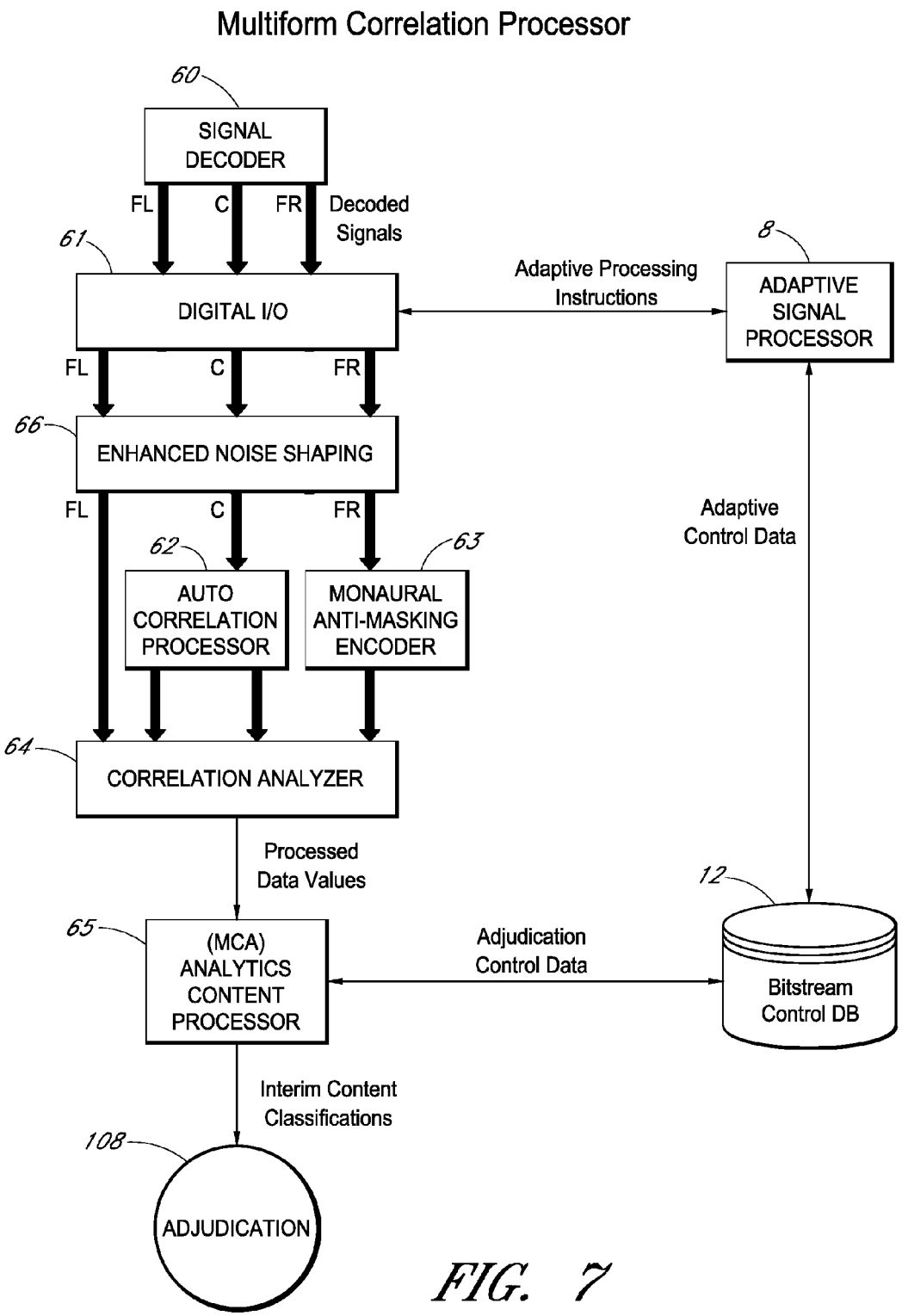
FIG. 7 is a block diagram of an example multiform correlation processor.

Referring to FIG. 7, a signal decoder 60 decodes the audio bit stream. The surround channels may be fed from a common signal path which may contain higher amounts of monaural sound, as a monaural signal may have advantages in signal strength over a stereophonic signal of the same power and may be found in elements, such as dialogue, sound effects and music. Because of this, the MCA may encode, such as by using a monaural-anti-masking-encoder (MAME) 63, selected or all surround channels in accordance with equation (42):

$$MAME = (FR*X)$$

Where
FR=Front Right Signal output from the Digital I/O
X=Signal reduction %, (e.g., may be 60%)
MAME=Front Right Signal output from MAME Referring now to FIG. 7, in an example embodiment, with respect to the decoded bit stream from decoder 60, which may be an AAC, MPEG-2, or MPEG-4 bit stream, surround audio signals FL/C/FR may be routed from within a receiver or STB and input into a digital I/O 61, although other processes may be used. The center channel may be processed by auto-correlation processor 62 and the FR may be encoded by MAME 63. The summed signal (see MCA) may be routed to the MCA analyzer 64 using a range of attack and release settings from 500-3000 milliseconds, although other ranges and settings may be used. The summed signals input into the MCA 64 may be determined in accordance with equation (43):

$$MCA = (C1 - 3 \text{ dB}) + (C2 - 3 \text{ dB}) + FL + MAME$$

Where
C1=Center Channel Signal duplicated and reduced by 3 dB
C2=Center Channel Signal duplicated and reduced by 3 dB
FL=Front Left Signal
MAME=Front Right Signal output from MAME
MCA=summed signal input to MCA Phase Polarity Analyzer (PPA)

The PPA (sometimes referred to as a phase polarity processor) may provide an indication of the relative phase polarity of channels measured in radians. Due to the implementation of M/S, the PPA may analyze same-polarity signals (sometimes referred to as '−1' or '180 degrees') and opposite-polarity signals (e.g., sometimes referred to as '+1' or '0 degrees'). The PPA is configured to be reasonably independent of input signal level, and maintains an accurate phase reading with input signals as low as −20 dBu and greater. In general, phase readings above zero indicate potential compatibility problems whereas readings below zero warn of acceptable mono compatibility. The ballistics of the PPA data may be undefined because some signals may change quickly whereas others may change more slowly.

Figure 8:
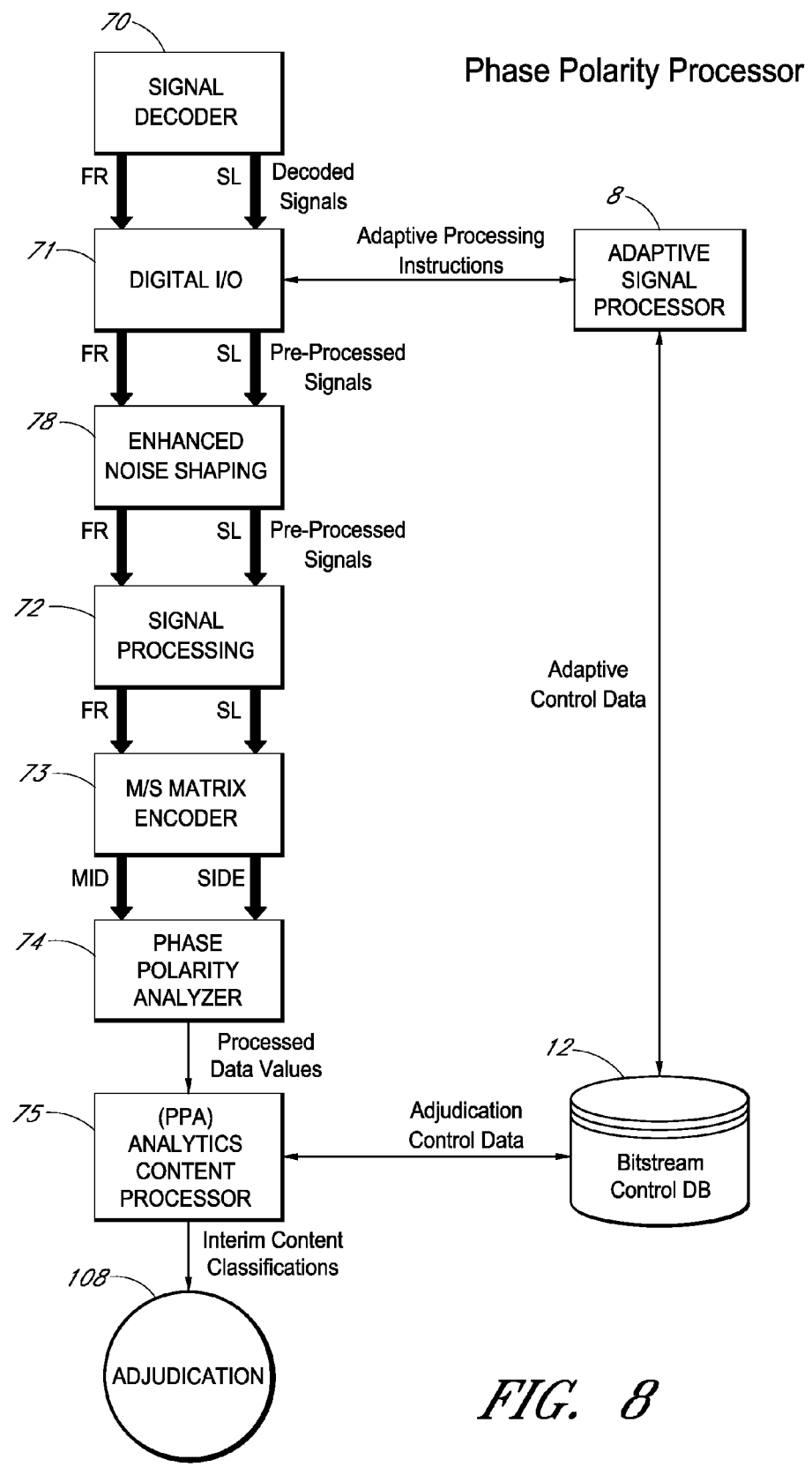
FIG. 8 is a block diagram of an example phase polarity processor.

Referring now to FIG. 8, in an example embodiment a given bit stream such as an AAC, MPEG-2, or MPEG-4 bit stream, may be decoded by decoder 70 and the decoded surround audio signals FR/SL may be routed from within a receiver or STB and input into a digital I/O 71, although other processes may be used. After receiving the decoded signals, the PPA may use multiple types of signal processing 72 on the FR/SL channels. For example, Compression, GATE and/or Filter Banks may be used, with settings such as but not limited to frequency of 2.9 kHz, Gain of 1.5 dB, and Q of 050. After signal processing 72, PPA may utilize M/S Matrix encoding performed by M/S matrix encoder 73 to transform the FR/SL channels into MID and SIDE channels.

The MID channel may be the sum of FR, SL channels and the SIDE channel may be the difference of the FR, SL channels and may be determined in accordance with equations (50):

$$M = FR + SL$$

$$S = FR - SL$$

Where
M=MID summation
S=SIDE differential
FR=Front Right Channel
SL=Surround Left Channel This example implementation of M/S matrix encoding may be useful due in part to the highly mono or lack of stereo nature of some content in relationship to phase polarity. After M/S matrix encoding, the resulting MID and SIDE signal(s) may be routed to the PPA 74 implementing the previously described phase analysis.

(BSNA) ACP-Analytic

Referring to FIG. 3, in an example embodiment, the algorithm for the BSNA analytics content processor, referred to herein as BSNA-ACP, may determine an interim content classification by exposing the ranges of the SNRs. While this may be one possible methodology to determine the content, others may be utilized.

For example, the BSNA-ACP 27 may implement variable data sample rates to acquire SNRs from the noise analyzer 26 at a predefined temporal frequency, for given temporal durations (TD), (e.g., content time periods). The SNRs acquired may be grouped within a temporal sample dataset (TSD) where statistical and probability analysis may be may be performed.

In an example embodiment, the SNR ranges within the TSD may be grouped with a temporal range dataset (TRD) and determined in accordance with equation (2):

$$SR = \left\| \left\| \frac{\sum_{i=0}^{N-1} \|S_{(i)} - B| - B|(-1)}{N} + .5 \right\| - B \right\|$$

Where
i=Temporal value,
N=Represents the total number of SNRs within each TSD
S=SNRs within each TSD
B=Content Baseline Threshold dB value
SR=Range of each group of SNRs within a TSD and grouped in A TRD In an example embodiment, the content baseline threshold (CBT) may be initially established as a statistical averaging of short form content (SF) SNRs and thereafter dynamically adjusted in accordance with equation (3):

$$B = \left\| \frac{\sum_{i=0}^{N-1} T_{S_F}(S(i))}{N} + .5 \right\|$$

Where
i=Temporal value
N=Represents the total number of SNRs used to establish the CBT
S=Set of SNR values within each TSD
B=Content Baseline Threshold value
T=Content identification
LF=Long Form
SF=Short Form The discern content-type function (DCF) may be an algorithm that may use moving averages of SRs and the CBT, comparing both to determine the interim content classification as SF or LF. The DCF may determine content in accordance with equation (4):

$$T = D\left(\left\| \frac{\sum_{i=0}^{N-1} (SR(i))}{N} + .5 \right\|\right)$$

Where
i=Temporal value
N=Represents the total number of SRs within each TRD
D=Discern Interim content classification function utilizing Moving Average Ranges.
SF: <=6 in this example
LF: >6 in this example
SR=Set of SR values within each TRD
T=Interim content classification
SF=SF
LF=LF In a non-real-time environment (e.g., recorded content) the discern content-type function (DCF) may enable or utilize additional processing options, such as look-back, look-ahead and probability analytics, which may increase the accuracy of content element naming.

(SNA) ACP-Analytics

The algorithm for the signal to noise analytics content processor may be referred to herein as SNA-ACP. An interim content classification may be determined utilizing various averaging functions and comparing the average signal to noise ratio values stored within sets. While this may be one possible methodology to determine the content, others may be utilized.

Referring to FIG. 4, in an example embodiment, the SNA-ACP 33 may acquire SNRs from the noise analyzer 32 using variable data sample rates (DSR) for temporal durations (TD). The SNRs acquired may be grouped within a temporal sample dataset (TSD) where statistical and probability analysis may be performed.

Because some content may contain large dynamic ranges, eliminating peaks and troughs, also known as (outliers), for SNRs within each TSD may simplify the analytic step for discerning the interim content classification.

In an example embodiment, one such method used may be TSD waveform smoothing (TWS) that may flatten peaks and troughs when conditions may be satisfied, however, other smoothing algorithms may be employed. The SNA-ACP TWS may be applied to each TSD in accordance with equation (11) below:

If a trough may be detected apply transform function T to a given set S(i . . . ep) which may transform the set to a peak.
If EP>W and SM>0 then
While i>c and i<ep
S(i . . . N)=C
If T was initially applied, T may be reapplied to transform (return) S(i . . . ep) to its original state.
Where
i=Temporal value
S=Set of signal data
T=Transformation function such that $$S(i)=U-S(i)$$

U=100 (Transformation boundary representing the absence of noise)
C=S(i) value at smoothing commencement point, where R may be >0 and ep may be >0 within TSD
c=i value at smoothing commencement point, where R may be >0 and ep>0 within TSD
ep=End of Peak temporal value within the TSD where S(i)−S(ep) may be >0
H=Minimum Crest Height
W=Minimum Crest Width
SM=‖R/H‖ (Smoothing determination with 0 indicating smoothing not desired and a value greater than 0 indicating smoothing may be desired)
M1=Max(S(i) . . . S(N)) (Maximum Signal to Noise value within TSD)
M2=Min(S(i) . . . S(N)) (Minimum Signal to Noise value within TSD)
R=M1−C (Maximum SNR range within series)

In an example embodiment, exposing the uniqueness of SNRs within each TSD may be accomplished using Inimitable Arithmetic Averaging (IA) for each TSD whereby the unique SNR values may be averaged, however, other algorithms may be employed. The IA may be determined and grouped within IA Datasets (IAD) as in accordance with equation (12):

$$IA = \left\| \frac{\sum_{i=0}^{N-1} U(S(i))}{N_U} + .5 \right\|$$

Where
U=A function that may select the set of unique numbers existing in a TSD. For example, the set of numbers {1, 3, 5, 5, 5, 7, 7, 7, 7} may result in the unique numbers selected for averaging of {1, 3, 5, 7}=(16/4)=4, whereas a standard arithmetic mean may derive a result of 5.222.
I=Temporal value
S=TSD Signal to Noise data
N=Temporal period
NU=Number of unique numbers in the TSD
A=Inimitable Arithmetic Averages grouped within an IAD
A subsequent averaging of the IAs within an IAD utilizing a different averaging technique (arithmetic mean) may expose additional meaningful information. For example, the arithmetic mean of the IAD may be determined in accordance with equation (13):

$$A = \left\| \frac{\sum_{i=0}^{N-1} IA(i)}{N} + .5 \right\|$$

Where
i=Temporal value
N=Temporal period representing the end of the IA set
A=Arithmetic Mean of the IAD—used in the Discern function
IA=Group of IAD averages.

In an example embodiment, the DCF may selectively store content sets in the Bitstream Control Storage Device 12 (containing ranges of arithmetic mean values organized by interim content classifications) and the arithmetic mean (A) to determine the interim content classification. This may be accomplished by discovering which content set stored in the Bitstream Control Storage Device 12 matches the arithmetic mean (A) and therefore establishing the interim content classification. If an Undetermined identification may be indicated, the DCF may select the first SF or LF value within the Bitstream Control Storage Device 12 (e.g., within a database of previous interim content classifications). The definition of content sets may vary between embodiments and other DCF algorithms may be used. For example, the content classification may be determined in accordance with equation (14):

$$T=D(CS(SF,LF,UD),Ai \ldots An)$$

Example Content Set Definitions
CS(SF)={0 . . . 57}
CS(UD)={58 . . . 59}
CS(LF)={60 . . . N}
Where
i=Temporal value
n=Temporal end of each IAD
D=Discern Content-type Function, may return one of the 3 values defined under T
CS=Content Set definitions for SF, LF and UD
A=Set of arithmetic mean values
T=Content identification for each TSD temporal period
SF=SF
LF=Long Form
UD=Undetermined
In a non-real-time environment (e.g., recorded content on a DVR) the Discern Content-type Function (DCF) may enable additional processing options, such as look-back, look-ahead, and probability analytics which may increase the accuracy of content element naming.

(MESNA) ACP-Analytics

The algorithm for the MESNA analytics component, which may be referred to herein as MESNA-ACP, may use analytics of SNR ranges (MID and SIDE for both Peak and RMS) and the relationships between each of the SNRs in the determination of the interim content classification. While this may be one possible methodology to determine the interim content classification others may be utilized.

In an example embodiment, the MESNA-ACP 44 may acquire SNRs from MESNA 43 using variable Data Sample Rates (DSR), for Temporal Durations (TD). The SNRs acquired may be grouped within a Temporal Sample Dataset (TSD) where statistical and probability analysis may be performed.

Because some content contains large dynamic ranges, eliminating SNR outliers within each TSD (and at time across TSDs) may simplify the analytic step for discerning the interim content classification. In an example embodiment, one such method may determine independent averages for MID and SIDE SNRs and the SIDE average may also be restricted to a specific range to remove outliers. The SNR MID and SIDE averaging may be determined in accordance with equations (20):

$$R_m = \left\| \frac{\sum_{i=0}^{N-1} S_m(i)}{N} + .5 \right\|$$

$$R_s = \mathrm{Max}\left(\left\| \frac{\sum_{i=0}^{N-1} S_s(i)}{N} + .5 \right\|, L\right)$$

Where
i=Temporal value
N=Temporal period representing the end of the Measurement subset.
Sm=SNR value for the MID data
Ss=SNR value for the SIDE data
Rm=Signal to Noise Range for the MID data
Rs=Signal to Noise Range for the SIDE data
L=dB value used to limit the Rs, (e.g., −69 dB, but other values may be used)
Max( )=Limiter function returning the maximum of 2 values Referring to FIG. 5, in an example embodiment, the MESNA-ACP 44 may determine independent differentials for the SNRs that may assist in resolving outliers and determining content classifications. The differential values may be set in accordance with equations (21):

$$Rmsd = |Rm(i) - Rs(i)|$$

$$Rmd = |Rm(i-1) - Rm(i)|$$

Where
i=Temporal value
Rm=SNA MID arithmetic mean of the temporal dataset
Rs=SNA SIDE arithmetic mean of the temporal dataset
Rmsd=MID/SIDE differential value for a measurement set
Rmd=MID differential value for a measurement set In an example embodiment, the DCF may generate and store (in Bitstream Control Storage Device 12) content sets. The content sets may include ranges of MID and SIDE differential values each corresponding to a specific interim content classification. If the calculated differential exists within a content set, the differential may indicate an interim content classification, which may be then assigned to the content. On the other hand, if an Undetermined identification (UD) may be indicated, DCF may generate and store secondary set for comparison to determine whether the content (and classification) is SF or LF. The definition of content sets may vary between embodiments and other DCF algorithms may be used. In an example embodiment, the content classification may be determined in accordance with equation (22):

Example MID and SIDE Differential Set 12 Definitions
Cmd1=SF{0 . . . 2},
LF{3 . . . 99}
Cmd2=SF{0 . . . 3},
LF{4 . . . 99}
Cmsd=SF{0 . . . 10}
UD{11 . . . 19}
LF{20 . . . 99}

Formula Definitions:
If Rs<B then
T=D(Cmd1, Rmd)
else
T=D(Cmsd, Rmsd)
If T=UD then
T=D(Cmd2, Rmd)
Where
Cmd1=Content set definition 12 for the primary MID differential
Cmd2=Content set definition 12 for the secondary MID differential
Cmsd=Content set definition 12 for the MID/SIDE differential
B=Boundary dB value (−90 dB)
D=Discern Interim content classification function
T=Content identification for each TSD
SF=Short Form
LF=Long Form
UD=Undetermined In a non-real-time environment (e.g., recorded content) the Discern Content-type Function (DCF) may enable additional processing options, such as look-back, look-ahead, and probability analytics which may increase the accuracy of content element naming.

(MECLA) ACP-Analytics

The algorithm for the MECLA analytics component, which may be referred to herein as MECLA-ACP, may involve a multi-step process to expose the differential ranges which may be used to discern content identification. While this may be one possible methodology to determine the content type others may be utilized.

Referring to FIG. 6, in an example embodiment, the MECLA-ACP 57 may acquire data from one or more of MECLA 54, 55, 56 using variable data sample rates, for Temporal Durations (TD). The MECLA data acquired may be grouped within a Temporal Sample Dataset (TSD) where statistical and probability analysis may be performed. The MECLAs data may be grouped within each TSD in accordance with equations (31):

$$M2 = \mathrm{Max}(LA\text{-}2(i \ldots N))$$

$$A2 = \mathrm{Average}(LA\text{-}2(i \ldots N))$$

$$A3 = \mathrm{Average}(LA\text{-}3(i \ldots N))$$

$$M3 = \mathrm{Max}(LA\text{-}3(i \ldots N))$$

Where
i=Temporal value corresponding to the sample rate
N=Temporal value representing the end of each TSD
LA-2=MECLA-2 dB values
LA-3=MECLA-3 dB values
M2=Maximum LA-2 within each TSD
A2=Arithmetic mean of LA-2s for each TSD
M3=Maximum LA-3 within each TSD in this example
A3=Arithmetic Mean of LA-3s for each TSD in this example
Average=Function returning the arithmetic mean of a list of values
Max=Function returning the maximum of a list of values Outlier values may be partially resolved by calculating the arithmetic mean of the MECLA RMS/Peak values, subsequent differentials and ranges. The differential and ranges may be calculated in accordance with equations (32):

$$DA32 = |A3(i) - A2(i)|$$

$$DR32 = |DA32(i-1) - DA32(i)|$$

Where
i=Temporal value
Da32=Differential of PLA-2 and PLA-3
DR32=Differential range of the prior and current DA32 values In an example embodiment, the DCF may generate and store (in Bitstream Control Storage Device 12) content sets. The content sets may include ranges of differential values each corresponding to a specific interim content classification. If the calculated differential exists within a content set, the differential may indicate an intermediate interim content classification. After further evaluation, a final interim content classification may be discerned and recorded. If an undetermined (UD) final classification may be indicated, the DCF may select the first SF or LF classification name within a Bitstream Control Storage Device 12. The definition of content sets may vary between embodiments and other DCF algorithms may be used. For example, the content may be determined in accordance with equation (33):

Example Intermediate and Master Set Definitions
Cs1=Set LF{−80 . . . −100},
UD{0 . . . −79}
Cs2=Set SF{0 . . . 3},
UD{4 . . . 4},
LF{5 . . . 100}
Cs3=Set SF{0 . . . −24},
UD{−25 . . . −26},
LF{−27 . . . −100}
Cs4=Set SF{0 . . . −24},
UD{−25 . . . −26},
LF{−27 . . . −100}
Formula Definitions:
IC1=D(Cs1,A3)
IC2=D(Cs2,DA32)
IC3=D(Cs3,DR32)
If IC 1=LF then
FC=LF
Else
If IC3=SF then
If IC2=LF then
FC=LF
Else
FC=SF
Else
FC=IC3
Where
Cs1 . . . 4=Content set definitions
IC1 . . . 3=Intermediate content classifications
D=Intermediate DCF function
SF=Short Form
LF=Long Form
UD=Undetermined
FC=Final interim content classification
SF=Short Form
LF=Long Form
UD=Undetermined In a non-real-time environment (e.g., recorded content) the Discern Content-type Function (DCF) may enable additional processing options, such as look-back, look-ahead, and probability analytics which may increase the accuracy of content element naming.

Multiform Correlation Analyzer (MCA)-Analytics Content Processor (ACP)-Analytics Referring to FIG. 7, the algorithm for the MCA Analytics, which may be referred to herein as MCA-ACP, may perform, using multiform correlation analyzer (MCA) 64, analytics on correlation waveform data, and simplify the waveforms by eliminating or reducing the peaks and troughs (waveform smoothing) since these may represent outlier conditions. The MCA-ACP 65 may expose the MCA correlation ranges which may assist with the determination of content classifications. For example, optionally two (or more) different methods may be utilized (e.g. distribution totals and mode averaging) with both operating in parallel to independently derive intermediate interim content classifications. Both intermediate interim content classifications may be evaluated to discern the final interim content classification. While this may be one possible methodology to determine the element name many others may be utilized.

In an example embodiment, the MCA-ACP 65 may acquire MCA data from the correlation analyzer 64 using variable Data Sample Rates (DSR) for Temporal Durations (TD). The TDs may be grouped within Temporal Sample Datasets (TSD) where statistical and probability analysis may be performed.

An example process that may eliminate outliers (e.g., peaks and troughs) for MCAs within each TSD may be referred to herein as TSD Waveform Smoothing (TWS). In an example embodiment, TWS may be used to eliminate MCA outliers when conditions (defined below) may be satisfied, however, other smoothing algorithms may be employed. The TWS may be applied to each TSD in accordance with equation (44):

If Trough detected then
Transform troughs to peaks using
TR(S(i . . . ep))
If ep−c>W and SM>0 then
While i>c and i<ep
S(i . . . N)=C
If Trough detected then
Transform peaks to troughs using TR(S(i . . . ep))
Where
i=Temporal value
S=MCAs within a TSD
TR=Transformation function such that
S(i)=U−S(i), therefore troughs become peaks
U=Transformation boundary representing the maximum correlation value, e.g. 100)
C=S(i) value at smoothing commencement point, where R>0 and ep>0 within each TSD
c=i value at smoothing commencement point, where R>0 and ep>0 within each TSD
ep=End of Peak temporal value within the TSD where S(ep)−S(i)>0
M1=Max(S(i) . . . S(N)) (Maximum Correlation value within TSD)
M2=Min(S(i) S(N)) (Minimum Correlation value within TSD)
R=M1−C (Maximum Correlation range within series)
H=Minimum Crest Height
W=Minimum Crest Width
SM=∥R/H∥ (Smoothing determination with 0 indicating smoothing not desired and a value greater than 0 indicating smoothing may be desired)

In an example embodiment the distribution totals for each TSD may be calculated in accordance with equations (45):

$$T_{S_D} = \sum_{i=0}^{N-1} CD(S(i), B, SF)$$

-continued $$T_{L_D} = \sum_{i=0}^{N-1} CD(S(i), B, LF)$$

Where
CD=Function selecting content for summation that meets content and boundary value conditions and returning a 0 when not selected and a 1 when selected
    i=Temporal value representing starting point of each TD
    S=MCA Correlation values
    N=Upper limit of each TSD
    B=Value representing content boundary between SF and LF. Note: B may be determined thru previous analytics of MCA content.
    SF=Indicates selection of content above the Content boundary (B)
    LF=Indicates selection of content below the Content boundary (B)
    TSD=Total count of all SF content
    TLD=Total count of all LF content
    N=Temporal end of the period In an example embodiment, calculating the Mode average for each TSD may be determined in accordance with equation (46):

$$M = \text{Mode}(S(i \ldots N))$$

Where
Mode=A function that may select the MCA value within the TSD that occurs most frequently. If multiple MCA values meet the Mode conditions then the number occurring most frequently on one side or the other of the boundary condition may be returned. If the number is equal on both sides then the Content Boundary value may be returned, indicating an undetermined value.
    i=Temporal value
    N=Upper limit of each TSD
    M=Mode Average In an example embodiment DCF may use an iterative multi-step process for determining the interim content classifications, first determining the intermediate interim content classifications for distribution totals and mode averaging and subsequent analytics for discerning the final interim content classification. On the other hand, if the content may be Undetermined the DCF may select the first SF or LF name within a Bitstream Control Database 12. For example, the content may be determined in accordance with equations (47):
    Example Final Element Name Pattern Set 12

PLF=((LF,LF),(LF,UD),(UD,LF))

PSF=((SF,SF),(SF,UD),(UD,SF))

PUD=((LF,SF),(SF,LF),(UD,UD))

Formula to determine intermediate distribution interim content classification

ID=SF(If TSD>TLD)

ID=LF(If TSD<TLD)

ID=UD(If TSD=TLD)

Formula to determine intermediate mode interim content classification

IM=SF(If M>B)

IM=LF(If M<B)

IM=UD(If M=B)

Formula to determine final interim content classification

FC=DCF(ID,IM,PLF,PSF,PUD)

Where
    ID=Intermediate Distribution interim content classification
    IM=Intermediate Mode interim content classification
    FC=Final Interim content classification
    TSD=Total count of all SF Distribution content within each TSD
    TLD=Total count of all LF Distribution content within each TSD
    M=Mode average of each TSD
    B=Value representing content boundary between SF and LF
    DCF=Discern Master Content by comparing the Intermediate distribution and mode content identification to final element name content pattern definitions, select the interim content classification that matches and resolve all UDs using a Bitstream Control Database In a non-real-time environment (e.g., recorded content) the Discern Content-type Function (DCF) may enable additional processing options, such as look-back, look-ahead 12 and probability analytics which may increase the accuracy of content element naming.

Phase Polarity Analytics (PPA) ACP-Analytics

The algorithm for the PPA Analytics Component, hereafter referred to as PPA-ACP, may determine content classifications by comparing PPA data to sets of interim content classifications, which may be stored in the Bitstream Control Storage Device 12. A given set may contain ranges of PPAs corresponding to specific interim content classifications (SF, LF, UD). While this may be one possible methodology to determine the content others may be utilized.

In an example embodiment, the PA-ACP 75 may acquire PPA data from the phase polarity analyzer 74 using variable Data Sample Rates (DSR), for Temporal Durations (TD). The PPAs acquired may be grouped within a Temporal Sample Dataset (TSD) where statistical and probability analysis may be performed. The PPAs may be grouped within each TSD in accordance with equation (51):

$$P = \left\| \frac{\sum_{i=0}^{N-1} S_m(i)}{N} + .5 \right\|$$

Where
    i=Temporal value
    N=Temporal end of each TSD
    S=PPA values within TSDs
    P=Averaged PPA value In an example embodiment, interim content classification sets 12 may be used to classify PPA ranges which correspond to interim content classifications. The DCF function may compare the average PPA value (P) to the content sets 12 and if matched may indicate the interim content classification. If the content may be classified as Undetermined, the DCF may select the first SF or LF name within a Bitstream Control Database 12. The DCF may determine the interim content classification in accordance with the following logic and equations (52):
    Example Interim Content Classification Set Definitions
    SLF=Set{+1 . . . −0.5}
    SUD=Set{−0.6}
    SSF=Set{−0.7 . . . −1}

Formula to discern content classifications $$C = D(P(i), SLF, SUD, SSF)$$

Where
i=Temporal value
P=PPA average
C=Interim content classification
SLF=Content Set definition of LF content 12
SUD=Content Set definition of UD content 12
SSF=Content Set definition of SF content 12
D=DCF function—returns content classification of
LF=Long Form
SF=Short Form
UD=Undetermined In a non-real-time environment (e.g., recorded content), the Discern Content-type Function (DCF) may enable additional processing options, such as look-back, look-ahead 12 and probability analytics which may increase the accuracy of content element naming/classification.

(SAAD) ACP-Analytics

The algorithm for the SAAD analytics component, which may be referred to herein as SAAD-ACP, may use analytics of the SAAD waveform to determine if the content may adhere to the properties of applause.

Referring to FIG. 9, there may be many types of applause, such as indoor, outdoor, arenas, etc., with differing characteristics. SAAD-ACP 85 may perform various probability calculations utilizing waveform data and probability sets stored and accessed from Bitstream Control Storage Device 12 to construct an applause determination. Because applause may vary, probability calculations may produce a value that indicates the proximity of the applause signal to the signal pattern stored with the Bitstream Control Storage Device 12. If the probability value may be greater than a defined threshold amount the signal may be deemed to be applause. While this may be one possible methodology to determine applause others may be utilized.

In an example embodiment, the SAAD-ACP 85 may acquire data from SAAD frequency analyzer 83 across a sampled frequency spectrum by using dB power range and variable Data Sample Rates (DSR), for given Temporal Durations (TD). TDs may be grouped in Temporal Sample Datasets (TSD) where statistical and probability analysis may be performed.

In an example embodiment, the Discern Applause Function (DAF) may determine the probability of applause by comparing waveform and dB power samples (within each TSD) to previously defined pattern sets accessed from Storage Device 12 to construct a probability. If the probability exceeds the threshold the interim content classification may be applause; however other determination methodologies may be used. The definition of pattern sets 12 may vary between embodiments and other DAF algorithms may be used.

Whenever applause may be detected the Adjudication Analytics Processor (AAP) 108 may override all other ACPs and set the interim content classification to LF 17. DAF may determine the applause in accordance with the following logic and equations (61):

PA1=Set{AS1,AS2 . . . AS$n$},

PA2=Set{AS1,AS2 . . . AS$n$}

PA$n$=Set{AS1,AS2 . . . AS$n$}

$A = D(S(i), V, T, PA1, PA2, \ldots PAn)$

Where
i=Temporal value
S=SAAD values within TSDs
V=Probability variance—used when performing pattern matching to allow for variations in dB and frequencies
T=Probability threshold—if the probability exceeds the threshold, applause may be detected
AS=Set of Applause waveform data, unique for each type of applause
A=Applause indicator for each TSD. Possible values may be:
AP=Applause
NA=Not applause
PAS1-n=Applause Pattern Set definitions representing various applause configurations which may comprise combinations of frequency, dB and probability values
D=DAF function—calculates the probability for each applause set 12 and if any probability exceeds the applause threshold (T) the interim content classification may be set to AP—indicating applause (EASSA) ACP-Analytics The algorithm for the EASSA Analytics Component, hereafter referred to as EASSA-ACP, may perform various probability calculations utilizing data and probability sets 12 to construct an EAS determination. Because the quality of an EAS broadcast may vary the resulting probability calculations may produce a value that indicates the proximity of the EAS signal to the FCCs defined "two tone" combination sine waves signal patterns stored within the Bitstream Control Storage Device 12. If the probability value may be greater than a defined threshold amount (such as 85%) the signal may be deemed to be an EAS message. While this may be one possible methodology to determine Emergency Alerts others may be utilized.

Referring to FIG. 10, in an example embodiment, the EASSA-ACP 94 may acquire EASSA data from the frequency analyzer 92 across the sampled frequency spectrum by using dB power ranges and variable Data Sample Rates (DSR) for given Temporal Durations (TD). TDs may be grouped in Temporal Sample Datasets (TSD) where statistical and probability analysis may be performed.

In an example embodiment, the Discern Emergency Alert Function (DEAF) may calculate the probability of emergency alerts by comparing waveforms and dB power samples (within each TSD) to pattern sets accessed from pattern store 87; however other determination methodologies may be used. The definition of emergency alert pattern sets may vary between embodiments and other DEAF algorithms may be used. Whenever an emergency alert is detected, the adjudication process may override all other ACPs and set the content classification to EA. DEAF may determine the Emergency Alert in accordance with the following logic and equations (71):

$PA1 = \text{Set}\{EAS1, EAS2 \ldots EASn\}$, $PA2 = \text{Set}\{EAS1, EAS2 \ldots EASn\}$ $\vdots$ $PAn = \text{Set}\{EAS1, EAS2 \ldots EASn\}$ $EA = D(S(i), V, T, PA1, PA1, \ldots PAn)$ Where
i=Temporal value
S=EASSA values within TSDs V=Probability variance—used when performing pattern matching to allow for variations in dB and frequencies T=Probability threshold—if the probability exceeds the threshold, an Emergency Alert may be detected.

EAS=Set of emergency alert waveform data

EA=Emergency Alert indicator for each TSD. Possible values may be:

EA=Emergency Alert

NE=Not Emergency Alert

PAS1-n=Emergency Alert Pattern Set 12 definitions representing various Emergency Alert configurations which may comprise combinations of frequency, dB and probability values D=DEAF function—calculates the probability for each Emergency Alert set and if any probability calculated exceeds the threshold (T), a positive identification may be indicated.

Configuration Options

Figure 17:
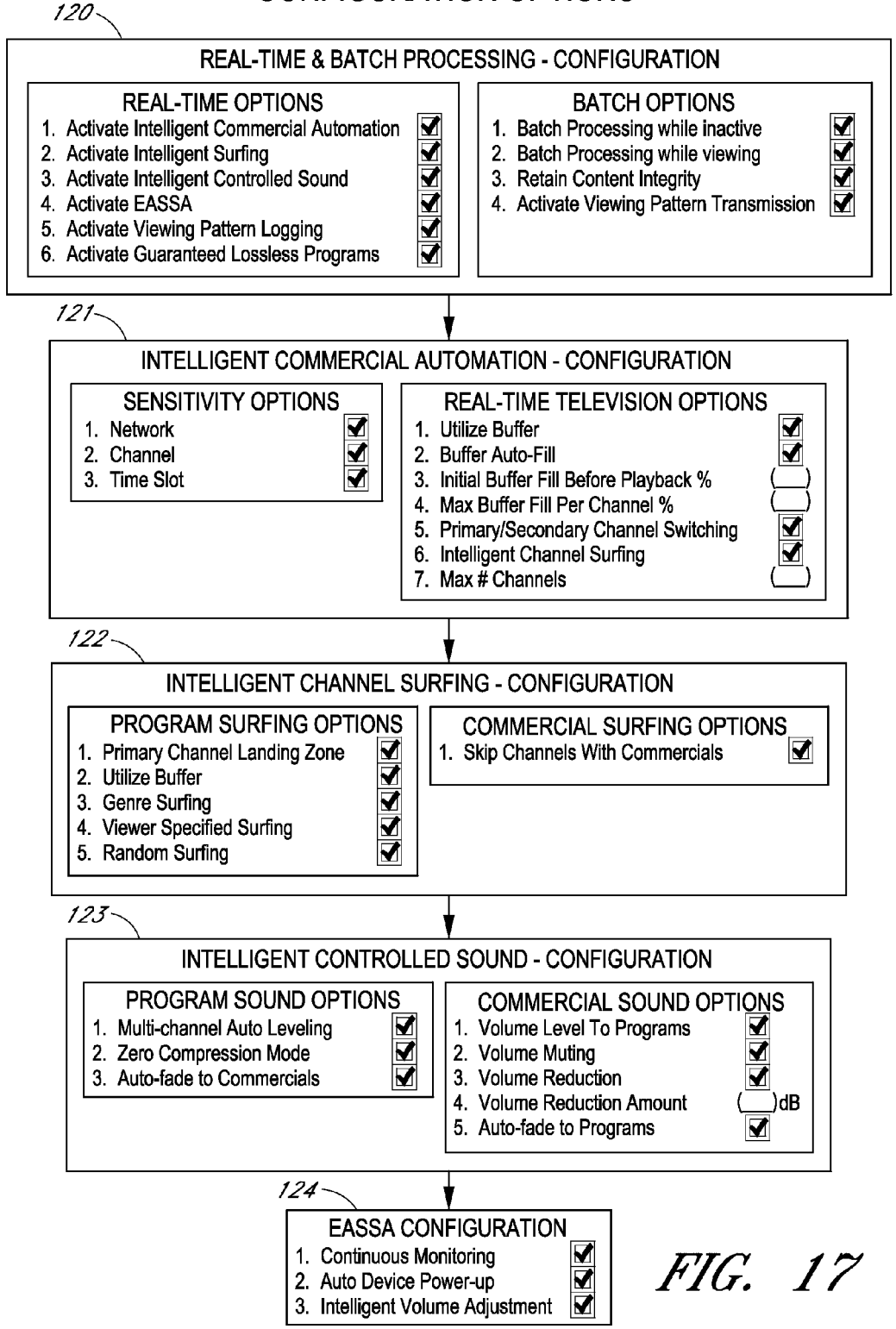
FIG. 17 is a diagram of example configuration options.

Referring to FIG. 17, certain embodiments may provide sets of consumer electronic device (e.g., a set top box, a television, a networked computer) configuration options utilized during device/software implementation. Below is a brief description of each configuration option.

The example device configuration options (see, e.g., FIG. 17) and viewer options (see, e.g., FIG. 18) below may be interchanged and are not be meant to represent the only options.

Real-Time & Batch Processing

Real-Time Options 120

Activate Intelligent Commercial Automation—enables Intelligent Commercial Automation 121 with configuration options Activate Intelligent Surfing—enables Intelligent Surfing automation/processing 122 with configuration options Activate Intelligent Controlled Sound—enables Intelligent Controlled Sound automation/processing 123 with configuration options Activate EASSA—enables Emergency Alert System Signal Analysis processing 124 with configuration options Activate Viewing Pattern Logging—enables logging of viewing history and transmission with remote capture capability Activate Guaranteed Lossless Programs—instructs the content analytics process to begin viewing prior to long form contents actual start time Batch Options 120

Batch Processing while inactive—enables batch processing of recorded content while the device may be in an idle state Batch Processing while viewing—enable batch processing of recorded content while the viewer may be watching television Retain Content Integrity—instructs the content analytics process to either use start/stop "markers" to indicate short form content or a destructive method Activate Viewing Pattern Transmission—enables background transmission of viewing history/logs gathered during real-time viewing Intelligent Commercial Automation 121

Sensitivity Options 121

Network—enable selection of networks, i.e. group of channels for automation

Channel—enable selection specific channels for automation

Time slot—enable selection of specific time slots for automation

Real-Time Television Options 121

Utilize Buffer—enable use of an audio and video buffer to increase accuracy

Buffer Auto-Fill—determines when and how to fill buffer

Initial Buffer Fill Before Playback %—specifies buffer fill percentage before playback begins Max Buffer Fill Per Channel %—specifies the maximum percentage of the buffer each channel may use, thereby allowing the buffer to be shared between channels Primary/Secondary Channel Switching—enables intelligent commercial automation between channels Intelligent Channel Surfing—enables intelligent channel surfing during intelligent commercial automation Max # Channels—specifies the maximum number of channels for intelligent commercial automation or Intelligent Channel Surfing Intelligent Channel Surfing 122

Program Surfing Options 122

Primary Channel Landing Zone—enable the return to specified channel whenever a commercial may be detected during surfing Utilize Buffer—enable the buffer during surfing Genre Surfing—enables surfing utilizing the genre of the channel currently viewed Viewer Specified Surfing—allow selection of channels for surf Random Surfing—enable random channel selection during surfing Commercial Surfing Options 122

Skip Channels During Commercials—avoid landing on a channel if showing a commercial Intelligent Controlled Sound 123

Program Sound Options 123

Multi-channel Auto Leveling—enable audio for all channels maintained at steady state (level)

Zero Compression Mode—remove device audio compression relative to AAC encoding

Auto-fade to Commercials—enable fading from programs to commercials

Commercial Sound Options 123

Volume Level to Programs—enable steady state audio for both commercials and programs Volume Mute—enable volume muting during commercials Volume Reduction—enable commercial volume reduction by dB amount less than program volume Volume Reduction Amount—dB amount for Volume Reduction Auto-fade to Programs—enable fading from commercials to programs Eassa Configuration 124

Figure 18:
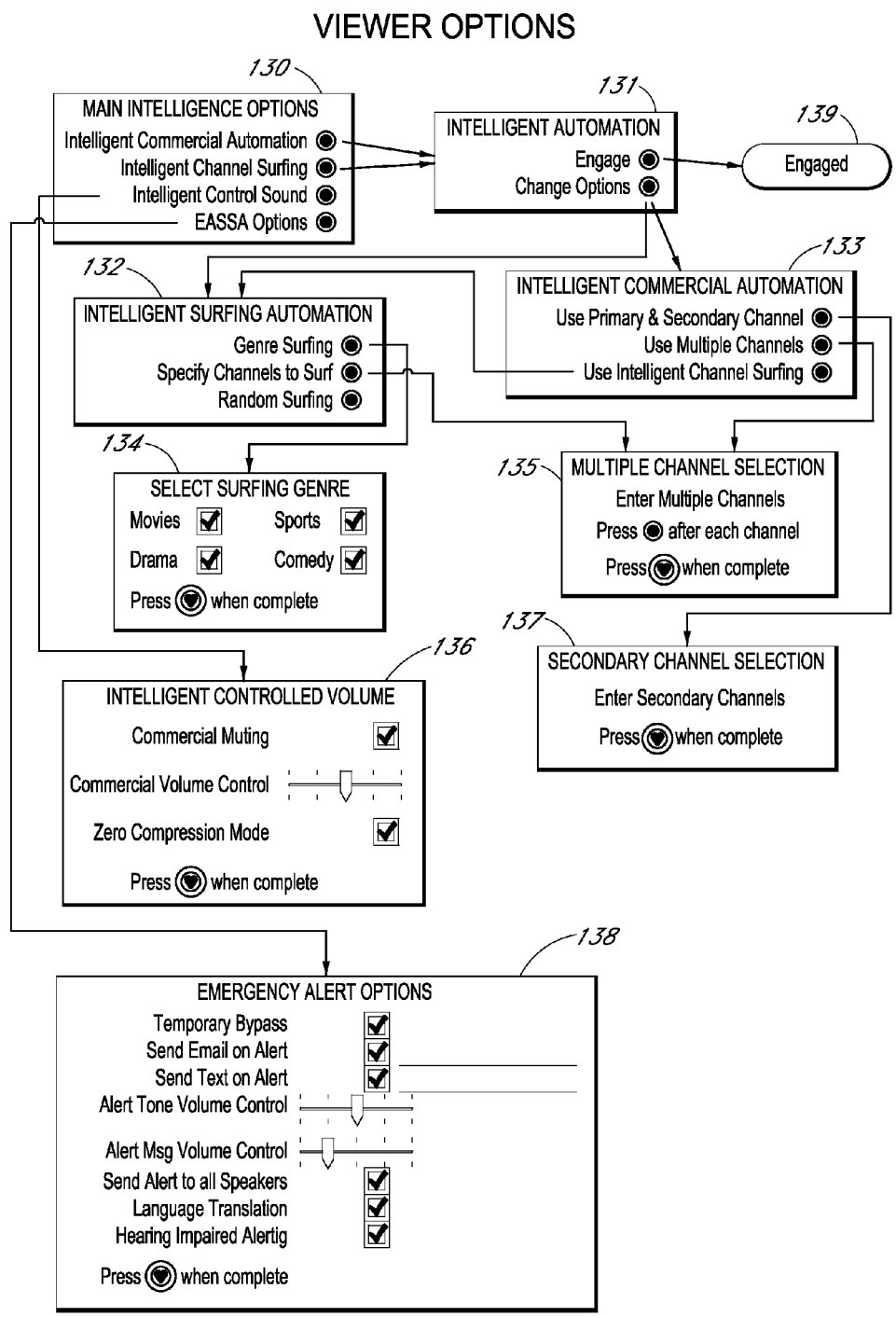
FIG. 18 is a diagram of example viewer options.

Continuous Monitoring—enable non-stop monitoring for emergency alert system messages Auto Device Power-up—enables a power-on command to be transmitted/provided to the device when EASSA condition detected Intelligent Volume Adjustment—enable automatic volume adjustment to increase the probability that the EAS message may be heard Ben Viewer Options Referring to FIG. 18, a viewer options interface may be provided, which may be at least partly based upon the configurations enabled. While numerous viewer options may be described, others may be used. Below may be a brief description of example viewer options.

Main Intelligence Options 130

Intelligent Commercial Automation—link to sub-menu 131 allowing the view to engage automation or modify options Intelligent Channel Surfing—link to sub-menu allowing the view to engage automation or modify options Intelligent Controlled Sound—Link to Intelligent Controlled Volume sub-menu EASSA Options—Link to the Emergency Alert Options sub-menu Intelligent Automation 131

Engage—enable Intelligent Commercial Automation or Intelligent Channel Surfing utilizing the options previously selected 139

Change Options—Link to either Intelligent Commercial Automation or the Intelligent Surfing Automation option sub-menus 132, 133

Intelligent Surfing Automation 132

Genre Surfing—Link to sub-menu 134 allowing entry of one or more genres for channel surfing Specify Channels to Surf—Link to sub-menu 135 allowing entry of multiple channels. The primary channel may be the channel in use when the View Options feature was activated. Other options may be used Random Surfing—enable random channel surfing Intelligent Commercial Automation 133

Use Primary & Secondary Channel—Link to sub-menu 137 allowing entry of the secondary channel. The primary channel may be the channel in use when the View Options feature was activated. Other options may be used.

Use Multiple Channels—Link to sub-menu 135 allowing entry of multiple channels. The primary channel may be the channel in use when the View Options feature was activated. Other options may be used.

Use Intelligent Channel Surfing—Link to sub-menu 132 allowing entry Intelligent Channel Surfing options Select Surfing Genre 134

Genre(s)—enable selection of 1 or more genres. Listed genres are illustrative only; addition genre granularity options may be used.

Multiple Channel Selection 135

Enter Multiple Channels—allow entry of 1 or more channels (up to maximum specified within configuration)

Intelligent Controlled Volume 136

Commercial Muting—enable muting during commercials

Commercial Volume Control—enable volume adjustment of the commercial volume in relationship to the program volume Zero Compression Mode—enable no compression, e.g. under user control Secondary Channel Selection 137

Enter Secondary Channel—allows entry of a single channel

Emergency Alert Options 138

Temporary Bypass—enable EASSA bypass to be engaged

Send Email on Alert—send an email to the address specified whenever an alert may be detected along with the general alert information Send Text on Alert—send text to the mobile device specified whenever an alert may be detected along with the general alert information Alert Tone Volume Control—allow adjustments to the alert tone Alert Msg Volume Control—allow adjustments to the alert message Language Translation—enable language translation of the alert message Hearing Impaired Alerting—enable messages to be sent to hearing impaired devices, e.g. TDD, real-time text technology, instant messaging, video mobile device, automated sign language conversion, etc. The messages may be delivered via email, text or other delivery method Classification Process Engaged 139

The classification engine option(s) may be engaged or disengaged and exit from the viewer options

OTHER EMBODIMENTS

Other implementations of content classification may be used in the description herein; various functionalities may be described and depicted in terms of components or modules. Furthermore it may be appreciated that certain embodiments may be configured to improve encoding/decoding of audio signals such as AAC, MPEG-2, and MPEG-4.

Optionally, certain embodiments may be used for identifying content broadcast on FM/AM digital radio bit streams.

Certain embodiments may enhance the measurement of audience viewing analytics by logging content classifications, which may be transmitted (in real-time or non-real-time) for further analysis and may derive viewing habits, trends, etc. for an individual or group of consumers.

In another embodiment specific content identification information may be embedded within the audio signal(s) for the purpose of accurately determining information such as content title, start date/time, duration, channel and content classifications.

In another embodiment channel and/or content may be excluded from processing from automation actions or other options. The exclusion options may be activated through the use of information within a Bitstream Control Database or from downloaded information.

Certain embodiments may also be used to enhance intelligence gathering or the interception of signals between people ("communications intelligence"-COMINT), whether involving electronic signals not directly used in communication ("electronic intelligence"—ELINT), or combinations of the two.

Although the above mentioned embodiments shown above may point out novel features of the apparatus, it may be understood that various omissions, substitutions, and changes may be made by those skilled in the art without departing from the scope of the apparatus.

Certain embodiments described herein may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors, optionally including wired and/or wireless network interfaces (e.g., cellular, Wi-Fi, Bluetooth, T1, DSL, cable, optical, or other interface(s) which may be coupled to the Internet), data stores, etc.). Data stores (e.g., databases) may be used to store some or all of the information discussed herein in memory.

By way of example, a given computing device may optionally include user interface devices, such as some or all of the following: one or more displays, keyboards, touch screens, speakers, microphones, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein within a second.

While certain embodiments may be illustrated or discussed as having certain example components, additional, fewer, or different components may be used.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

What is claimed is:

1. A method of processing audio signals to identify content, method comprising:
   receiving a first plurality of bit stream audio channels;
   enhancing, using a first circuit, artifacting, noise, and/or aliasing with respect to the first plurality of bit stream audio channels at least in part by sampling the plurality of bit stream audio channels;
   analyzing, using a signal analysis system, the first plurality of bit stream audio channels after performing the enhancement of the artifacting, noise, and/or aliasing to identify content type included in the first plurality of bit stream audio channels by measuring:
   at least signal noise, and
   one or more of the following:
      bandwidth,
      spectral energy,
      convergence,
      aliasing, or
      spectral symmetry;
   based at least in part on the analysis, identifying, using an identification circuit, commercial content included in the first plurality of bit stream audio channels;
   wherein the enhancement of the artifacting, noise and/or aliasing is performed at least in part by adding noise to the first plurality of bit stream audio channels by an amount sufficient to reveal signal to noise variance in non-commercial content included in the first plurality of bit stream audio channels,
   identifying commercial content included in the first plurality of bit stream audio channels further comprises utilizing loudness, noise and frequency spectrum analyzers in identifying commercial content, and
   two or more of the first plurality of bit stream audio channels are summed, combined, or subtracted and then down mixed to one or more channels to reduce redundant signal information and decoder channel modes.

2. A method of processing audio signals to identify content, the method comprising:
   receiving a first plurality of bit stream audio channels;
   enhancing, using a first circuit, artifacting, noise, and/or aliasing with respect to the first plurality of bit stream audio channels at least in part by sampling the plurality of bit stream audio channels;
   analyzing, using a signal analysis system, the first plurality of bit stream audio channels after performing the enhancement of the artifacting, noise, and/or aliasing to identify content type included in the first plurality of bit stream audio channels by measuring:
   at least signal noise, and
   one or more of the following:
      bandwidth,
      spectral energy,
      convergence,
      aliasing, or
      spectral symmetry;
   based at least in part on the analysis, identifying, using an identification circuit, commercial content included in the first plurality of bit stream audio channels;
   wherein the enhancement of the artifacting, noise and/or aliasing is performed at least in part by adding noise to the first plurality of bit stream audio channels by an amount sufficient to reveal signal to noise variance in non-commercial content included in the first plurality of bit stream audio channels.

3. A method of processing audio signals to identify content, the method comprising:
   receiving a first plurality of bit stream audio channels;
   enhancing, using a first circuit, artifacting, noise, and/or aliasing with respect to the first plurality of bit stream audio channels at least in part by sampling the plurality of bit stream audio channels;
   analyzing, using a signal analysis system, the first plurality of bit stream audio channels after performing the enhancement of the artifacting, noise, and/or aliasing to identify content type included in the first plurality of bit stream audio channels by measuring:
   at least signal noise, and
   one or more of the following:
      bandwidth,
      spectral energy,
      convergence,
      aliasing, or
      spectral symmetry;
   based at least in part on the analysis, identifying, using an identification circuit, commercial content included in the first plurality of bit stream audio channels;
   the method further comprising, prior to performing the analysis, modulating phase and frequencies within the first plurality of bit stream audio channels to reduce redundant signal information.

4. The method as defined in claim 3, wherein the enhancement of the artifacting, noise and/or aliasing is performed at least in part by performing an analog to digital conversion on the first plurality of bit stream audio channels.

5. The method as defined in claim 3, wherein identifying commercial content included in the first plurality of bit stream audio channels further comprises utilizing loudness, noise and frequency spectrum analyzers in identifying commercial content.

6. The method as defined in claim 3, wherein prior to performing the analysis, two or more of the first plurality of bit stream audio channels are summed, combined, or subtracted and then down mixed to one or more channels to reduce redundant signal information and decoder channel modes.

7. The method as defined in claim 3, the method further comprising, prior to performing the analysis, processing the first plurality of channels to modify spectral content.

8. The method as defined in claim 3, the method further comprising utilizing both frequency and time domain analyzers in identifying the commercial content.

9. The method as defined in claim 3, the method further comprising utilizing frequency-domain wavelet spectrum analysis in identifying the commercial content.

10. A method of processing audio signals to identify content, the method comprising:
receiving a first plurality of bit stream audio channels;
enhancing, using a first circuit, artifacting, noise, and/or aliasing with respect to the first plurality of bit stream audio channels at least in part by sampling the plurality of bit stream audio channels;
analyzing, using a signal analysis system, the first plurality of bit stream audio channels after performing the enhancement of the artifacting, noise, and/or aliasing to identify content type included in the first plurality of bit stream audio channels by measuring:
at least signal noise, and
one or more of the following:
bandwidth,
spectral energy,
convergence,
aliasing, or
spectral symmetry;
based at least in part on the analysis, identifying, using an identification circuit, commercial content included in the first plurality of bit stream audio channels;
the method further comprising, prior to performing the analysis, processing two or more of the first plurality of channels utilizing amplitude modulation to increase the variation in amplitude and de-correlate amplitude of the channels within the first plurality of channel and reduce acoustic power correlations between two or more of the first plurality of channels.

11. A method of processing audio signals to identify content, the method comprising:
receiving a first plurality of bit stream audio channels;
enhancing, using a first circuit, artifacting, noise, and/or aliasing with respect to the first plurality of bit stream audio channels at least in part by sampling the plurality of bit stream audio channels;
analyzing, using a signal analysis system, the first plurality of bit stream audio channels after performing the enhancement of the artifacting, noise, and/or aliasing to identify content type included in the first plurality of bit stream audio channels by measuring:
at least signal noise, and
one or more of the following:
bandwidth,
spectral energy,
convergence,
aliasing, or
spectral symmetry;
based at least in part on the analysis, identifying, using an identification circuit, commercial content included in the first plurality of bit stream audio channels;
the method further comprising performing a phase inversion on a first channel signal and summing the phase inverted first channel signal with a second channel signal in the first plurality of bit stream audio channels.

12. The method as defined in claim 11, wherein the signal analysis system utilizes one or more RMS (root mean square) detection signal noise analyzers.

13. A content identification system, comprising:
an input circuit configured to receive a first plurality of bit stream audio channels;
a circuit configured to enhance artifacting, noise, and/or aliasing with respect to the first plurality of bit stream audio channels;
a signal analysis system configured to analyze the first plurality of bit stream audio channels after the enhancement of the artifacting, noise, and/or aliasing is performed to identify content type included in the first plurality of bit stream audio channels by measuring at least signal noise, and one or more of the following:
bandwidth,
spectral energy,
convergence,
aliasing, or
spectral symmetry;
an identification circuit configured to identify, based at least in part on the analysis, commercial content included in the first plurality of bit stream audio channels
a modulator circuit configured to modulate phase and frequencies within the first plurality of bit stream audio channels to reduce redundant signal information prior to the analysis of the first plurality of bit stream audio channels by the signal analysis system.

14. A method of processing decoded signals to reveal differences in content, the method comprising:
receiving a first plurality of bit stream audio channels;
enhancing artifacting, noise, and bit rate error utilizing down sampling and bit-depth reduction with respect to the first plurality of bit stream audio channels;
reducing redundant signal information included in the first plurality of bit stream audio channels utilizing phase shift keying;
transforming the first plurality of bit stream audio channels into a frequency domain;
after enhancing artifacting, noise, and bit rate error and transforming the first plurality of bit stream audio channels into the frequency domain, using spectrum analysis to compare properties of the first plurality of bit stream audio channels to one or more reference signals; and
based at least on the comparison, identifying different content types included in the first plurality of bit stream audio channels.

15. The method as defined in claim 14, wherein enhancing artifacting, noise, and bit rate error is configured to result in increased aliasing, and losses in bandwidth, spectral energy, symmetry, and/or convergence of non-commercial content included in the first plurality of bit stream audio channels.

16. The method as defined in claim 14, wherein transforming the first plurality of bit stream audio channels into the frequency domain is performed using discrete cosine transforms.

17. The method as defined in claim 14, wherein enhancing artifacting further comprises enhancing aliasing and distortion.

18. The method as defined in claim 14, the method further comprising utilizing transcoding to increase differences in channels included in the first plurality of bit stream audio channels.

19. The method as defined in claim 18, wherein the transcoding is lossy to lossy.

20. The method as defined in claim 18, wherein transcoded channels are down-sampled at less than half the highest frequency of a reference frequency spectrum of the first plurality of bit channels, and non-commercial content included in the first plurality of bit stream audio channels is unable to be reproduced in the frequency spectrum.

21. The method as defined in claim 14, the method further comprising utilizing phase shift keying to reduce redundant information in the first plurality of bit stream audio channels.

22. The method as defined in claim 14, the method further comprising down mixing two or more channels in the first plurality of bit stream audio channels to fewer channels to reduce redundant signal information and decoder channel modes.

23. The method as defined in claim 14, the method further comprising inverting phase polarity of at least one down mixed channel.

24. The method as defined in claim 14, the method further comprising performing low pass filtering at less than half the highest frequency of at least one channel in the first plurality of bit stream audio channels and then performing down sampling.

25. The method as defined in claim 14, the method further comprising enhancing consistency in reproduction of commercial content relative to non-commercial content included in the first plurality of bit stream audio channels by sampling the first plurality of bit stream audio channels so that bit depth made less than a maximum tolerable loss of rate distortion.

26. The method as defined in claim 14, the method further comprising decreasing channel separation between two or more channels in the first plurality of decoded bit stream audio channels.

27. A system configured to reveal differences in content, the system comprising:
   an input port configured to receive a first plurality of bit stream audio channels;
   a circuit configured to enhance artifacting, noise, and bit rate error utilizing down sampling and bit-depth reduction with respect to the first plurality of bit stream audio channels;
   a circuit configured to reduce redundant signal information included in the first plurality of bit stream audio channels utilizing phase shift keying;
   a signal processor circuit configured to transform the first plurality of bit stream audio channels into a frequency domain;
   a spectrum analysis system configured to compare properties of the first plurality of bit stream audio channels to one or more reference signals; and
   an identification circuit configured to identify, based at least on the comparison, different content types included in the first plurality of bit stream audio channels.

\* \* \* \* \*

UNITED STATES PATENT AND TRADEMARK OFFICE
CERTIFICATE OF CORRECTION

| | | |
|---|---|---|
| PATENT NO. | : 8,825,188 B2 | Page 1 of 1 |
| APPLICATION NO. | : 13/906895 | |
| DATED | : September 2, 2014 | |
| INVENTOR(S) | : Stone et al. | |

It is certified that error appears in the above-identified patent and that said Letters Patent is hereby corrected as shown below:

In the Drawings

Sheet 1 of 19 (Fig. 1) at line 3, Change "RECIEVER" to --RECEIVER--.

In the Specification

In column 7 at line 60, Change "triangles" to --triangles.--.

In column 22 at line 43, Change "utilized" to --utilized:--.

In column 36 at line 26, Change "10log$_{10}$" to --10 log$_{10}$--.

In column 38 at line 40, Change "Emergencey" to --Emergency--.

In column 47 at line 35, Change "IC 1" to --IC1--.

In the Claims

In column 57 at line 41, In Claim 1, before "method" insert --the--.

Signed and Sealed this
Twenty-fourth Day of March, 2015

Michelle K. Lee
*Director of the United States Patent and Trademark Office*